US012465546B1

(12) United States Patent
Wang et al.

(10) Patent No.: US 12,465,546 B1
(45) Date of Patent: Nov. 11, 2025

(54) FOOT MASSAGE DEVICE

(71) Applicants: NINGBO HAODA HAISHENG TECHNOLOGY CO., LTD., Ningbo (CN); FUJIAN YITAIKANG ELECTRONICS CO., LTD, Fuzhou (CN)

(72) Inventors: Chaoling Wang, Ningbo (CN); Haitao Huang, Ningbo (CN); Binlong Huang, Fuzhou (CN)

(73) Assignees: NINGBO HAODA HAISHENG TECHNOLOGY CO., LTD., Ningbo (CN); FUJIAN YITAIKANG ELECTRONICS CO., LTD, Fuzhou (CN)

( * ) Notice: Subject to any disclaimer, the term of this patent is extended or adjusted under 35 U.S.C. 154(b) by 0 days.

(21) Appl. No.: 19/190,748

(22) Filed: Apr. 27, 2025

(30) Foreign Application Priority Data

| | | |
|---|---|---|
| May 8, 2024 | (CN) | 202410564506.9 |
| May 8, 2024 | (CN) | 202420984157.1 |
| Nov. 26, 2024 | (CN) | 202430748099.8 |
| Nov. 26, 2024 | (CN) | 202430748100.7 |
| Nov. 26, 2024 | (CN) | 202430748101.1 |
| Dec. 3, 2024 | (CN) | 202422963370.7 |
| Dec. 6, 2024 | (CN) | 202430776489.6 |
| Dec. 18, 2024 | (CN) | 202430805366.0 |

(51) Int. Cl.
*A61H 7/00* (2006.01)

(52) U.S. Cl.
CPC ..... *A61H 7/007* (2013.01); *A61H 2201/0207* (2013.01); *A61H 2201/0214* (2013.01); *A61H 2201/0285* (2013.01); *A61H 2201/1215* (2013.01); *A61H 2201/1481* (2013.01); *A61H 2201/1642* (2013.01); *A61H 2201/50* (2013.01); *A61H 2205/12* (2013.01)

(58) Field of Classification Search
CPC ............ A61H 7/007; A61H 2201/0207; A61H 2201/0214; A61H 2201/0285; A61H 2201/1215; A61H 2201/1481; A61H 2201/1642; A61H 2201/50; A61H 2205/12
See application file for complete search history.

(56) References Cited

U.S. PATENT DOCUMENTS

| | | | | |
|---|---|---|---|---|
| 4,513,736 A * | 4/1985 | Thurber | A61H 23/0218 | 601/57 |
| 4,807,602 A * | 2/1989 | Scarborough | A61H 7/004 | 601/169 |
| 5,501,682 A * | 3/1996 | Edwards-Cofie | A61H 23/02 | 601/16 |
| 6,602,212 B1 * | 8/2003 | Ahn | A61H 33/6057 | 601/154 |
| 10,039,689 B1 * | 8/2018 | Hajianpour | A61H 15/0078 | |

(Continued)

*Primary Examiner* — Timothy A Stanis
(74) *Attorney, Agent, or Firm* — Che-Yang Chen

(57) ABSTRACT

A foot massage device includes a housing, a foot receiving pocket coupled to the housing, a massage assembly disposed in the housing, and a thermal application assembly which is assembled to the foot receiving pocket, wherein the thermal application assembly has a top thermal contact surface which is exposed in the foot receiving pocket, wherein the thermal application assembly has a cooling mode for allowing the top thermal contact surface to provide a cooling treatment to the foot of the user.

18 Claims, 35 Drawing Sheets

(56) References Cited

U.S. PATENT DOCUMENTS

| | | | | |
|---|---|---|---|---|
| 2006/0030799 | A1* | 2/2006 | Adkins | A61H 9/0078<br>601/134 |
| 2007/0267020 | A1* | 11/2007 | Harris | A61H 23/00<br>128/205.24 |
| 2021/0022958 | A1* | 1/2021 | Yoo | A61H 9/0071 |

* cited by examiner

FOOT MASSAGE DEVICE

CROSS REFERENCE OF RELATED APPLICATION

This application is a non-provisional application that claims priority under 35 U.S.C. § 119 to China application number CN202410564506.9, filing date May 8, 2024, China application number CN202420984157.1, filing date May 8, 2024, and China application number CN202422963370.7, filing date Dec. 3, 2024, China application number CN202430748101.1, filing date Nov. 26, 2024, China application number CN202430748100.7, filing date Nov. 26, 2024, China application number CN202430748099.8, filing date Nov. 26, 2024, China application number CN202430776489.6, filing date Dec. 6, 2024, China application number CN202430805366.0, filing date Dec. 18, 2024, wherein the entire content of which is expressly incorporated herein by reference.

BACKGROUND OF THE PRESENT INVENTION

Field of Invention

The present invention relates to the field of foot therapy equipment, and more particular to a foot massage device.

Description of Related Arts

As people's health awareness increases, foot massage, as a traditional health care method, is becoming more and more popular among the public. Foot massage can not only help relieve fatigue and promote blood circulation, but also help improve sleep quality and enhance body immunity. Correspondingly, foot massagers are gradually entering people's lives. At present, there are many kinds of foot massagers on the market, and the massage forms are also developing in a diversified way. However, influenced by the traditional concept that hot water is needed for foot soaking, for example, hot water foot soaking helps to remove dampness and cold, promote blood circulation and relax the body. The conventional foot massagers mainly focus on heating in terms of temperature control.

In today's society, everyone is very familiar with the beneficial effects of exercise. Many people will ask professional coaches to lead them in more professional sports. However, ordinary families do not have large equipment like professional athletes to assist in post-exercise relaxation. The feet are actually an important part of the body that uses and bears force during exercise. According to research by scientists, proper cooling after exercise helps muscles and joints to better recover to the state before the start of exercise, and the accumulation of lactic acid is much less than when there is no cooling.

The inventors often exercises and has suffered from sports injuries before. They also found that the conventional foot massagers only have a heating mode in terms of temperature control, but cannot cool down. In this way, when users use the foot massager to massage after exercise, they cannot relieve muscle tension by cooling down.

The inventors also found that the existing foot massager mainly heats the feet in the heating mode by generating heat from the light source. Thus, only the part where the light source is installed can generate heat energy to perform a thermal massage on the feet, the part where the light source is not installed cannot perform a thermal massage on the feet.

In addition, the conventional foot massagers do not feel good when used in a high temperature environment. Specifically, when in a high temperature environment, the user places the foot in a relatively closed massage chamber. Even if the heating function is not used, the foot will feel stuffy when being massaged, resulting in a bad experience. If the user has sweaty feet, the experience will be even more uncomfortable.

In a humid environment, the use feeling of the conventional foot massager is not good. Specifically, if the user's feet cannot be kept dry in a humid environment for a long time, it is easy for the user to have an uncomfortable experience when using the foot massager.

SUMMARY OF THE PRESENT INVENTION

The invention is advantageous in that it provides a foot massage device, wherein the foot massage device has a cooling therapy function, and the temperature control assembly capable of cooling is set at a specific position, which can enhance the cooling effect on specific parts of the foot, for example, the heel part, wherein the heel part is closely related to the calf muscles, the sole muscles, the tendons of the foot, and the fascia of the foot.

Another advantage of the present invention is that it provides a foot massage device, wherein the foot massage device benefits from its cooling therapy function and can lower the user's body temperature even in a high temperature environment, reduce the user's feeling of stuffiness, and improve the user's experience, accordingly, the foot massage device of the present invention can be used in areas with higher temperatures, such as tropical areas.

Another advantage of the present invention is that it provides a foot massage device, wherein the foot massage device can be switched between a cooling mode and a heating mode to meet different needs of users in different scenarios.

Another advantage of the present invention is that it provides a foot massage device, wherein the foot massage device is provided with a ventilation component, for example, a fan, which can not only increase its cold air diffusion speed and/or hot air diffusion speed, and increase the cold air diffusion area and/or hot air diffusion area to a certain extent, it can also alleviate the physical discomfort and embarrassment caused by the user's foot sweat, reduce the user's feeling of stuffiness and humidity in high temperature and humid environments, and improve the user's experience.

According to an aspect, the present invention provides a foot massage device which has at least one heel placement position and comprises at least one temperature control assembly, wherein the heel placement position is suitable for placing the user's heel, the temperature control assembly is adjacent to the heel placement position, and the temperature control assembly is configured to cool in a cooling mode.

The temperature control assembly comprises at least one refrigerator, and the refrigerator is configured to at least partially cool in a cooling mode.

The temperature control assembly further comprises at least one fan, and the fan is adjacent to the refrigerator.

The cooler is disposed adjacent to and below the heel placement location.

The refrigerator is further configured to at least partially heat in a heating mode.

The fan is located below the refrigerator.

The fan is configured to blow air upward or suck air downward in a working state.

The foot massage device comprises a housing and at least one vent structure, and the vent structure is integrally formed with the housing or detachably provided on the housing.

The foot massage device has two heel placement positions, which are respectively a first heel placement position and a second heel placement position, the foot massage device comprises a housing, two temperature control assemblies and two vent structures, the two temperature control assemblies are respectively a first temperature control assembly and a second temperature control assembly, the first temperature control assembly comprises a first refrigerator and a first fan, and the second temperature control assembly comprises a second refrigerator and a second fan, the first refrigerator is arranged below the first heel placement position, and the second refrigerator is arranged below the second heel placement position, the first fan is arranged below the first refrigerator, and the second fan is arranged below the second refrigerator, the two vent structures are respectively a first vent structure and a second vent structure, the first vent structure corresponds to the first fan in the height direction of the foot massage device, and the second vent structure corresponds to the second fan in the height direction of the foot massage device.

The foot massage device comprises a circuit board and an intelligent control module, the temperature control assembly and the intelligent control module are connected to the circuit board, and the intelligent control module comprises a temperature controller, a temperature sensor and a voice control module.

Another advantage of the present invention is to provide a foot massage device, wherein the foot massage device has a refrigeration function. Thus, benefiting from the refrigeration function, the foot massage device can perform cooling massage on the user after the user exercises, relieve muscle tension, and reduce lactic acid accumulation, the foot massage device can also reduce the user's feeling of stuffiness in a high temperature environment, thereby improving the user's body sensation, the foot massage device is also suitable for use in areas with higher temperatures, such as tropical areas.

Another advantage of the present invention is to provide a foot massage device, wherein the foot massage device has two working modes: heating and cooling. In this way, the user can switch between the heating mode and the cooling mode according to demand.

Another advantage of the present invention is to provide a foot massage device, wherein the foot massage device also has a ventilation function. In this way, the foot massage device is more friendly to the user with foot sweat, and can alleviate the user's physical discomfort and embarrassment caused by foot sweat, thereby reducing the user's stuffiness in a high temperature environment, and relieving the user's dampness in a humid environment, thereby improving the user's physical sensation in a high temperature environment or a humid environment, it can also use the ventilation function to diffuse cold air in the cooling mode and diffuse hot air in the heating mode, thereby enabling it to play a cooling role even if there is no refrigeration component installed, and can also play a heating role in the position where the heating component is not installed.

Another advantage of the present invention is that it provides a foot massage device, wherein the foot massage device is not only equipped with a refrigeration unit so that it has a refrigeration function, but also does not affect the work of the original massage unit.

Another advantage of the present invention is that it provides a foot massage device, wherein the driving motor and the refrigeration unit of the foot massage device are arranged in a specific manner so as to reduce the influence of the heat dissipation of the driving motor on the refrigeration function as much as possible.

According to another aspect, the present invention provides a foot massage device, comprising:

- a mounting base,
- a first group of massage units and a second group of massage units,
- a driving unit comprising a driving motor and a transmission assembly, wherein the transmission assembly is drivably connected between the driving motor and the first group of massage units, and between the driving motor and the second group of massage units, the first group of massage units and the second group of massage units are located on two sides of the driving motor, and
- a refrigeration unit which is installed on the mounting base.

The mounting base has a rear side and a front side relative to each other in a first direction, the mounting base also has a first side and a second side relative to each other in a second direction, and a middle portion located between the first side and the second side, the first direction is perpendicular to the second direction, the driving motor and the refrigeration unit are located in the middle portion, the first group of massage units is located on the first side of the mounting base, the second group of massage units is located on the second side of the mounting base, and the refrigeration unit is located on the rear side of the driving motor.

The foot massage device has an internal ventilation channel, a first massage cavity and a second massage cavity, the first group of massage units is installed in the first massage cavity, the second group of massage units is installed in the second massage cavity, the internal ventilation channel is communicated between the outside and the first massage cavity, and between the outside and the second massage cavity.

The foot massage device also comprises a blower, the blower has a blower air inlet and a blower air outlet, and a blower passage connected between the blower air inlet and the blower air outlet, the refrigeration unit is located on the side of the blower air outlet of the blower, the refrigeration unit has a first diffusion channel, the first diffusion channel is communicated to the blower passage.

The foot massage device also comprises an air guide frame having an air guide channel, the air guide channel is communicated between the first diffusion channel and the massage cavity.

The air guide channel comprises a plurality of air guide bifurcated channels, the extension paths of the plurality of air guide bifurcated channels are different, each of the air guide bifurcated channels has an air guide outlet, the air guide outlet is communicated to the massage cavity, the positions of the air guide outlets of at least two of the air guide channels are different, so that the air guide outlets of at least two of the air guide channels are connected to different positions of the massage cavity.

The driving motor is located directly below or directly above the air guide channel.

The refrigeration unit comprises a semiconductor refrigeration plate, a first thermal diffusion part and a second thermal diffusion part, the first thermal diffusion part is formed on the upper side of the semiconductor refrigeration plate, the first diffusion channel is formed in the first thermal diffusion part, the second thermal diffusion part is formed on the lower side of the semiconductor refrigeration plate, the refrigeration unit is configured to operate switchably between a cooling mode and a heating mode.

The mounting base comprises a mounting base plate, the mounting base plate has a refrigeration mounting opening, the refrigeration mounting opening passes through the mounting base plate, the refrigeration unit is installed at the refrigeration mounting opening, and the second thermal diffusion part of the refrigeration unit passes through the refrigeration mounting opening, the second thermal diffusion part has a second diffusion channel, the second diffusion channel is connected to the blower passage, the blower passage and the second diffusion channel form an external ventilation channel.

The foot massage device also comprises a refrigeration bottom baffle which is arranged on the lower side of the mounting base plate and is spaced apart from the refrigeration mounting opening in the height direction, the spacing space between the refrigeration bottom baffle and the mounting base plate forms an external ventilation constraint channel, the gap between the front end of the refrigeration bottom baffle and the mounting base plate forms an external ventilation outlet of the external ventilation constraint channel.

The present invention further provide a foot massage device for a foot of a user, comprising:

- a housing having an opening;
- a pocket assembly which comprises a foot receiving pocket which is coupled to the opening for placing the foot of the user;
- a massage assembly disposed in the housing; and
- a thermal application assembly which is assembled to the foot receiving pocket, wherein the thermal application assembly comprises a top thermal contact surface which is exposed in the foot receiving pocket, wherein the thermal application assembly has a cooling mode for allowing the top thermal contact surface to provide a cooling treatment to the foot of the user.

DETAILED DESCRIPTION OF THE PREFERRED EMBODIMENT

Figure 1:
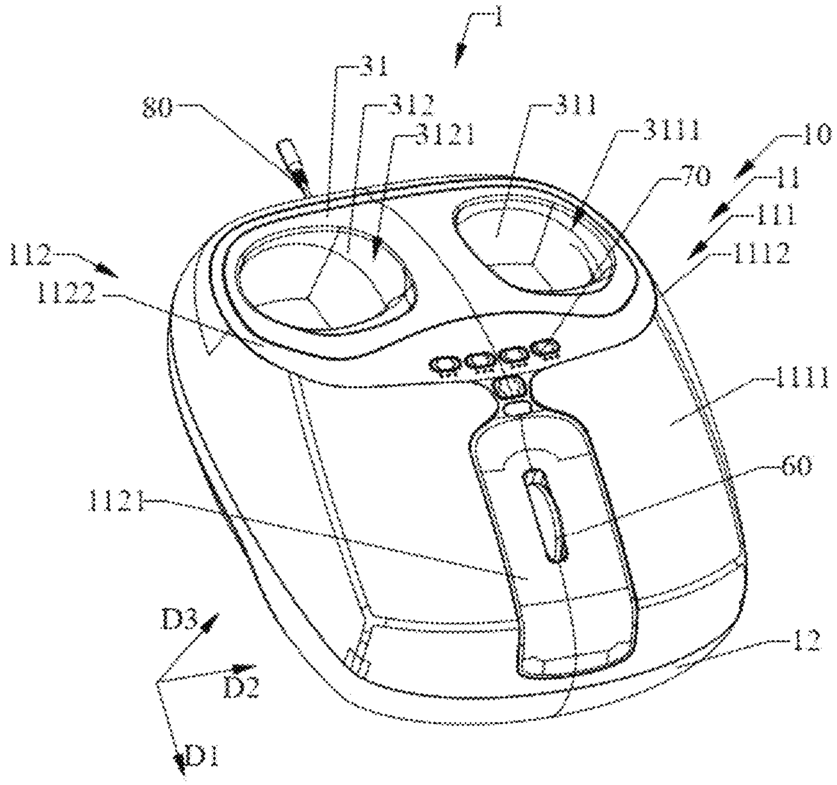
FIG. 1 is a perspective view of a foot massage device according to a first embodiment of the present invention.

Below, the exemplary embodiments according to the present invention will be described in detail with reference to the accompanying drawings. Obviously, the described embodiments are only part of the embodiments of the present invention, rather than all the embodiments of the present invention, and it should be understood that the present invention is not limited to the exemplary embodiments described here.

Although ordinals such as "first," "second," and the like will be used to describe various components, those components are not limited herein. The term is used only to distinguish one component from another. For example, a first component may be referred to as a second component, and likewise, a second component may be referred to as a first component without departing from the teachings of the present invention. The term "and/or" as used herein comprises any and all combinations of one or more associated listed items.

The terms used herein are only used for the purpose of describing various embodiments and are not intended to be limiting. As used herein, the singular form is intended to include the plural form, unless the context clearly indicates an exception. It will also be understood that the terms "including" and/or "having" when used in this specification specify the presence of the described features, numbers, operations, components, elements, or combinations thereof, without excluding the presence or addition of one or more other features, numbers, operations, components, elements, or combinations thereof.

In order to facilitate the introduction of the structure of the foot massage device, the present invention defines the orientation of the foot massage device through three degrees of freedom. Specifically, the first direction D1 is defined as the length direction of the foot massage device. When the user uses the foot massage device for massage, the length direction of the foot massage device is consistent with the length direction of the user's foot, the two opposite sides of the foot massage device in the first direction D1 are defined as the front and the back, the second direction D2 is defined as the width direction of the foot massage device. When the user uses the foot massage device for massage, the width direction of the foot massage device is consistent with the width direction of the user's foot, the third direction D3 is defined as the height direction of the foot massage device. When the user uses the foot massage device for massage, the height direction of the foot massage device is consistent with the thickness direction of the user's foot, the two opposite sides of the foot massage device in the third direction D3 are defined as the top and the bottom. The front, back, top and bottom of each component of the foot massage device are respectively consistent with the front, back, top and bottom of the foot massage device defined above.

Referring to FIGS. 1 to 8, a foot massage device 1 according to a first embodiment of the present invention is illustrated. The foot massage device 1 of the present invention has a cooling therapy function, and a temperature control assembly 40 capable of cooling is set at a specific position, which can enhance the cold compress effect on specific parts of the foot, for example, the heel part, wherein the heel part is closely related to the calf muscles, the sole muscles, the tendons of the foot, and the fascia of the foot, the calf muscles, the sole muscles, the tendons of the foot, the fascia of the foot and other tissues are prone to inflammation during exercise, which is suitable for relief by cooling. The layout position of the temperature control assembly 40 of the foot massage device 1 also allows the cold air to be easily diffused to each part where the foot is placed.

Figure 3:
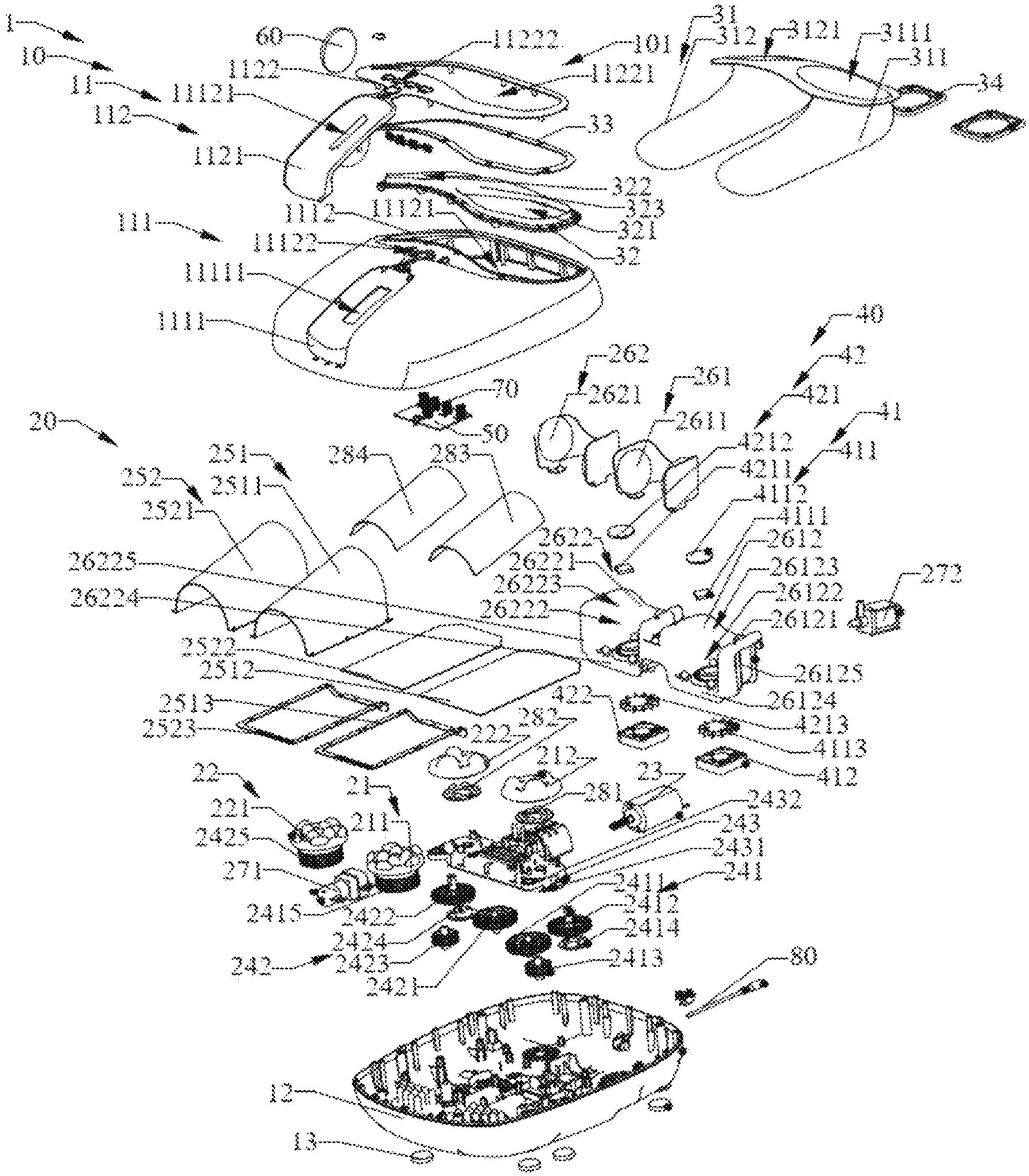
FIG. 3 is an exploded view of the foot massage device according to the above first embodiment of the present invention.

Specifically, as shown in FIG. 3, the foot massage device 1 comprises a housing 10, a massage assembly 20, and at least one temperature control assembly 40. The housing 10 is used to accommodate and install the massage assembly 20 and the temperature control assembly 40. Accordingly, the massage assembly 20 and the temperature control assembly 40 are installed on the housing 10. The massage assembly 20 is used to massage the user, for example, kneading, heating, laser, magnetic therapy, etc. The temperature control assembly 40 can be used for cooling. In one embodiment of the present invention, the temperature control assembly 40 can switch between a heating mode and a cooling mode.

In the embodiments of the present invention, the specific shape and structure of the housing 10 are not limited by the present invention. In one embodiment of the present invention, the housing 10 comprises an upper cover 11 and a base 12. The upper cover 11 and the base 12 are opposite to each other in the height direction defined by the foot massage device 1, and are interlocked to form a cavity that can accommodate other components. At least one foot pad 13 can also be provided below the base 12, wherein the foot pad 13 can raise the base 12 and reduce the wear of the bottom surface of the base 12. The upper cover 11 has at least one foot entrance 101.

In one embodiment of the present invention, the upper cover 11 is integrally formed.

In another embodiment of the present invention, the upper cover 11 is formed by combining at least two parts, and the overall appearance of the upper cover 11 can be designed by designing the shape and color of at least two parts.

Specifically, in an example of the present invention, as shown in FIG. 1 and FIG. 3, the upper cover 11 is mainly composed of two parts, including a cover body 111 and an auxiliary frame 112. The cover body 111 comprises a main body front portion 1111 and a main body rear portion 1112, and the main body front portion 1111 and the main body rear portion 1112 are opposite to each other in the first direction D1. The cover body 111 has a main body foot inlet 11121.

The main body foot inlet 11121 is formed at the main body rear portion 1112. The auxiliary frame 112 is installed on the cover body 111. The auxiliary frame 112 comprises an auxiliary frame front portion 1121 and an auxiliary frame rear portion 1122. The auxiliary frame front portion 1121 corresponds to the main body front portion 1111, the auxiliary frame rear portion 1122 corresponds to the main body rear portion 1112. The auxiliary frame front portion 1121 and the auxiliary frame rear portion 1122 are opposite to each other in the first direction D1. The auxiliary frame 112 has an auxiliary foot entrance 11221. The auxiliary foot entrance 11221 corresponds to the main foot entrance 11121 and is formed at the auxiliary frame rear portion 1122. The main foot entrance 11121 and the auxiliary foot entrance 11221 together form the foot entrance 101 of the upper cover 11.

Figure 4:
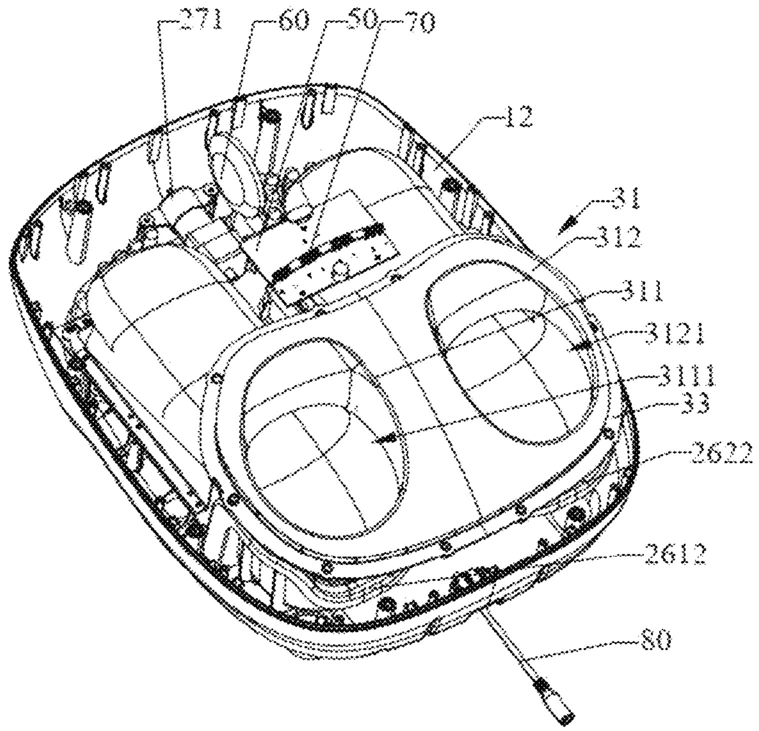
FIG. 4 is a first partial perspective view illustrating the foot massage device according to the above first embodiment of the present invention.

As shown in FIG. 1, FIG. 3 and FIG. 4, the foot massage device 1 further comprises at least one remote controller 60. The remote controller 60 is used for user operation to control the working mode of the foot massage device 1. The type of the remote controller 60 can be set according to the requirements, for example, a roller type, a button type, a rocker type, a touch type, etc. The housing 10 has a main remote controller mounting portion 11111 and an auxiliary remote controller mounting portion 11211, the auxiliary remote controller mounting portion 11211 corresponds to the main remote controller mounting portion 11111. The remote controller 60 is mounted on the main remote controller mounting portion 11111 and the auxiliary remote controller mounting portion 11211. The main remote controller mounting portion 11111 can be set on the main body front portion 1111, and the auxiliary remote controller mounting portion 11211 can be set on the auxiliary frame front portion 1121. It should be understood that the main remote control mounting portion 11111 and the auxiliary remote control mounting portion 11211 may also be arranged at other locations, accordingly, the remote control 60 may also be arranged at other locations of the upper cover 11, or at a location outside the upper cover 11 of the housing 10.

As shown in FIG. 1, FIG. 3 and FIG. 4, the foot massage device 1 further comprises at least one indicator light 70. The indicator light 70 is used to express the working state of the foot massage device 1. The housing 10 has a main indicator light mounting portion 11122 and an auxiliary indicator light mounting portion 11222, the auxiliary indicator light mounting portion 11222 corresponds to the main indicator light mounting portion 11122. The indicator light 70 is mounted on the main indicator light mounting portion 11122 and the auxiliary indicator light mounting portion 11222. The main indicator light mounting portion 11122 can be set at the main body rear portion 1112, and the auxiliary indicator light mounting portion 11222 can be set at the auxiliary frame rear portion 1122. It should be understood that the main indicator light mounting portion 11122 and the auxiliary indicator light mounting portion 11222 can also be set at other parts, accordingly, the indicator light 70 can also be set at other parts of the upper cover 11, or at a part other than the upper cover 11 of the housing 10.

Figure 5:
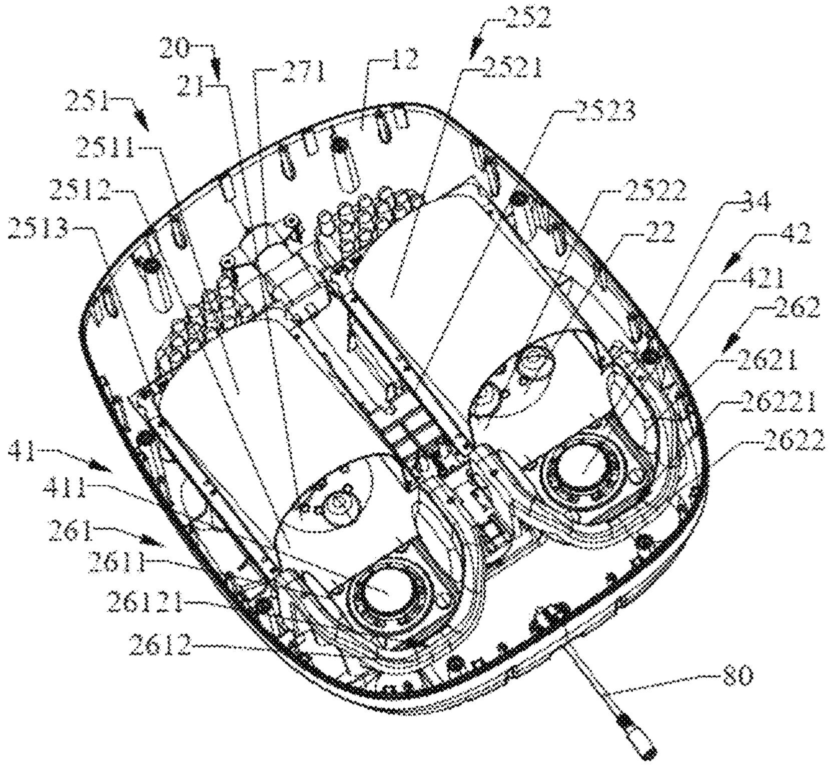
FIG. 5 is a second partial perspective view illustrating the foot massage device according to the above first embodiment of the present invention.
Figure 6:
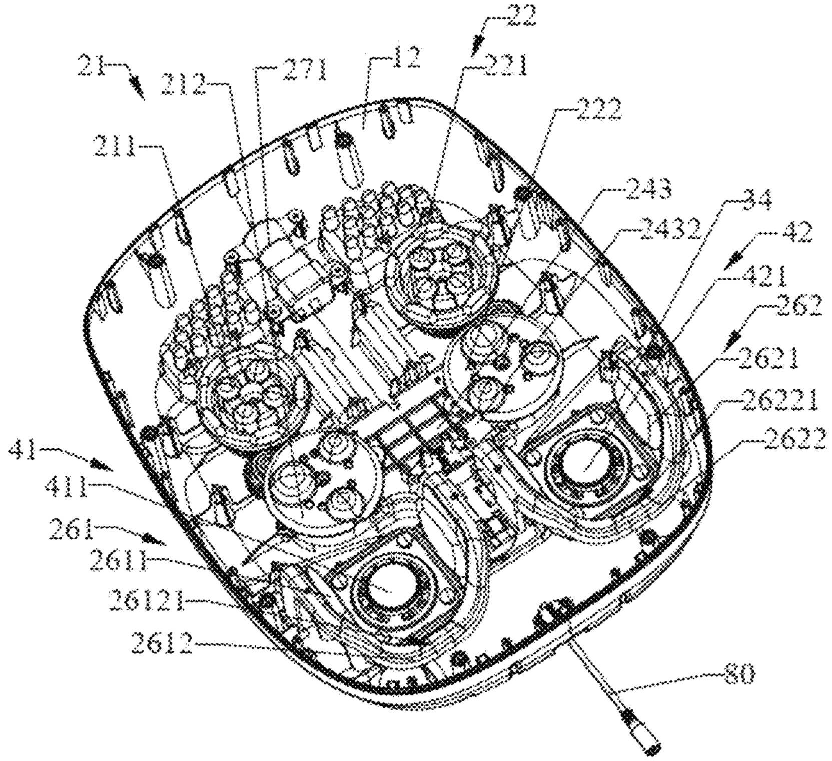
FIG. 6 is a third partial perspective view illustrating the foot massage device according to the above first embodiment of the present invention.

In one embodiment of the present invention, as shown in FIGS. 3, 5 and 6, the massage assembly 20 comprises a first massage part 21 and a second massage part 22. The first massage part 21 and the second massage part 22 mainly perform massage by kneading.

The specific structure of the first massage part 21 is not limited by the present invention. In one example of the present invention, the first massage part 21 comprises a first front massage disc 211 and a first rear massage disc 212. The first front massage disc 211 is located in front of the first rear massage disc 212, and has at least one protruding massage head, which is mainly used to massage the front part of the user's foot, for example, the toes. The first rear massage head has at least one protruding massage head. The second massage part 22 comprises a second front massage plate 221 and a second rear massage plate 222. The second front massage plate 221 is located in front of the second rear massage plate 222, and has at least one protruding massage head, which is mainly used to massage the front part of the user's foot, for example, the toes. The second rear massage head has at least one protruding massage head.

Figure 7:
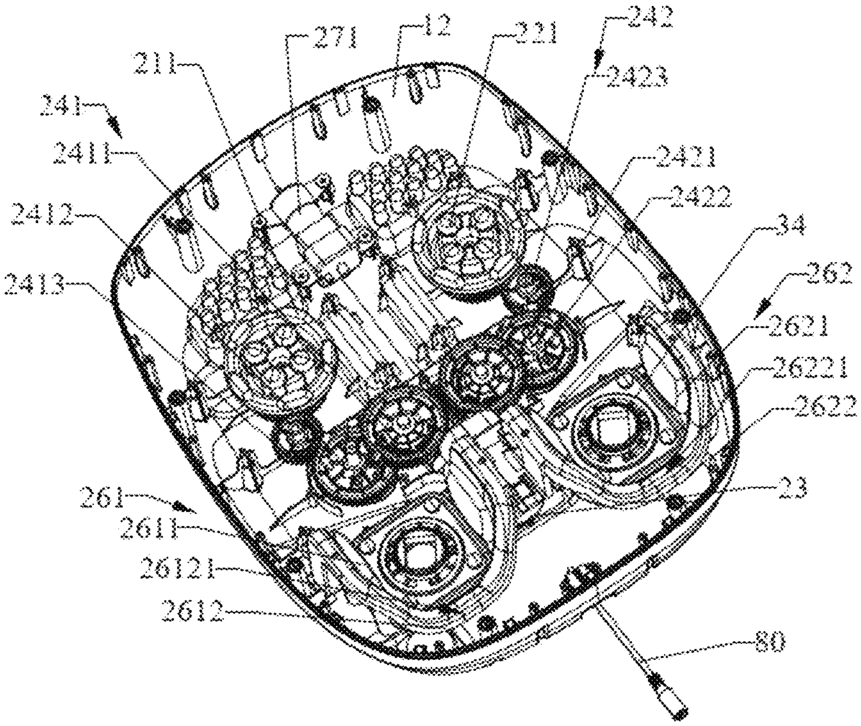
FIG. 7 is a fourth partial perspective view illustrating the foot massage device according to the above first embodiment of the present invention.
Figure 8:
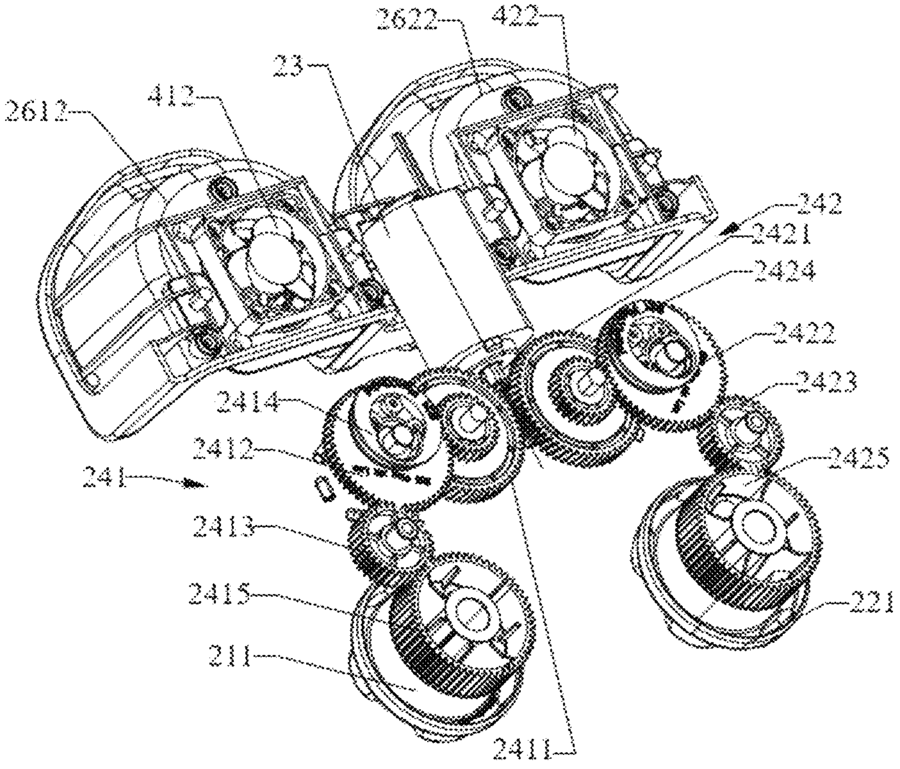
FIG. 8 is a fifth partial perspective view illustrating the foot massage device according to the above first embodiment of the present invention.
Figure 9:
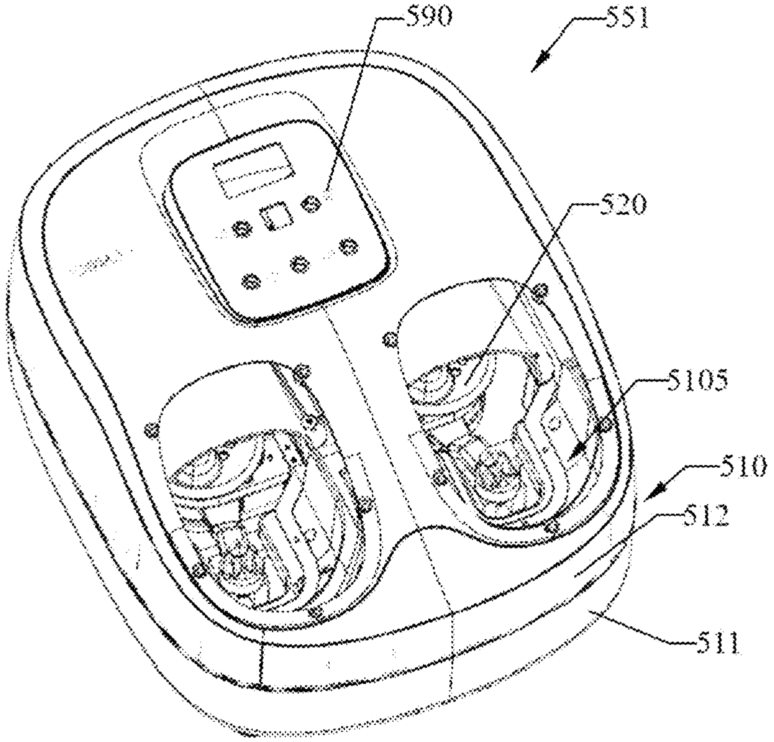
FIG. 9 is a perspective view of a foot massage device according to a second embodiment of the present invention.
Figure 10:
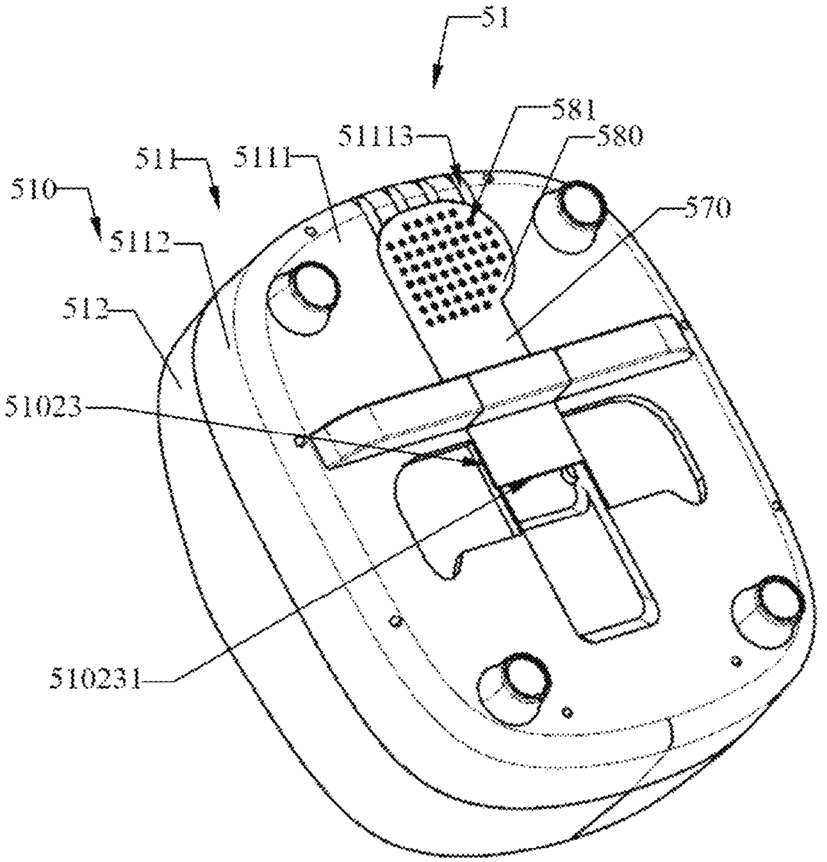
FIG. 10 is another perspective view of the foot massage device according to the above second embodiment of the present invention.

The massage assembly 20 further comprises at least one driving mechanism for driving the first massage part 21 and the second massage part 22 to move. In one example of the present invention, as shown in FIGS. 3, 7 and 8, the massage assembly 20 comprises at least one motor 23. At least one motor 23 is drivably connected to the first massage part 21 and/or the second massage part 22.

Specifically, as shown in FIG. 3, FIG. 7 and FIG. 8, the massage assembly 20 further comprises a first transmission component 241 and a second transmission component 242. The first transmission component 241 is transmissionably connected between the first massage part 21 and the at least one motor 23. The second transmission component 242 is transmissionably connected between the second massage part 22 and the at least one motor 23. The first transmission component 241, the second transmission component 242 and the at least one motor 23 form a driving component for driving the first massage part 21 and the second massage part 22.

The main function of the first transmission assembly 241 is to transmit the driving force provided by the motor 23 to the first massage part 21, and the specific structure is not limited by the present invention. In an example of the present invention, the first transmission component 241 comprises a first driving wheel 2411, a first driven wheel 2412, a first transition wheel 2413, a first eccentric cover 2414 and a first front rotating wheel 2415. The first rear massage disc 212 is mounted on the first driven wheel 2412. The first front massage disc 211 is mounted on the first front rotating wheel 2415. The first driving wheel 2411 is meshed with the rotating shaft of at least one of the motors 23, and the first driven wheel 2412 is meshed with the first driving wheel 2411. The first eccentric cover 2414 is mounted below the first driven wheel 2412 and is eccentrically arranged with the first driven wheel 2412. The first transition wheel 2413 is disposed between the first driven wheel 2412 and the first front rotating wheel 2415, and is respectively meshed with the first driven wheel 2412 and the first front rotating wheel 2415. When the rotating shaft of the motor 23 rotates, the motor 23 drives the first driving wheel 2411 meshed therewith to rotate, and then the first driven wheel 2412 meshed therewith is driven to rotate through the first driving wheel 2411, and at the same time, the first rear massage disc 212 mounted on the first driven wheel 2412 is driven to rotate through the first driven wheel 2412, and then the first transition wheel 2413 meshed therewith is driven to rotate through the first driven wheel 2412, so that the first front rotating wheel 2415 meshed therewith is driven to rotate through the first transition wheel 2413, and then the first front rotating wheel 2415 drives the first front massage disc 211 mounted on the first front rotating wheel 2415 to rotate.

The main function of the second transmission assembly 242 is to transmit the driving force provided by the motor 23 to the second massage part 22, and the specific structure is not limited by the present invention. In an example of the present invention, the second transmission assembly 242 comprises a second driving wheel 2421, a second driven wheel 2422, a second transition wheel 2423, a second eccentric cover 2424 and a second front rotating wheel 2425. The second rear massage disc 222 is mounted on the second driven wheel 2422, the second front massage disc 221 is mounted on the second front rotating wheel 2425. The second driving wheel 2421 is meshed with the rotating shaft of at least one of the motors 23. The second driven wheel 2422 is meshed with the second driving wheel 2421. The second eccentric cover 2424 is mounted below the second driven wheel 2422 and is eccentrically arranged with the second driven wheel 2422. The second transition wheel 2423 is disposed between the second driven wheel 2422 and the second front rotating wheel 2425, and is respectively meshed with the second driven wheel 2422 and the second front rotating wheel 2425. When the rotating shaft of the motor 23 rotates, the motor 23 drives the second driving wheel 2421 meshed therewith to rotate, and then the second driven wheel 2422 meshed with the second driving wheel 2421 is driven to rotate, and at the same time, the second driven wheel 2422 drives the second rear massage plate 222 mounted on the second driven wheel 2412 to rotate, and then the second driven wheel 2422 drives the second transition wheel 2423 meshed with the second driven wheel 2422 to rotate, so that the second transition wheel 2423 drives the second front rotating wheel 2425 meshed with the second transition wheel 2423 to rotate, and then the second front rotating wheel 2425 drives the second front massage plate 221 mounted on the second front rotating wheel 2425 to rotate.

The first transmission assembly 241 and the second transmission assembly 242 may be designed to be transmission-connected to the same motor 23, so that four massage discs may be driven by one motor 23, wherein the four massage discs are the first front massage disc 211, the first rear massage disc 212, the second front massage disc 221 and the second rear massage disc 222.

It should be understood that the first transmission assembly 241 and the second transmission assembly 242 can be designed to be drivably connected to different motors 23. It should also be understood that the first transmission assembly 241 and the second transmission assembly 242 can be implemented by other transmission structures.

As shown in FIGS. 3 and 6, a drive assembly mounting carrier 243 may be provided to mount the drive assembly via the drive assembly mounting carrier 243. The specific structure of the drive assembly mounting carrier 243 and the arrangement of the drive assembly are not limited by the present invention.

In an example of the present invention, the drive assembly mounting carrier 243 is mounted on the base 12, the drive assembly mounting carrier 243 has an upper mounting surface 2432 and a lower accommodation space 2431 located below the upper mounting surface 2432. The lower accommodation space 2431 is located between the upper mounting surface 2432 and the base 12. The motor 23, the first driving wheel 2411 of the first transmission assembly 241, the first driven wheel 2412, the first transition wheel 2413, the first eccentric cover 2414 and the second driving wheel 2421, the second driven wheel 2422, the second transition wheel 2423, and the second eccentric cover 2424 of the second transmission assembly 242 are accommodated in the lower accommodation space 2431 of the drive assembly mounting carrier 243. The motor 23 is located behind the first transmission assembly 241 and the second transmission assembly 242. The rotating shaft of the motor 23 is located between the first driving wheel 2411 and the second driving wheel 2421. The first rear massage disc 212 and the second rear massage plate 222 are installed above the upper installation surface 2432.

In one embodiment of the present invention, the massage assembly 20 can also use airbags to massage the foot. In one example of the present invention, airbags are provided at the instep and the heel. Correspondingly, as shown in FIG. 3 and FIG. 5, the massage assembly 20 further comprises a first foot cover component 251, a second foot cover component 252, a first heel massage component 261 and a second heel massage component 262. The first foot cover component 251 is provided at the first massage part 21, at least part of the structural cover is provided above the first massage part 21 and is provided with an airbag structure. The second foot cover component 252 is provided at the second massage part 22, at least part of the structural cover is provided above the second massage part 22 and is provided with an airbag structure. The first heel massage component 261 is provided at the rear of the first massage part 21 for massaging the peripheral side of the user's heel and is provided with an airbag structure, the second heel massage component 262 is provided at the rear of the second massage part 22 for massaging the peripheral side of the user's heel and is provided with an airbag structure.

Specifically, the first foot cover component 251 comprises a first instep airbag 2511, a first bottom sheet 2512 and a first mounting gasket 2513. The first instep airbag 2511 is covered above the first massage part 21. The first bottom sheet 2512 is fixedly arranged near the first massage part 21, and preferably, the first bottom sheet 2512 corresponding to the first front massage disc 211 and/or the first rear massage disc 212 is hollowed out, so that the first front massage disc 211 and/or the first rear massage disc 212 of the first massage part 21 are exposed above the first bottom sheet 2512, thereby allowing the force of the first massage part 21 to be transmitted to the user to a greater extent. The first bottom sheet 2512 is used to provide support and mounting position for the first foot cover component. Accordingly, the first foot cover component is mounted on the first bottom sheet 2512. The first mounting gasket 2513 is padded between the first bottom sheet 2512 and the first instep airbag 2511.

The outer periphery of the first instep airbag 2511 is at least partially fixed to the first bottom sheet 2512, and the first mounting gasket 2513 is padded between the first bottom sheet 2512 and the outer periphery of the first instep airbag 2511. A space suitable for accommodating the user's foot is formed between the portion within the outer periphery of the first instep airbag 2511 and the first bottom sheet 2512. When the user's foot is located in the space between the portion within the outer periphery of the first instep airbag 2511 and the first bottom sheet 2512, the user's foot is located between the first instep airbag 2511 and the first massage part 21, and the user's sole can be massaged by the first massage part 21, and the user's instep can be massaged by the first instep airbag 2511 as the first instep airbag 2511 expands and contracts. And the space size between the first instep airbag 2511 and the first bottom sheet 2512 can change with the expansion and contraction of the first instep airbag 2511, thereby satisfying feet of different sizes.

The first bottom sheet 2512 may be designed to be made of a flexible material, such as cloth, silica gel, etc. When the first bottom sheet 2512 is made of a flexible material, wear-resistant cloth may be selected.

The second foot mask assembly 252 comprises a second instep airbag 2521, a second bottom sheet 2522 and a second mounting gasket 2523. The second instep airbag 2521 is covered above the second massage part 22. The second bottom sheet 2522 is fixedly arranged near the second massage part 22, and preferably, the second bottom sheet 2522 corresponding to the second front massage plate 221 and/or the second rear massage plate 222 is hollowed out, so that the second front massage plate 221 and/or the second rear massage plate 222 of the second massage part 22 are exposed above the second bottom sheet 2522, so that the force of the second massage part 22 can be transmitted to the user to a greater extent. The second bottom sheet 2522 is used to provide support and mounting position for the second foot mask. Accordingly, the second foot mask is mounted on the second bottom sheet 2522. The second mounting gasket 2523 is padded between the second bottom sheet 2522 and the second instep airbag 2521.

The outer periphery of the second instep airbag 2521 is at least partially fixed to the second bottom sheet 2522, and the second mounting gasket 2523 is padded between the second bottom sheet 2522 and the outer periphery of the second instep airbag 2521. A space suitable for accommodating the user's foot is formed between the portion within the outer periphery of the second instep airbag 2521 and the second bottom sheet 2522. When the user's foot is located in the space between the portion within the outer periphery of the second instep airbag 2521 and the second bottom sheet 2522, the user's foot is located between the second instep airbag 2521 and the second massage part 22, the user's sole can be massaged by the second massage part 22, and the user's instep can be massaged by the second instep airbag 2521 as the second instep airbag 2521 expands and contracts. And the space size between the second instep airbag 2521 and the second bottom sheet 2522 can change as the second instep airbag 2521 expands and contracts, thereby satisfying feet of different sizes.

The second bottom sheet 2522 may be designed to be made of a flexible material, such as cloth, silica gel, etc. When the second bottom sheet 2522 is made of a flexible material, wear-resistant cloth may be selected.

The first heel massage component 261 comprises a first heel airbag 2611 and a first side ankle frame 2612. The first heel airbag 2611 is fixed to the rear of the first massage part 21 through the first side ankle frame 2612. The first side ankle frame 2612 is directly or indirectly fixedly arranged on the base 12. The first side ankle frame 2612 is used to accommodate the user's heel, that is, ankle, and at least partially forms a first heel placement position 26121. The first side ankle frame 2612 comprises a first ankle frame bottom wall 26124 and a first ankle frame side wall 26125. When the user uses the foot massage device 1 for massage, the first ankle frame bottom wall 26124 corresponds to the user's heel bone. The first ankle frame side wall 26125 extends upward from the first ankle frame bottom wall 26124, and encloses the first ankle frame bottom wall 26124 to form a first ankle cavity 26122. The first ankle cavity 26122 has a first side ankle cavity opening 26123. The first side ankle cavity opening 26123 faces forward, toward the first massage part 21. The first heel airbag 2611 is disposed on the first ankle frame side wall 26125 to massage the user's heel.

The second heel massage component 262 comprises a second heel airbag 2621 and a second side ankle frame 2622. The second heel airbag 2621 is fixed to the rear of the second massage part 22 through the second side ankle frame 2622. The second side ankle frame 2622 is directly or indirectly fixedly arranged on the base 12. The second side ankle frame 2622 is used to accommodate the user's heel, that is, ankle, and at least partially forms a second heel placement position 26221. The second side ankle frame 2622 comprises a second ankle frame bottom wall 26224 and a second ankle frame side wall 26225. When the user uses the foot massage device 1 for massage, the second ankle frame bottom wall 26224 corresponds to the user's heel bone. The second ankle frame side wall 26225 extends upward from the second ankle frame bottom wall 26224, and encloses the second ankle frame bottom wall 26224 to form a second ankle cavity 26222. The second ankle cavity 26222 has a second side ankle cavity opening 26223. The second side ankle cavity opening 26223 faces forward, toward the second massage part 22. The second heel airbag 2621 is disposed on the second ankle frame side wall 26225 to massage the user's heel.

Correspondingly, as shown in FIG. 3, the massage assembly 20 further comprises at least one air pump 271 and at least one control valve 272. The first instep airbag 2511, the second instep airbag 2521, the first heel airbag 2611, and the second heel airbag 2621 are respectively ventilatively connected to at least one air pump 271. The first instep airbag 2511, the second instep airbag 2521, the first heel airbag 2611, and the second heel airbag 2621 can be respectively ventilatively connected to the same air pump 271, or the first instep airbag 2511, the second instep airbag 2521, the first heel airbag 2611, and the second heel airbag 2621 can be respectively ventilatively connected to different air pumps 271. At least one control valve 272 is connected to at least one air pump 271. One control valve 272 may be configured for each air pump 271, or different control valves 272 may be configured for each air pump 271. The control valve 272 may be a solenoid valve.

The massage assembly 20 can also perform heat therapy on the foot. Accordingly, the massage assembly 20 also comprises at least one heating unit. In an example of the present invention, as shown in FIG. 3, the massage assembly 20 also comprises a first heating unit 281, a second heating unit 282, a third heating unit 283 and a fourth heating unit 284. Specifically, the first heating unit 281 is arranged below the first rear massage disc 212, the second heating unit 282 is arranged below the second rear massage plate 222, the third heating unit 283 is arranged below the first instep airbag 2511, and the fourth heating unit 284 is arranged below the second instep airbag 2521.

In one embodiment of the present invention, as shown in FIG. 1, FIG. 3 and FIG. 4, the foot massage device 1 further comprises a foot placement cover 31 for accommodating the user's feet. The foot placement cover 31 comprises a first cover 311 and a second cover 312. The first cover 311 has a first cover opening 3111, the second cover 312 has a second cover opening 3121. The user's foot can be inserted into the first cover 311 from the first cover opening 3111, and can be inserted into the second cover 312 from the second cover opening 3121. At least a portion of the first cover body 311 and at least a portion of the second cover body 312 can be made of flexible material, for example, cloth or silicone, so that the forces of the first massage part 21, the second massage part 22, the first instep airbag 2511, and the second instep airbag 2521 are more effectively transferred to the user's feet, the heat of the first heating unit 281, the second heating unit 282, the third heating unit 283, and the fourth heating unit 284, and the cooling or heating effect of the temperature control assembly 40 are more effectively transferred to the user's feet.

The foot placement cover 31 can be installed on the housing 10. At least a portion of the first cover 311 corresponds to the first heel placement position 26121, and at least a portion of the first massage part 21. At least a portion of the second cover 312 corresponds to the second heel placement position 26221, and at least a portion of the second massage part 22.

The specific installation method of the foot placement cover 31 is not limited by the present invention. In an example of the present invention, one end of the first cover 311 is fixed to the upper cover 11, wherein the first cover opening 3111 of the first cover 311 of the first cover 311 is fixed to the upper cover 11 and corresponds to the foot entrance 101 of the upper cover 11, the second cover opening 3121 of the second cover 312 of the second cover 312 is fixed to the upper cover 11 and corresponds to the foot entrance 101 of the upper cover 11. The first cover 311 first extends downward from the upper cover 11 to the first side ankle frame 2612, reaching the first heel placement position 26121, and then extends forward to between the first instep airbag 2511 and the first massage part 21. The second cover 312 first extends downward from the upper cover 11 to the second side ankle frame 2622 and reaches the second heel placement position 26221, and then extends forward to between the second instep airbag 2521 and the second massage part 22.

More specifically, as shown in FIG. 3, the foot massage device 1 further comprises a cover support frame 32 and a cover fixing ring 33. The foot cover 31 is fixed to the upper cover 11 through the cover support frame 32 and the cover fixing ring 33. The cover support frame 32 is installed below the upper cover 11. The cover fixing ring 33 is located above or below the outer periphery of the cover support frame 32. One end of the first cover 311 can be clamped between the cover support frame 32 and the cover fixing ring 33. The cover support frame 32 comprises a first upper ankle entrance 321, a second upper ankle entrance 322, and a middle support strip 323 located between the first upper ankle entrance 321 and the second upper ankle entrance 322. The first cover opening 3111 of the first cover 311 corresponds to the first upper ankle entrance 321, and the second cover opening 3121 of the second cover 312 corresponds to the second upper ankle entrance 322. The first cover 311 extends from the first upper ankle entrance 321 into the first side ankle frame 2612, the first instep airbag 2511 and the first massage part 21 in sequence. The second cover 312 extends from the second upper ankle entrance 322 into the second side ankle frame 2622, the second instep airbag 2521 and the second massage part 22 in sequence.

Two cover fixing members 34 may also be provided to fix the portion of the first cover 311 corresponding to the first heel placement position 26121 to the first heel placement position 26121, and to fix the portion of the second cover 312 corresponding to the second heel placement position 26221 to the second heel placement position 26221.

In particular, in the embodiment of the present invention, the foot massage device 1 is capable of cooling. Thanks to its cooling therapy function, even in a high temperature environment, it can lower the user's body temperature, reduce the user's feeling of stuffiness, and improve the user's experience, accordingly, the foot massage device 1 of the present invention can be used in areas with higher temperatures, such as tropical areas.

Accordingly, the foot massage device 1 comprises at least one temperature control assembly 40. Further, in the embodiment of the present invention, the temperature control assembly 40 is arranged at the position where the heel is placed, which can enhance the cold compress effect on the heel and help relieve tendon inflammation, tendon inflammation, etc.

Accordingly, the foot massage device 1 has at least one heel placement position, wherein the heel placement position is suitable for placing the heel of the user, and the temperature control assembly 40 is adjacent to the heel placement position. The temperature control assembly 40 comprises at least one refrigerator, which is configured to at least partially cool in a cooling mode.

In one embodiment of the present invention, the refrigerator is disposed adjacently below the heel placement position. In one example of the application, the foot massage device 1 has two heel placement positions, the two heel placement positions are the first heel placement position 26121 and the second heel placement position 26221. As shown in FIG. 3, the foot massage device 1 comprises two temperature control assemblies 40, the two temperature control assemblies 40 are the first temperature control assembly 41 and the second temperature control assembly 42. The first temperature control assembly 41 comprises a first refrigerator 411, the second temperature control assembly 42 comprises a second refrigerator 421. The first refrigerator 411 is disposed below the first heel placement position 26121, the second refrigerator 421 is disposed below the second heel placement position 26221. Specifically, the first refrigerator 411 and the second refrigerator 421 can be mounted on the first ankle frame bottom wall 26124 and the second ankle frame bottom wall 26224 respectively.

Accordingly, the present invention configures a temperature control assembly 40 for each foot placement position, so that, compared with two foot placement positions sharing one temperature control assembly 40, cold air or hot air can be easily diffused to each foot placement position. For example, the first refrigerator 411 of the first temperature control assembly 41 is set below the first heel placement position 26121, so that the cold air generated by the first temperature control assembly 41 can be easily diffused to its corresponding position for placing one foot, that is, the first ankle cavity 26122 and the space above the first massage part 21, the second refrigerator 421 of the second temperature control assembly 42 is set below the second heel placement position 26221, so that the cold air generated by the second temperature control assembly 42 can be easily diffused to its corresponding position for placing the other foot, that is, the second ankle cavity 26222 and the space above the second massage part 22.

In one embodiment of the present invention, the refrigerator can not only cool but also heat, so that the foot massage device 1 can switch between cooling mode and heating mode to meet the different needs of users in different scenarios. Accordingly, the refrigerator is also configured to at least partially heat in the heating mode.

Both the first refrigerator 411 and the second refrigerator 421 can be implemented as a semiconductor refrigerator (Thermoelectric cooler), wherein the semiconductor refrigerator is a device that uses the thermoelectric effect of a semiconductor to produce cold energy, also known as a thermoelectric cooler, and its cold end and hot end will change with the change of the direction of the current. As shown in FIG. 3, the first refrigerator 411 comprises a first cooling plate 4111, a first upper heat conduction plate 4112 and a first lower heat conduction plate 4113, wherein the first upper heat conduction plate 4112 is located above the first cooling plate 4111, and the first lower heat conduction plate 4113 is located below the first cooling plate 4111. In the cooling mode, the upper end of the first cooling plate 4111 cools and the lower end heats. In the heating mode, the upper end of the first cooling plate 4111 heats and the lower end cools.

The second refrigerator 421 comprises a second cooling plate 4211, a upper heat conduction plate 4212, and a second lower heat conduction plate 4213, wherein the second upper heat conduction plate 4212 is located above the second cooling plate 4211, and the second lower heat conduction plate 4213 is located below the second cooling plate 4211. In cooling mode, the upper end of the second cooling plate 4211 cools and the lower end heats. In heating mode, the upper end of the second cooling plate 4211 heats and the lower end cools.

It should be understood that the first refrigerator 411 and/or the second refrigerator 421 may also be only for cooling.

It should also be understood that the temperature control assembly 40 can generate heat by other means, such as an electric heater. In other words, the temperature control assembly 40 can perform cooling and heating respectively by using different types of components, for example, using a first type of component to achieve cooling and using a second type of component to achieve heating.

In order to enhance the cooling or heating effect of the temperature control assembly 40, the present invention is also provided with a ventilation component, for example, a fan, which can not only increase the cold air diffusion speed and/or hot air diffusion speed, and increase the cold air diffusion area and/or hot air diffusion area to a certain extent, it can also alleviate the physical discomfort and embarrassment caused by the user's foot sweat, reduce the user's feeling of stuffiness and humidity in high temperature and humid environments, and improve the user's experience.

Correspondingly, the temperature control assembly 40 further comprises at least one fan, which is adjacent to the refrigerator, for example, the fan can be arranged below the refrigerator. The fan is configured to blow air upwards or suck air downwards when in operation.

When the fan is configured to blow air upwards, and the refrigerator is in cooling mode, when the upper end of the refrigerator is cooling and the lower end is heating, the fan can cause the cold air to diffuse upwards and forwards. When the fan is configured to blow air upwards, and the refrigerator is in heating mode, when the upper end of the refrigerator is heating and the lower end is cooling, the fan can cause the hot air to diffuse upwards and forwards. When the fan is configured to suck air downwards, and the refrigerator is in cooling mode, when the upper end of the refrigerator is cooling and the lower end is heating, the fan can cause the hot air to diffuse downwards and then diffuse to the outside. When the fan is configured to suck air downwards, and the refrigerator is in heating mode, when the upper end of the refrigerator is heating and the lower end is cooling, the fan can cause the cold air to diffuse downwards and then diffuse to the outside.

Figure 2:
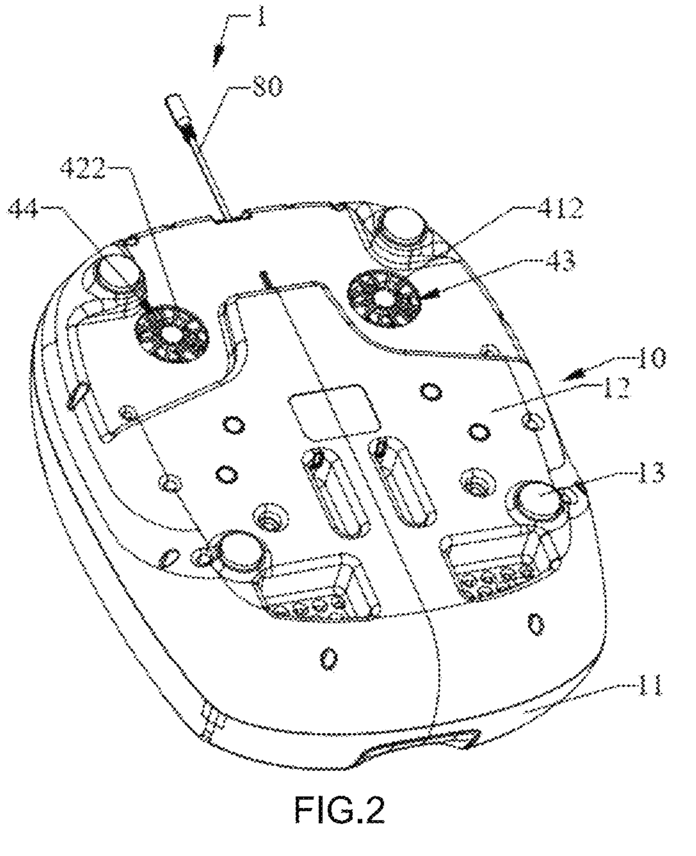
FIG. 2 is another perspective view of the foot massage device according to the above first embodiment of the present invention.

In an example of the present invention, as shown in FIG. 2, FIG. 3 and FIG. 8, the first temperature control assembly 41 further comprises a first fan 412, the second temperature control assembly 42 further comprises a second fan 422. The first fan 412 is disposed below the first refrigerator 411, and the second fan 422 is disposed below the second refrigerator 421. The first fan 412 is configured to blow air upward or suck air downward in a working state. The second fan 422 is configured to blow air upward or suck air downward in a working state.

It should be understood that the fan can be replaced by a negative pressure pump, in other words, a negative pressure pump can be used for heat dissipation. Accordingly, the first fan 412 can be replaced by a first negative pressure pump, and the second fan 422 can be replaced by a second negative pressure pump.

Furthermore, the temperature control assembly 40 further comprises at least one vent structure, which is integrally formed on the housing 10 or detachably disposed on the housing 10.

In one example of the present invention, as shown in FIG. 2, the foot massage device 1 comprises two vent structures, which are a first vent structure 43 and a second vent structure 44. The first vent structure 43 corresponds to the first fan 412 in the height direction of the foot massage device 1, and the second vent structure 44 corresponds to the second fan 422 in the height direction of the foot massage device 1. Specifically, the first vent structure 43 can be arranged below the first fan 412, the second vent structure 44 can be arranged below the second fan 422. The first vent structure 43 is integrally formed with the housing 10, or is detachably arranged on the housing 10, the second vent structure 44 is integrally formed with the housing 10, or is detachably arranged on the housing 10.

In the embodiment of the present invention, the foot massage device 1 further comprises a circuit board 50, a power cord 80 and an intelligent control module. The power cord 80, the temperature control assembly 40 (including the first refrigerator 411, the second refrigerator 421, the first fan 412, the second fan 422), the remote controller 60, the motor 23, the air pump 271, the control valve 272, the indicator light 70 and the intelligent control module are connected to the circuit board 50. Specifically, the intelligent control module is mainly used to control the working state of the foot massage device 1.

In one embodiment of the present invention, the intelligent control module comprises a temperature controller, a temperature sensor and a voice control module.

The temperature sensor is disposed in the housing 10, and is used to detect the overall temperature inside the foot massage device 1 or the temperature at a specific location. The temperature sensor may be a negative temperature coefficient (NTC) sensor. The temperature sensor may also be a positive temperature coefficient (PTC) sensor. The temperature controller is connected to the temperature sensor, and is used to determine a temperature adjustment strategy based on a signal from the temperature sensor. For example, when the temperature sensor is a positive temperature coefficient sensor, and no signal from the positive temperature coefficient sensor is transmitted to the temperature controller, it may be determined that the temperature is too high, and the current of the circuit where the positive temperature coefficient sensor is located should be limited to control the temperature.

The voice module is used to receive the user's voice information so that the user can control the working state of the foot massage device 1 through voice.

A health detection module can also be added to detect the user's physical indicators, such as body fat percentage, heart rate, etc.

Accordingly, the foot massage device 1 according to the embodiment of the present invention is explained. The foot massage device 1 has a cooling therapy function, and the temperature control assembly 40 for cooling is arranged at a specific position, which can enhance the cooling effect on a specific part of the foot, for example, the heel part, wherein the heel part is closely related to the calf muscles, the sole muscles, the tendons of the foot, and the fascia of the foot.

As shown in FIGS. 9 to 19, a foot massage device 51 according to a second embodiment of the present invention is illustrated. The foot massage device 51 of the present invention has a cooling therapy function, and benefits from the cooling therapy function, can perform cooling massage on the user after the user exercises, relieve muscle tension, and reduce lactic acid accumulation, it can also reduce the user's stuffiness in a high temperature environment, thereby improving the user's body sensation, it is also suitable for use in areas with higher temperatures, such as tropical areas.

Specifically, as shown in FIGS. 9 to 12, the foot massage device 51 comprises a mounting housing 510, at least one massage unit 520, and a refrigeration unit 530. The mounting housing 510 is used to provide mounting positions for the massage unit 520, the refrigeration unit 530 and other components. The massage unit 520 is used to massage the user, for example, kneading, laser, magnetic therapy, etc. The refrigeration unit 530 can be used for refrigeration. Accordingly, the massage unit 520 is mounted on the mounting housing 510, the refrigeration unit 530 is mounted on the mounting housing 510.

In the present invention, the specific form of the mounting housing 510 is not limited by the present invention. In an example of the present invention, the mounting housing 510 comprises a mounting base 511 and a mounting cover 512. The mounting cover 512 and the mounting base 511 are buckled together to form a mounting cavity.

In this example, the mounting base 511 comprises a mounting base plate 5111 and a base peripheral wall 5112. The base peripheral wall 5112 extends upward from the mounting base plate 5111 along the circumference of the mounting base plate 5111. The mounting base plate 5111 and the base peripheral wall 5112 enclose a base cavity 5101. The upper end of the base peripheral wall 5112 forms a base opening 5102 of the mounting base 511. The mounting cover 512 comprises a mounting cover plate 5121 and a cover peripheral wall 5122. The cover peripheral wall 5122 extends downward from the mounting cover plate 5121 along the circumference of the mounting cover plate 5121. The mounting cover plate 5121 and the cover peripheral wall 5122 enclose a cover cavity 5103. The lower end of the cover peripheral wall 5122 forms a cover opening 5104 of the mounting cover 512. The cover cavity 5103 is opposite to and connected to the base cavity 5101 to form the installation cavity. The installation cover plate 5121 has at least one insertion opening 5105, wherein the insertion opening 5105 is connected to the base cavity 5101, allowing a user to enter the base cavity 5101 and then reach the massage unit 520.

It should be understood that in other examples of the present invention, the mounting shell 510 can be implemented in other ways. For example, the mounting base 511 only has the mounting base plate 5111, without the base peripheral wall 5112, for another example, the mounting cover body 512 only has the mounting cover plate 5121, without the cover body peripheral wall 5122, for another example, the mounting shell 510 only has the mounting base 511, without the mounting cover body 512.

As shown in FIGS. 13 to 16 and 18, in the embodiment of the present invention, the mounting base 511 has a rear side portion 5110 and a front side portion 5120 opposite to each other in a first direction D1, and also has a first side portion 5130 and a second side portion 5140 opposite to each other in a second direction D2, and a middle portion 5150 between the first side portion 5130 and the second side portion 5140. The first direction D1 and the second direction D2 are perpendicular to each other.

In the embodiment of the present invention, the massage unit 520 is installed on the mounting base 511. The foot massage device 51 comprises two groups of massage units 520. The two groups of massage units 520 are respectively a first group of massage units 5210 and a second group of massage units 5220. The first group of massage units 5210 comprises at least one massage unit 520. The second group of massage units 5220 comprises at least one massage unit 520. The number of massage units 520 in each group of massage units 520 is not limited to the present invention. For example, the number of massage units 520 in each group of massage units 520 may be 1, 2, 3, or more.

Preferably, the number of massage units 520 of the two groups of massage units 520 is consistent and symmetrically arranged to ensure the working consistency of the two groups of massage units 520. For example, in an example of the present invention, each group of massage units 520 comprises three massage units 520. The three massage units 520 are respectively a first massage unit 521, a second massage unit 522 and a third massage unit 523. In this example, the position distribution of the first massage unit 521, the second massage unit 522 and the third massage unit 523 is consistent with the position distribution of the user's toes, soles and heels. The first massage unit 521 corresponds to the user's toes, that is, the toe massage unit, the second massage unit 522 corresponds to the user's soles, that is, the sole massage unit, the third massage unit 523 corresponds to the user's heels, that is, the heel massage unit.

It should be understood that in other examples, the position distribution of each massage unit 520 in each group of massage units 520 can be implemented in other ways, the number of massage units 520 in each group of massage units 520 can also be other values.

The foot massage device 51 has at least one massage cavity 51010, the massage cavity 51010 is suitable for accommodating the user's foot, and the massage unit 520 is installed in the massage cavity 51010. In an example of the present invention, the foot massage device 51 has two massage cavities 51010, wherein the two massage cavities 51010 are respectively a first massage cavity 51011 and a second massage cavity 51012. The first group of massage units 5210 is installed in the first massage cavity 51011, the second group of massage units 5220 is installed in the second massage cavity 51012. Each massage cavity 51010 has a cavity top opening 510101, through which the user can reach into the massage cavity 51010.

Specifically, the foot massage device 51 also comprises two foot covers 513 and two ankle frames 514. One foot cover 513, one ankle frame 514 and the mounting base 511 enclose the first massage cavity 51011, another foot cover 513, another ankle frame 514 and the mounting base 511 enclose the second massage cavity 51012. The ankle frame is suitable for the user's ankle to rest against. The two foot covers 513 are respectively covered above the first group of massage units 5210 and the second group of massage units 5220. The two ankle frames 514 are respectively arranged on the rear sides of the two foot covers 513. In one example of the present invention, the two ankle frames 514 are integrally formed and mounted on the rear side 5110 of the mounting base 511.

Preferably, the foot massage device 51 further comprises a washer 515. The washer 515 is placed between the mounting base 511 and the foot cover 513. The washer 515 is wear-resistant and has certain friction properties, and can prevent relative sliding between the mounting base 511 and the foot cover 513 to a certain extent.

Each of the massage cavitys 51010 has at least one chamber top opening 510101 and at least one chamber side opening 510102. The chamber top opening 510101 is formed on the top side of the massage cavity 51010. The chamber side opening 510102 is formed on the first side and/or the second side of the massage cavity 51010. The first side and the second side of the massage cavity 51010 are opposite to each other in the second direction D2. The first side of the massage cavity 51010 is consistent with the side where the first side portion 5130 of the mounting base 511 is located, the second side of the massage cavity 51010 is consistent with the side where the second side portion 5140 of the mounting base 511 is located.

The formation method of the cavity top opening 510101 and the cavity side opening 510102 is not limited by the present invention. In an example of the present invention, the two ankle frames 514 are spaced apart from the two foot covers 513 in the first direction D1. The interval between the ankle frame 514 and the foot cover 513 forms the cavity top opening 510101. The two foot covers 513 are spaced apart from the mounting base 511 in the height direction D3 of the foot massage device 51, that is, in the up and down direction. The interval between the foot cover 513 and the mounting base 511 forms the cavity side opening 510102.

In the embodiment of the present invention, the massage unit 520 is a kneading massage unit, that is, a massage unit for performing a kneading massage on the user. Accordingly, each of the massage units 520 has at least one protrusion 201, so that the user feels pressed when placing the foot on the massage unit 520.

In the embodiment of the present invention, the foot massage device 51 further comprises a driving unit 540. The driving unit 540 is drivably connected to the massage unit 520, so that the massage unit 520 is movably mounted on the mounting base 511, thereby enabling the massage unit 520 to perform a kneading massage on the user.

Specifically, the driving unit 540 is installed on the mounting base 511. The driving unit 540 comprises a driving motor 541 and a transmission assembly 542. The transmission assembly 542 is drivably connected between the driving motor 541 and the massage unit 520. The transmission assembly 542 is drivably connected between the driving motor 541 and the first group of massage units 5210, and between the driving motor 541 and the second group of massage units 5220. More specifically, the first group of massage units 5210 and the second group of massage units 5220 are located on both sides of the driving motor 541. The driving motor 541 is installed on the two-way middle part 5150 of the mounting base 511, the first group of massage units 5210 is located on the first side part 5130 of the mounting base 511, and the second group of massage units 5220 is located on the second side part 5140 of the mounting base 511.

Figure 17:
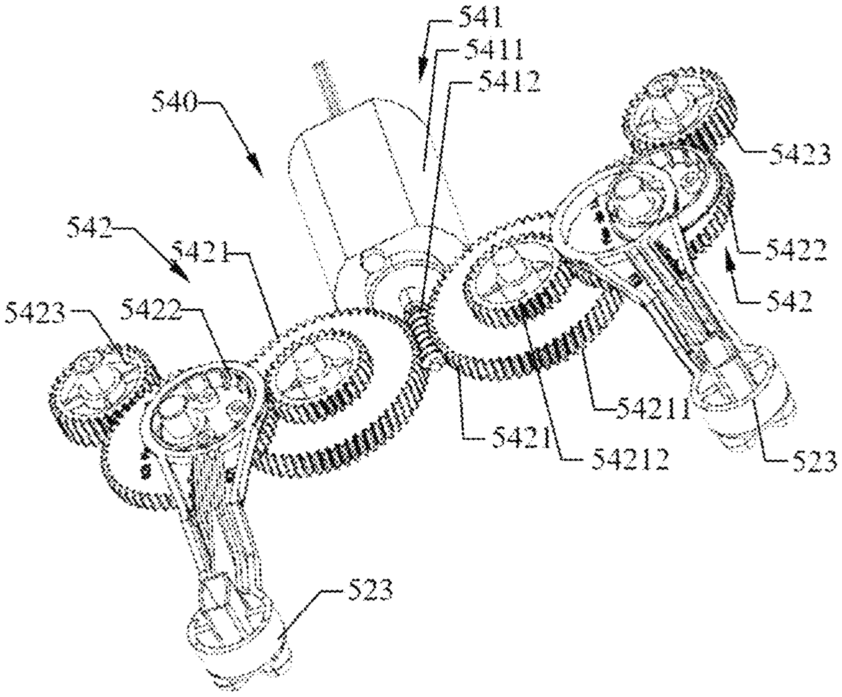
FIG. 17 is another partial perspective view illustrating the foot massage device according to the above second embodiment of the present invention.
Figure 18:
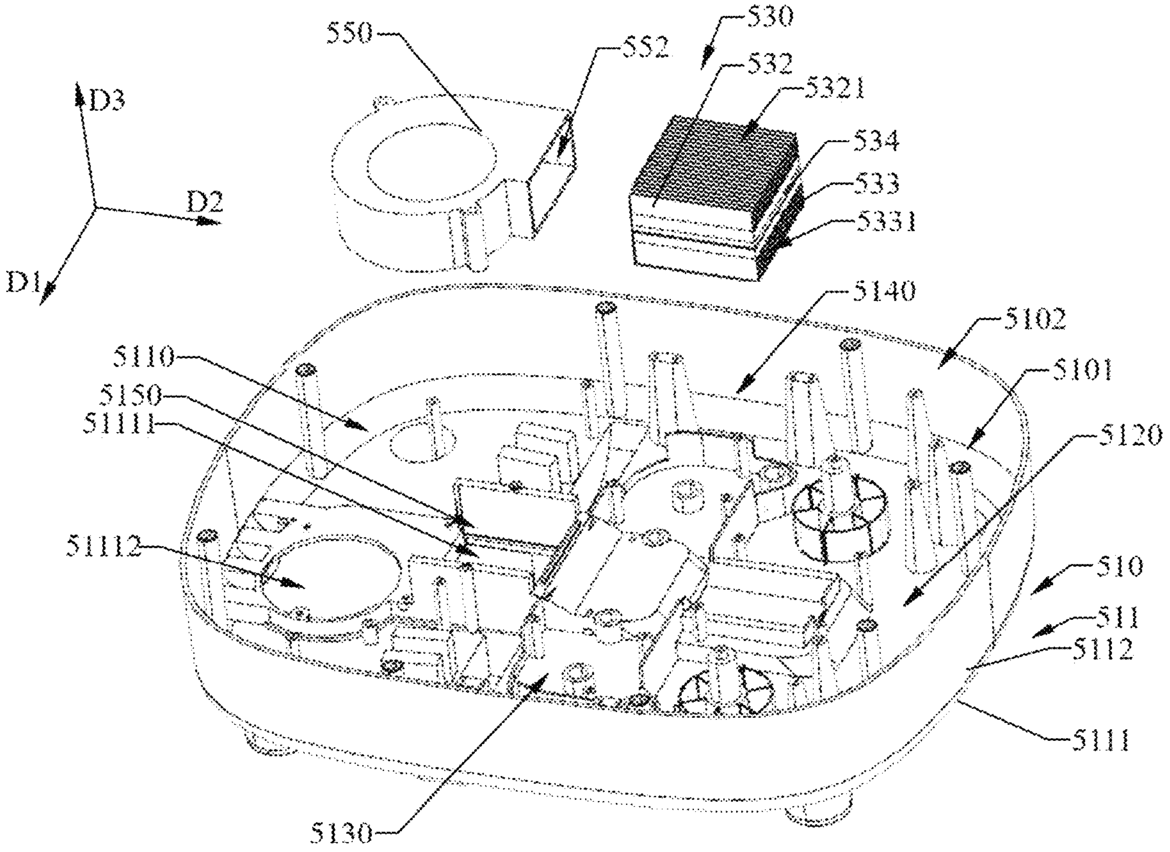
FIG. 18 is a third partial exploded view illustrating the foot massage device according to the above second embodiment of the present invention.

The specific configuration of the transmission assembly 542 is not limited to the present invention. In an example of the present invention, the transmission assembly 542 comprises two groups of transmission components. The two groups of transmission components are symmetrically arranged. As shown in FIGS. 12 and 15, and FIGS. 16 and 17, each group of transmission components comprises a first transmission gear 5421, a second transmission gear 5422, a third transmission gear 5423, and a fourth transmission gear 5424. The drive motor 541 comprises a motor body 5411 and a motor shaft 5412, and the motor shaft 5412 is rotatably mounted on the motor body 5411. The first transmission gear 5421 is meshed with the motor shaft 5412, the second transmission gear 5422 is meshed with the first transmission gear 5421, the third transmission gear 5423 is meshed with the second transmission gear 5422, and the fourth transmission gear 5424 is meshed with the third transmission gear 5423. As shown in FIG. 17, the first transmission gear 5421 has a first gear tooth 54211 and a second gear tooth 54212. The second gear tooth 54212 is below the first gear tooth 54211. The first gear tooth 54211 of the first transmission gear 5421 is meshed with the motor shaft 5412, the second transmission gear 5422 is meshed with the second gear tooth 54212 of the first transmission gear 5421.

In this example, the first massage unit 521 is rotatably connected to the fourth transmission gear 5424, so that when the motor shaft 5412 rotates, the fourth transmission gear 5424 is driven to rotate through the first transmission gear 5421, the second transmission gear 5422 and the third transmission gear 5423, thereby driving the first massage unit 521 to rotate. The second massage unit 522 is rotatably connected to the second transmission gear 5422, so that when the motor shaft 5412 rotates, the second transmission gear 5422 is driven to rotate through the first transmission gear 5421, thereby driving the second massage unit 522 to rotate. The third massage unit 523 is connected to the second transmission gear 5422. In this example, one end of the third massage unit 523 is rotatably connected to the second transmission gear 5422 and does not rotate with the rotation of the second transmission gear 5422, and the other end is fixed to the mounting base 511.

It should be understood that the transmission assembly 542 can be implemented in other ways. For example, the number of transmission gears can be set to other values, that is, not equal to 4, each massage unit 520 is connected to the transmission gear in other corresponding ways.

It is worth mentioning that in the embodiment of the present invention, the refrigeration unit 530 can be used for both cooling and heating. In this way, the user can switch between the heating mode and the cooling mode according to the needs.

Specifically, the refrigeration unit 530 is configured to work switchably between a refrigeration mode and a heating mode, wherein the refrigeration unit 530 is a semiconductor refrigeration unit. The semiconductor refrigeration unit can be controlled to switch between a refrigeration state and a heating state by controlling the direction of the current. The degree of refrigeration or the degree of heating can be controlled by controlling the magnitude of the current.

The refrigeration unit 530 comprises a semiconductor refrigeration plate 531, a first thermal diffusion part 532, and a second thermal diffusion part 533. The first thermal diffusion part 532 is formed on the upper side of the semiconductor refrigeration plate 531, the second thermal diffusion part 533 is formed on the lower side of the semiconductor refrigeration plate 531. When the refrigeration unit 530 is in a cooling mode, the upper side of the semiconductor refrigeration plate 531 is cooled, heat is transferred between the first thermal diffusion part 532 and the upper side of the semiconductor refrigeration plate 531, and the air near the first thermal diffusion part 532 is cooled, the lower side of the semiconductor refrigeration plate 531 is heated, the second thermal diffusion part 533 is transferred between the lower side of the semiconductor refrigeration plate 531, and the heat of the air near the second thermal diffusion part 533 is diffused. When the refrigeration unit 530 is in the heating mode, the upper side of the semiconductor refrigeration plate 531 generates heat, heat is transferred between the first thermal diffusion part 532 and the upper side of the semiconductor refrigeration plate 531, and heat diffusion of the air near the first thermal diffusion part 532 is achieved, the lower side of the semiconductor refrigeration plate 531 is cooled, heat is transferred between the second thermal diffusion part 533 and the lower side of the semiconductor refrigeration plate 531, and cooling of the air near the second thermal diffusion part 533 is achieved.

Preferably, the refrigeration unit 530 further comprises a heat insulating sheet 534, and the heat insulating sheet 534 is sleeved outside the semiconductor refrigeration sheet 531. The heat insulating sheet 534 is made of a material with poor thermal conductivity, for example, ethylene-vinyl acetate copolymer (abbreviated as: EVA), silicone, rubber, TPE (thermoplastic elastomer), TPR (thermoplastic rubber).

The mounting base plate 5111 has a refrigeration mounting opening 51111. The refrigeration mounting opening 51111 penetrates the mounting base plate 5111. The refrigeration unit 530 is mounted on the refrigeration mounting opening 51111. The second thermal diffusion part 533 of the refrigeration unit 530 passes through the refrigeration mounting opening 51111, so that the air in the foot massage device 51 can diffuse from the second thermal diffusion part 533 to the outside.

The driving motor 541 and the refrigeration unit 530 of the foot massage device 51 are arranged in a specific manner so that the foot massage device 51 has a refrigeration function while not affecting the operation of the original massage unit 520.

Specifically, the driving motor 541 and the refrigeration unit 530 are located in the middle portion 5150 of the two directions, the refrigeration unit 530 is located at the rear side of the driving motor 541. The refrigeration unit 530 is arranged at the rear side portion 5110 of the mounting base 511, most of the massage unit 520 and the driving motor 541 are arranged at the front side portion 5120 of the mounting base 511. In this way, in the first direction D1, the refrigeration unit 530 mainly occupies the rear side portion 5110, and does not occupy the original setting space of the massage portion 520, so that the drive motor 541 and most of the massage portions 520 can be concentratedly distributed on the front side portion 5120 of the mounting base 511, for example, the first massage portion 521 and the second massage portion 522, in the second direction D2, the drive motor 541 and the refrigeration unit 530 mainly occupy the middle portion 5150, and do not occupy the original setting space of the massage portion 520, so that the two groups of massage portions 520 are distributed on the two sides of the mounting base 511, which can meet the usage habits of most users and correspond to the habitual relative positions of the two feet of the user.

It is worth mentioning that the foot massage device 51 also has a ventilation function. In this way, the foot massage device 51 is more friendly to users with foot sweat, and can relieve the user's physical discomfort and embarrassment caused by foot sweat, thereby reducing the user's feeling of stuffiness in a high temperature environment, and relieving the user's feeling of dampness in a humid environment, thereby improving the user's physical sensation in a high temperature environment or a humid environment, it can also use the ventilation function to diffuse cold air in the cooling mode and diffuse hot air in the heating mode, thereby making it possible to play a cooling role even if there is no refrigeration component installed, and to play a heating role even if there is no heating component installed.

Specifically, the foot massage device 51 also has a ventilation channel 51020, wherein the ventilation channel 51020 is connected between the outside world and the foot massage device 51. The ventilation channel 51020 comprises an inner ventilation channel 51022 and an outer ventilation channel 51021. The inner ventilation channel 51022 is used to achieve inward diffusion of the air of the foot massage device 51 with the help of the outside air. The outer ventilation channel 51021 is used to achieve outward diffusion of the air of the foot massage device 51 with the help of the outside air. The inner ventilation channel 51022 is connected between the outside world and the massage cavity 51010, that is, the inner ventilation channel 51022 is connected between the outside world and the first massage cavity 51011, and between the outside world and the second massage cavity 51012.

The ventilation channel 51020 passes through the refrigeration unit 530 and the massage cavity 51010. More specifically, the inner ventilation channel 51022 passes through the refrigeration unit 530 and the massage cavity 51010, so that when the refrigeration unit 530 is in a cooling mode, cooled air reaches the massage cavity 51010 through the ventilation channel 51020, or, when the refrigeration unit 530 is in a heating mode, hot air reaches the massage cavity 51010 through the ventilation channel 51020.

It is worth mentioning that even if the refrigeration unit 530 is not working, the foot massage device 51 can also use the ventilation channel 51020 to achieve gas exchange and heat exchange between the outside air and the internal air, thereby reducing the discomfort brought to the user when the inside of the foot massage device 51 is in a high temperature or humid state.

More specifically, the foot massage device 51 further comprises a blower 550. The blower 550 has a blower air inlet 551 and a blower air outlet 552, and a blower passage 553 connected between the blower air inlet 551 and the blower air outlet 552. The refrigeration unit 530 is arranged at the front side of the blower 550, at the side where the blower air outlet 552 of the blower 550 is located.

The installation base plate 5111 has a blower installation opening 51112. The blower installation opening 51112 passes through the installation base plate 5111. The blower 550 is installed at the blower installation opening 51112.

The first thermal diffusion part 532 has a first diffusion channel 5321. The first diffusion channel 5321 is communicated to the blower passage 553. More specifically, the rear end of the first diffusion channel 5321 corresponds to the blower air outlet 552 and is close to the blower air outlet 552, so that the first diffusion channel 5321 is connected to the blower passage 553.

The foot massage device 51 further comprises an air guide frame 560. The air guide frame 560 has an air guide channel 5601. The air guide channel 5601 is connected between the first diffusion channel 5321 and the massage cavity 51010. More specifically, the air guide frame 560 is located at the front side of the refrigeration unit 530, the rear end of the air guide frame 560, that is, the rear end of the air guide channel 5601 corresponds to the front end of the first diffusion channel 5321 and is close to the front end of the first diffusion channel 5321, the first side or the second side of the air guide frame 560, that is, the first side or the second side of the air guide channel 5601 corresponds to the cavity side opening 510102 of the massage cavity 51010, in this way, the air guide channel 5601 is connected between the first diffusion channel 5321 and the massage cavity 51010.

The first side of the air guide channel 5601 corresponds to and communicates with the cavity side opening 510102 of the second side of the first massage cavity 51011, the second side of the air guide channel 5601 corresponds to and communicates with the cavity side opening 510102 of the first side of the second massage cavity 51012. The first side and the second side of the air guide channel 5601 are opposite to each other in the second direction D2. The first side of the air guide channel 5601 is consistent with the side where the first side portion 5130 of the mounting base 511 is located, the second side of the air guide channel 5601 is consistent with the side where the second side portion 5140 of the mounting base 511 is located.

The blower passage 553, the first diffusion channel 5321 and the air guide channel 5601 form the internal ventilation channel 51022.

Figure 11:
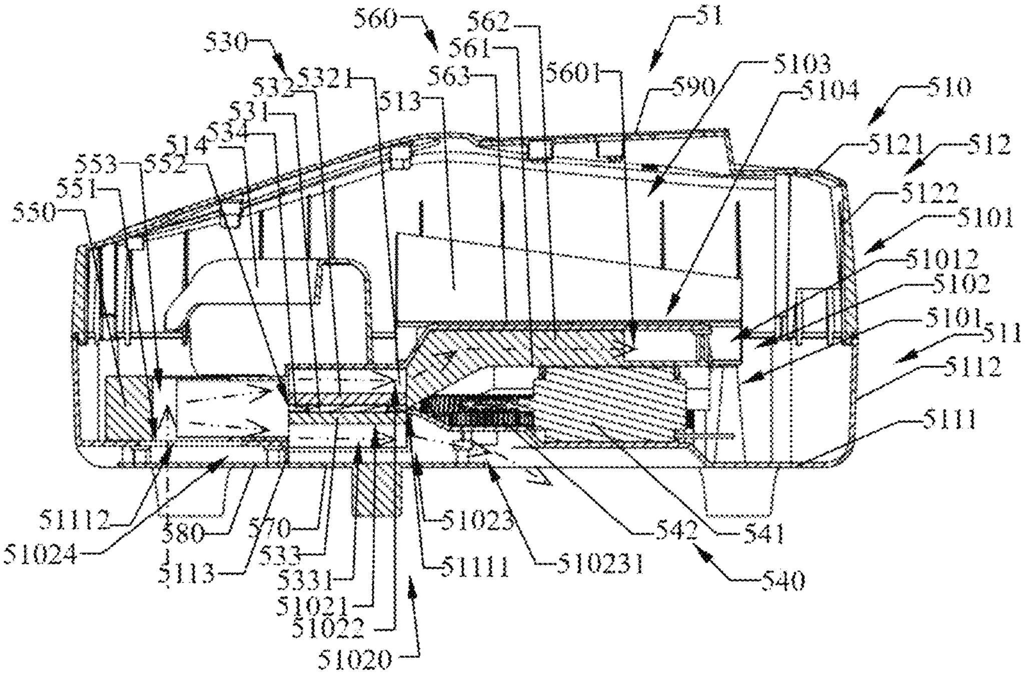
FIG. 11 is a sectional view of the foot massage device according to the above second embodiment of the present invention.
Figure 12:
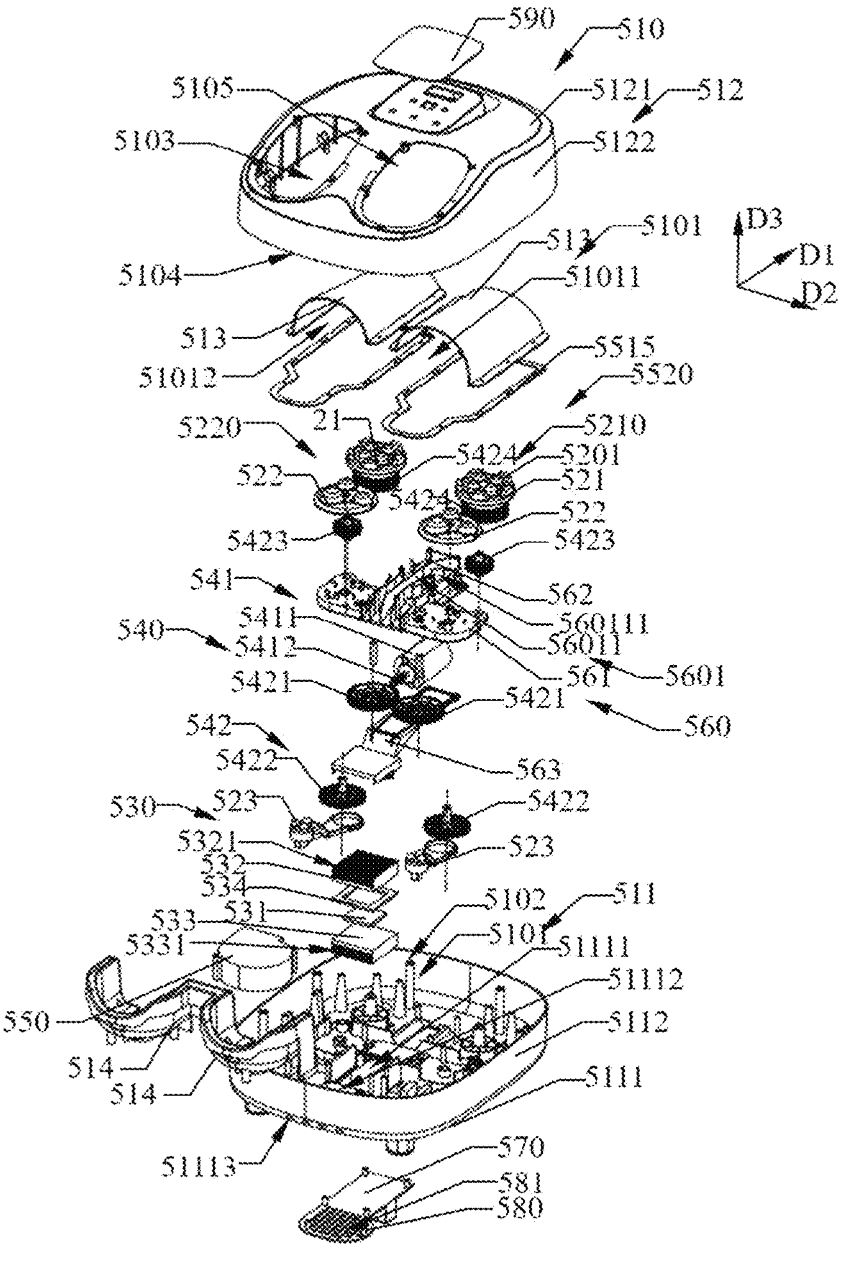
FIG. 12 is an exploded view of the foot massage device according to the above second embodiment of the present invention.
Figure 13:
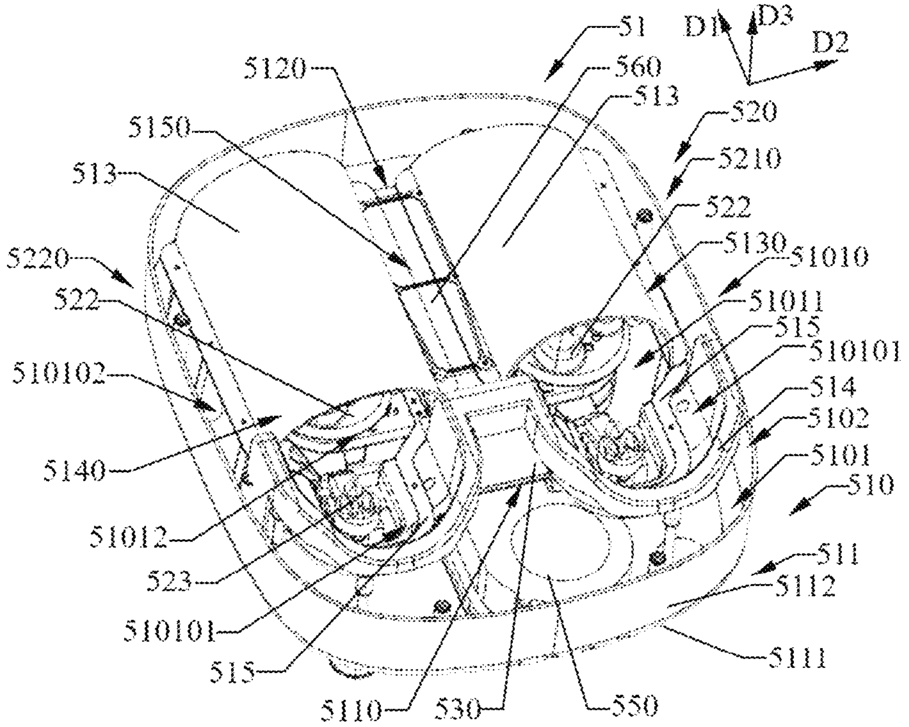
FIG. 13 is a partial perspective view illustrating the foot massage device according to the above second embodiment of the present invention.
Figure 14:
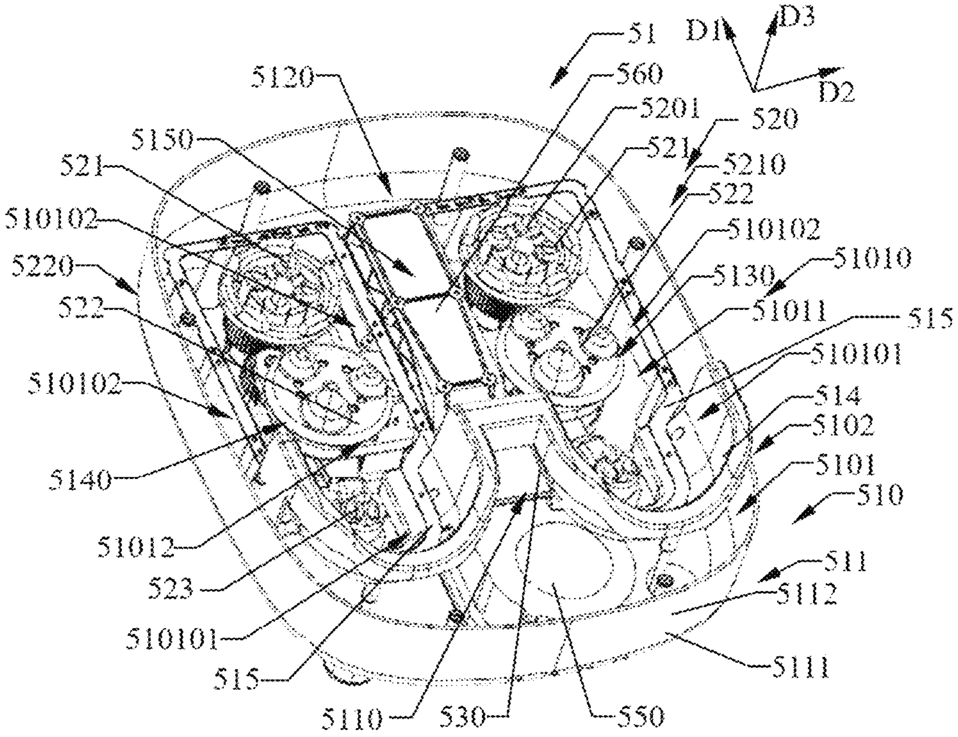
FIG. 14 is another partial perspective view illustrating the foot massage device according to the above second embodiment of the present invention.
Figure 15:
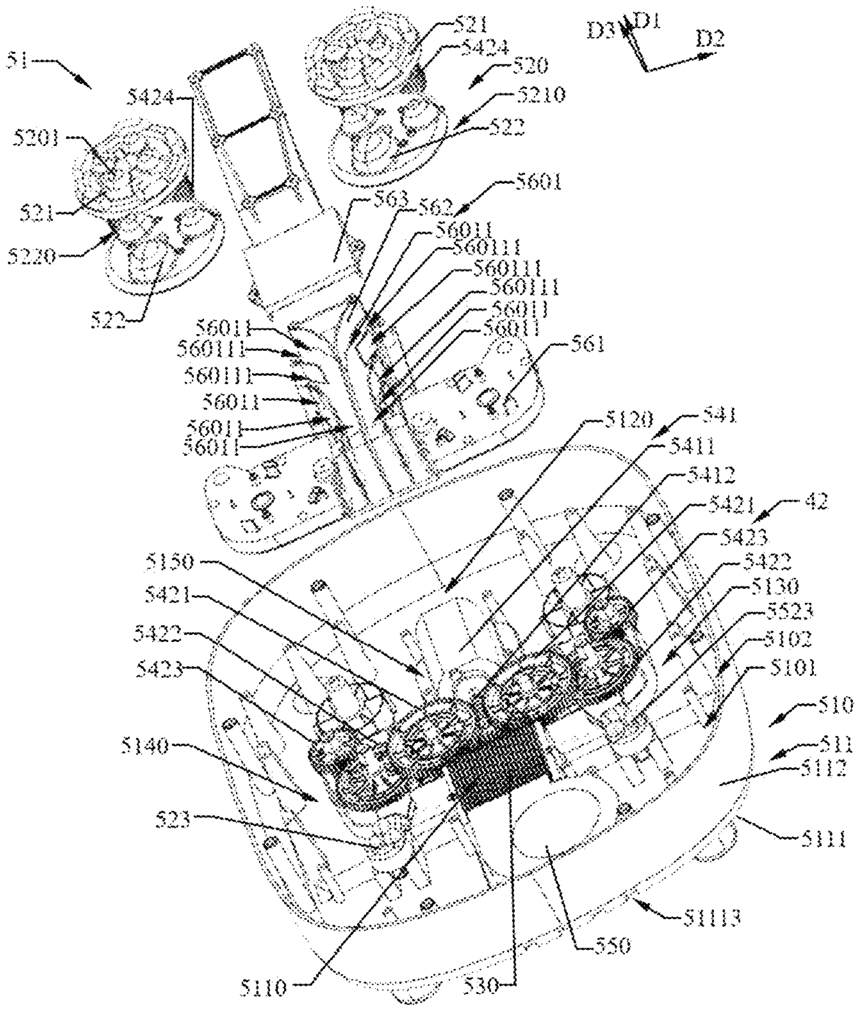
FIG. 15 is a first partial exploded view illustrating the foot massage device according to the above second embodiment of the present invention.
Figure 16:
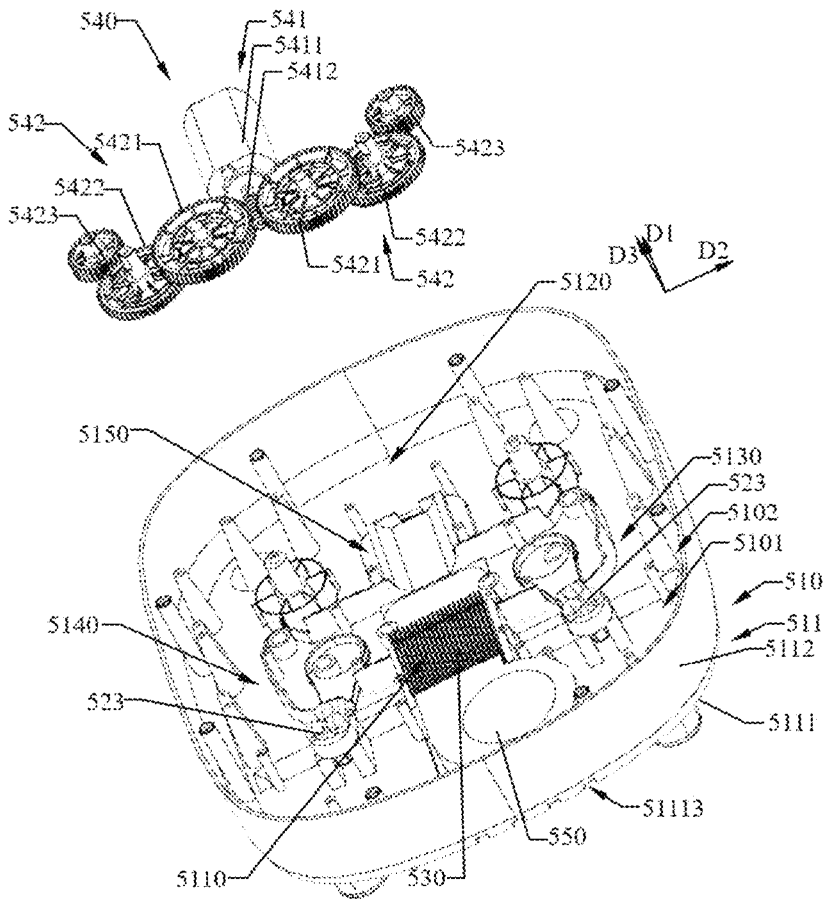
FIG. 16 is a second partial exploded view illustrating the foot massage device according to an embodiment of the present invention.

FIG. 11 shows the flow direction of air in the inner ventilation channel 51022 and the outer ventilation channel 51021 through dotted lines with arrows. When the refrigeration unit 530 is in a refrigeration state, the air temperature around the first cold and hot diffusion portion 532 is relatively low, and the air temperature around the first diffusion channel 5321 is relatively low. When the outside air enters the blower passage 553 and passes through the first diffusion channel 5321, the air with a relatively low temperature around the first diffusion channel 5321, that is, the cold air, is diffused to the air guide channel 5601, and then diffused to the massage cavity 51010.

When the refrigeration unit 530 is in a heating state, the air temperature around the first thermal diffusion part 532 is relatively high, and the air temperature around the first diffusion channel 5321 is relatively high. When the outside air enters the blower passage 553 and passes through the first diffusion channel 5321, the air with a higher temperature around the first diffusion channel 5321, that is, the hot air, is diffused to the air guide channel 5601, and then diffused to the massage cavity 51010.

When the refrigeration unit 530 is in a non-working state, the outside air enters the blower passage 553 and passes through the first diffusion channel 5321, diffuses to the air guide channel 5601, and then diffuses to the massage cavity 51010, thereby realizing gas and heat exchange between the outside air and the air inside the foot massage device 51.

It is worth mentioning that the air guide channel 5601 comprises a plurality of air guide bifurcated channels 56011. The extension paths of the plurality of air guide bifurcated channels 56011 are different. Each air guide bifurcated channel 56011 has an air guide outlet 560111. The air guide outlet 560111 is communicated to the massage cavity 51010. More specifically, the air guide outlet 560111 is formed on the first side or the second side of the air guide channel 5601, corresponding to the cavity side opening 510102 of the massage cavity 51010. The positions of the air guide outlets 60111 of at least two of the air guide channels 5601 are different, that is, the air guide outlets 60111 of at least two of the air guide channels 5601 do not overlap, so that the air guide outlets 60111 of at least two of the air guide channels 5601 are connected to different positions of the massage cavity 51010, so that the user can feel the cold air or hot air diffused into the massage cavity 51010 at different positions of the massage cavity 51010. Preferably, the positions of the air guide outlets 60111 of all the air guide channels 5601 are different. The air guide outlets 60111 of all the air guide channels 5601 form the final outlet of the inner ventilation channel 51022, that is, the inner ventilation outlet.

Specifically, the air guide frame 560 comprises an air guide bottom plate 61, an air guide vertical partition plate 62 and an air guide cover plate 63. The air guide cover plate 63 is opposite to the air guide bottom plate 61 in vertical direction. The air guide vertical partition plate 62 extends upward from the air guide bottom plate 61 and is located between the air guide bottom plate 61 and the air guide cover plate 63. A plurality of the air guide vertical partition plates are arranged according to a specific path to form a plurality of the air guide bifurcated channels 56011.

It is worth mentioning that the driving motor 541 and the refrigeration unit 530 of the foot massage device 51 are arranged in a specific manner so as to reduce the influence of the heat dissipation of the driving motor 541 on the refrigeration function as much as possible. Specifically, preferably, the inner ventilation channel 51022 does not pass through the driving motor 541, or, in other words, the driving motor 541 avoids the inner ventilation channel 51022 and does not constitute any part of the inner ventilation channel 51022.

Specifically, in the embodiment of the present invention, the first group of massage units 5210 and the second group of massage units 5220 are located on the first side and the second side of the air guide frame 560, and the driving motor 541 is located directly above or directly below the air guide frame 560. When the air guide frame 560 extends downward from the refrigeration unit 530, the driving motor 541 is located directly above the air guide frame 560, when the air guide frame 560 extends upward from the refrigeration unit 530, the driving motor 541 is located directly below the air guide frame 560.

In detail, the driving motor 541 is not arranged on the first side or the second side of the air guide frame 560, nor is it arranged between the air guide frame 560 and the massage cavity 51010 in the first direction D1. This can avoid as much as possible the cold air being affected by the heat generated by the driving motor 541 after passing through the air guide channel 5601, causing the cold air to be heated, making it difficult for the cold air to reach the massage unit 520 or the massage cavity 51010.

The second thermal diffusion part 533 has a second diffusion channel 5331, the second diffusion channel 5331 is communicated to the blower passage 553. The blower passage 553 and the second diffusion channel 5331 form the outer ventilation channel 51021. The inner ventilation channel 51022 and the outer ventilation channel 51021 share at least part of the blower passage 553.

When the refrigeration unit 530 is in a cooling state, the air temperature around the second thermal diffusion part 533 is hotter, and the air temperature around the second diffusion channel 5331 is higher. The outside air enters the blower passage 553 and then enters the second diffusion channel 5331, diffusing the hot air to the outside of the installation shell 510.

When the refrigeration unit 530 is in a heating state, the air temperature around the second thermal diffusion part 533 is low, and the air temperature around the second diffusion channel 5331 is low. The outside air enters the blower passage 553 and then enters the second diffusion channel 5331, diffusing the cold air to the outside of the installation shell 510.

In the embodiment of the present invention, the foot massage device 51 further comprises a refrigeration bottom baffle 570. The refrigeration bottom baffle 570 is disposed on the lower side of the mounting base 5111, corresponding to the refrigeration mounting opening 51111, and is spaced apart from the refrigeration mounting opening 51111 in the height direction D3. The refrigeration bottom baffle 570 can restrict the direction of air. The space between the refrigeration bottom baffle 570 and the mounting base 5111 forms an external ventilation restriction channel 51023. The gap between the front end of the refrigeration bottom baffle 570 and the mounting base 5111 forms an external ventilation outlet 510231 of the external ventilation restriction channel 51023.

Figure 19:
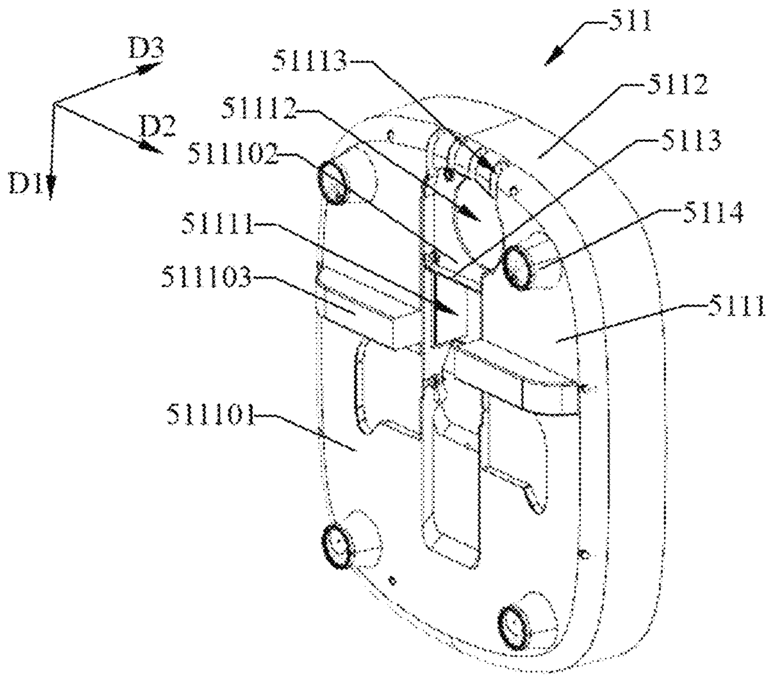
FIG. 19 is a perspective view illustrating the mounting base of the foot massage device according to the above embodiment of the present invention.
Figure 20:
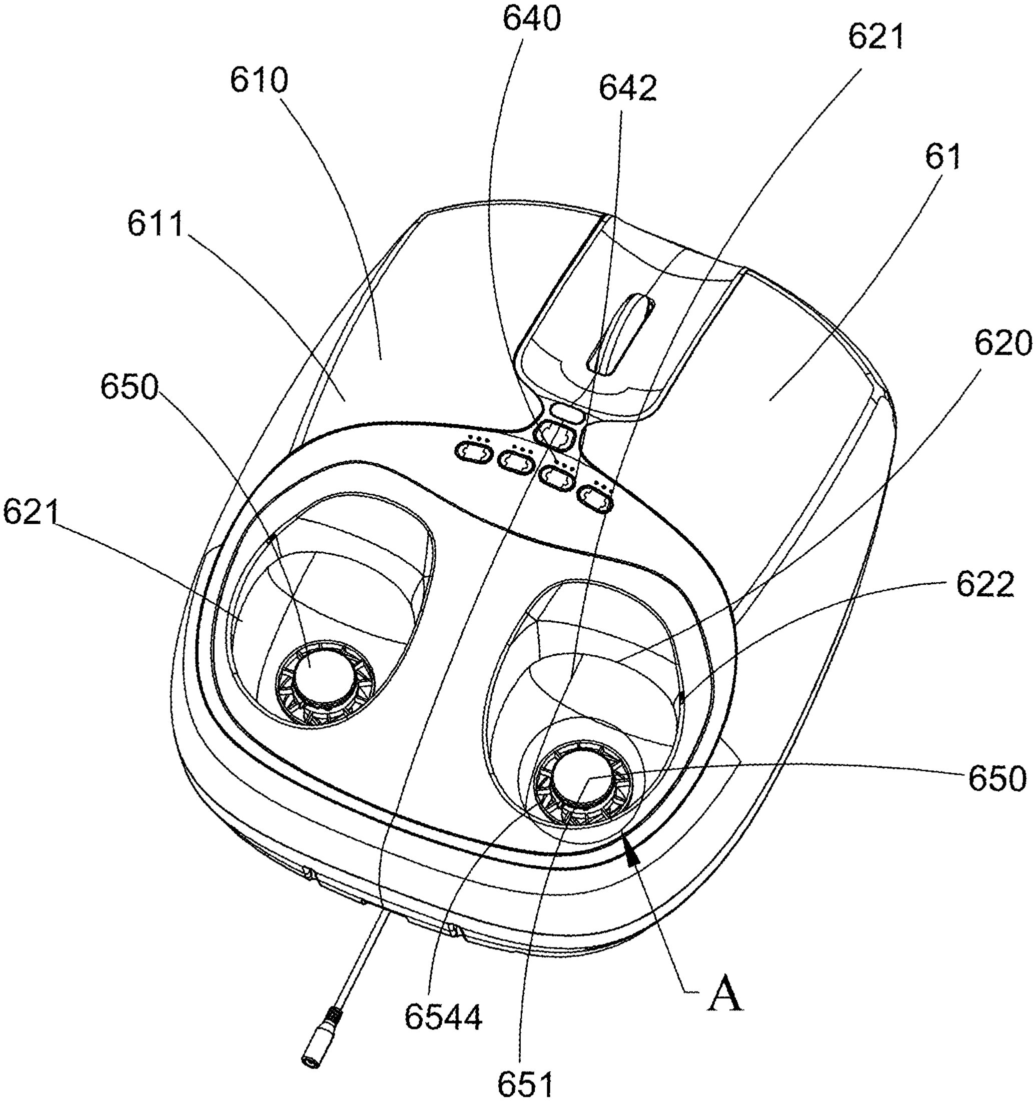
FIG. 20 is a perspective view of a foot massage device according to a third embodiment of the present invention.
Figure 21:
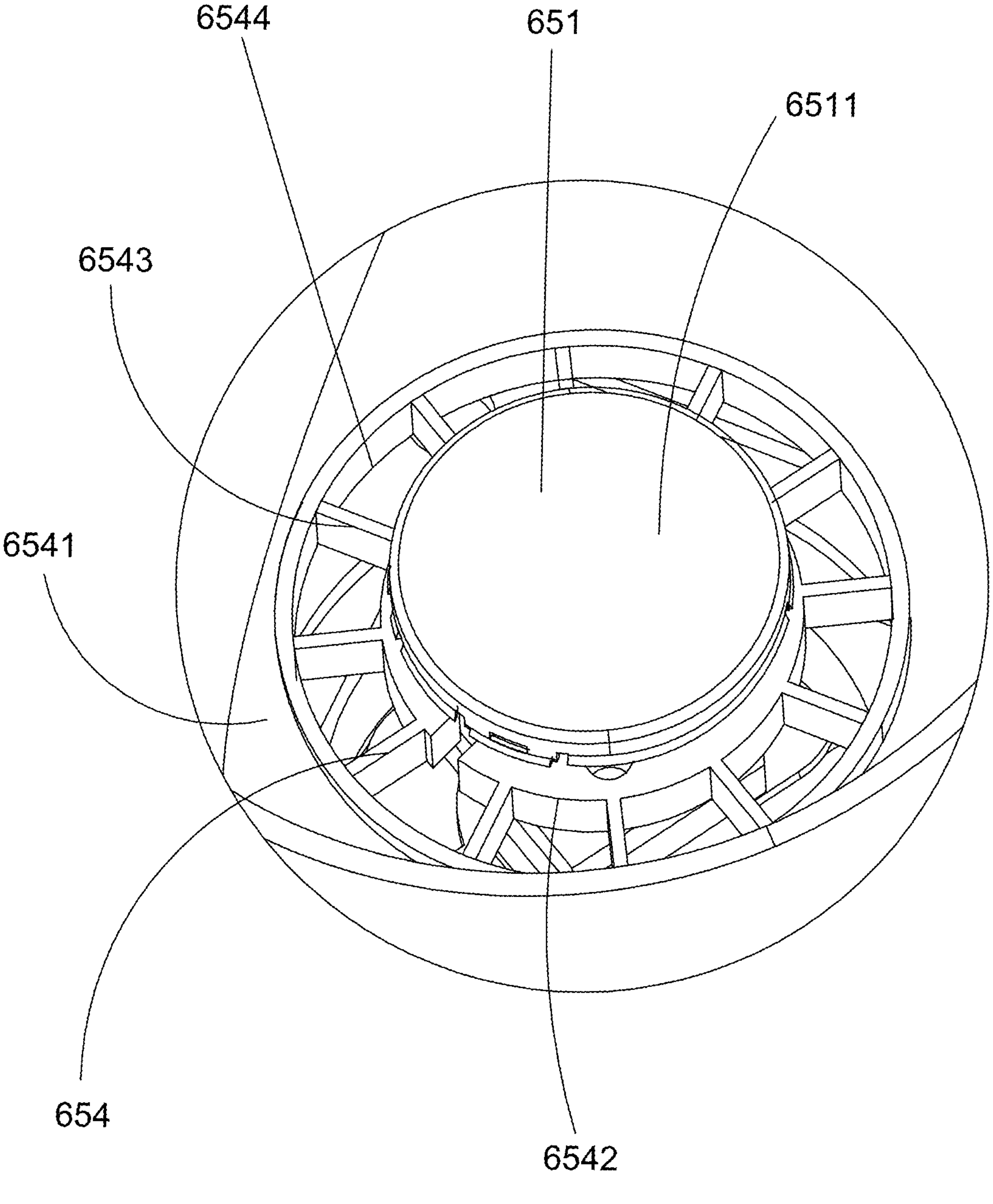
FIG. 21 is a partial enlarged view of area A of FIG. 20.

In one example of the present invention, as shown in FIG. 19, a local bottom surface of the mounting base plate 5111 is recessed upward relative to a reference plane 511101 set by the mounting base plate 5111, forming a concentrated recessed area 511102 on the bottom surface of the mounting base plate 5111, a local bottom surface of the mounting base plate 5111 protrudes downward relative to the reference plane, forming a concentrated protruding area 511103 on the bottom surface of the mounting base plate 5111. The refrigeration mounting opening 51111 is formed in the concentrated recessed area 511102.

In this example, the mounting base 511 further comprises at least one supporting foot 5114. The supporting foot 5114 is protrudingly connected to the mounting base plate 5111, located at the lower side of the mounting base plate 5111, and is used to support the mounting base plate 5111. Optionally, the concentrated protruding area 511103 may be flush with the supporting foot 5114, or may not be flush. When the concentrated protruding area 511103 is flush with the supporting foot 5114, the concentrated protruding area 511103 can also provide support, thereby improving the support stability of the mounting base.

The portion of the bottom surface of the refrigeration bottom baffle 570 that is docked with the reference plane 511101 of the mounting base 5111 is aligned with the reference plane 511101, the portion of the bottom surface of the refrigeration bottom baffle 570 that is docked with the concentrated protruding area 511103 of the mounting base 5111 is aligned with the concentrated protruding area 511103. In this way, when the refrigeration bottom baffle 570 is arranged on the lower side of the mounting base plate 5111, the bottom surface thereof has a high degree of consistency with the bottom surface of the mounting base plate 5111, and can form an overall relatively flat surface with the mounting base plate 5111, at the same time, the refrigeration bottom baffle 570 is spaced apart from the concentrated recessed area 511102 of the mounting base plate 5111 in the height direction D3, so that it is spaced apart from the refrigeration mounting opening 51111 in the height direction D3, and also forms an external ventilation constraint channel 51023 in the spacing space between the refrigeration bottom baffle 570 and the concentrated recessed area 511102 of the mounting base plate 5111.

In the embodiment of the present invention, the foot massage device 51 further comprises a blower bottom baffle 580. The blower bottom baffle 580 is arranged on the lower side of the mounting base 5111, corresponding to the fan mounting opening 51112, and is spaced apart from the fan mounting opening 51112 in the height direction D3. The space between the blower bottom baffle 580 and the mounting base 5111 forms an air intake restriction channel 51024. The blower bottom baffle 580 has a baffle through hole 581 corresponding to the fan mounting opening 51112 to facilitate air circulation. In the embodiment of the present invention, the blower bottom baffle 580 is integrally formed with the refrigeration bottom baffle 570, and the blower bottom baffle 580 is located at the rear side of the refrigeration bottom baffle 570.

In one example of the present invention, the blower installation opening 51112 is formed in the concentrated recessed area 511102. The blower bottom baffle 580 is aligned with the reference plane 511101. In this way, when the blower bottom baffle 580 is arranged on the lower side of the installation base plate 5111, the matching consistency between its bottom surface and the bottom surface of the installation base plate 5111 is high, and it can form an overall relatively flat surface with the installation base plate 5111, at the same time, the blower bottom baffle 580 and the concentrated recessed area 511102 of the installation base plate 5111 are spaced apart in the height direction D3, so that the blower bottom baffle 580 is spaced apart from the blower installation opening 51112 in the height direction D3, and the interval space between the blower bottom baffle 580 and the concentrated recessed area 511102 of the installation base plate 5111 forms the air intake restriction channel 51024.

The mounting base plate 5111 also has a groove that is recessed upward from its bottom surface. The air intake restriction channel 51024 is connected to the groove. The groove forms a blower guide channel 51113.

It is worth mentioning that in the embodiment of the present invention, the foot massage device 51 also has a vertical partition baffle 5113, as shown in FIG. 19. The vertical partition baffle 5113 is located between the refrigeration installation opening 51111 and the fan installation opening 51112, and is used to isolate the refrigeration installation opening 51111 and the blower installation opening 51112, and then isolate the air intake restriction channel 51024 and the external ventilation restriction channel 51023, so that the outside air enters the blower 550 from the blower bottom baffle 580 through the air intake restriction channel 51024, and then flows to the outside through the second thermal diffusion part 533 of the refrigeration unit 530 from the interval space between the refrigeration bottom baffle 570 and the installation bottom plate 5111, that is, the external ventilation restriction channel 51023. In this way, the vertical partition baffle 5113 can prevent air from flowing along an unexpected path to a certain extent. For example, it can prevent outside air from reaching the air inlet restriction channel 51024 from the blower bottom baffle 580 without passing through the blower 550, and directly passing to the outside from the gap space between the refrigeration bottom baffle 570 and the installation base plate 5111.

The foot massage device 51 further comprises a controller and a control panel 590. The control panel 590 is connected to the controller. The controller is connected to the driving unit 540, the refrigeration unit 530 and the blower 550. The control panel 590 is operated by a user to select a working mode of the foot massage device 51.

In summary, the foot massage device 51 according to the embodiment of the present invention is explained. The foot massage device 51 has a cooling therapy function. In this way, benefiting from the cooling therapy function, the foot massage device 51 can perform cooling massage on the user after the user exercises, relieve muscle tension, and reduce lactic acid accumulation, the foot massage device 51 can also reduce the user's feeling of stuffiness in a high temperature environment, thereby improving the user's body sensation, the foot massage device 51 is also suitable for use in areas with higher temperatures, such as tropical areas.

Referring to FIGS. 20 to 39 of the drawings, a foot massage device 61 according to a third embodiment of the present invention is illustrated. The foot massage device 61 comprises a housing 610, a pocket assembly 620, a massage assembly 630, a control assembly 640 and a thermal application assembly 650. The massage assembly 630, the pocket assembly 620 and the control assembly 640 are assembled on the housing 610. The massage assembly 630 is arranged to provide a massage effect to the foot of the user, the pocket assembly 620 is mounted on the housing 100 for receiving at least one foot of the user, the thermal application assembly 650 is configured to at least provide a cooling therapy effect to the foot of the user, the control assembly 640 comprises a power source 641 which is arranged to drive the operation of the massage assembly 630 and a controller 642 for controlling the operation of the massage assembly 630 and the thermal application assembly 650.

In this embodiment, the thermal application assembly 650 is specifically configured to apply thermal therapy, with a focus on cooling therapy, to the foot of the user. When the thermal application assembly 650 is operating in a cooling mode, it can deliver localized cooling to one or more targeted regions of the foot, such as the heel, ankle, sole, and toes, depending on the user's needs or the therapy program selected.

By enabling localized application of cooling therapy to specific foot regions, such as the heel (commonly affected by plantar fasciitis), the ankle (susceptible to sprains), the sole (often sore from prolonged standing), or the toes (which may swell or become overheated), the thermal application assembly 650 ensures that treatment is precise and efficient. This level of targeted care enhances the therapeutic effect compared to general whole-foot cooling.

Cooling therapy is widely recognized for its ability to constrict blood vessels, reduce fluid accumulation, and minimize inflammatory responses. This is particularly beneficial for users suffering from foot fatigue, edema, or minor injuries, offering a convenient at-home recovery method.

After intensive physical activity or long hours of walking or standing, the feet tend to overheat and experience microtrauma. The cooling function helps to soothe overheated muscles and joints, offering post-activity relief and reducing the risk of chronic fatigue or injury.

When used in combination with the massage assembly 630, the cooling therapy provides a dual-modality treatment. While massage increases blood flow and loosens muscles, the cooling therapy counteracts excessive inflammation, creating a balanced, restorative experience. This combination is ideal for recovery routines and stress relief.

Thermal application assembly 650 also can be operated in a heating mode, so as to apply a heating therapy to the foot of the user. In other words, the thermal application assembly 650 can be shifted from the cooling mode to the heating mode, so as to deliver localized heating to one or more targeted regions of the foot, such as the heel, ankle, sole, and toes.

Heat application dilates blood vessels, promoting increased blood flow and oxygen delivery to tired or injured tissues. This helps loosen stiff muscles, relieve cramping, and accelerate recovery, especially beneficial after long periods of immobility or cold weather exposure.

Users suffering from conditions such as arthritis, plantar fasciitis, or neuropathy can benefit from gentle, consistent warmth, which can ease joint stiffness, reduce pain, and enhance overall foot comfort.

The ability to switch between cooling and heating modes gives users the freedom to choose the most suitable therapy depending on their current physical state, cooling for inflammation and swelling, and heating for stiffness and soreness. This dual-mode capability eliminates the need for separate devices, improving convenience and value.

Some users or therapy programs may benefit from alternating between heating and cooling (thermal cycling), which can stimulate circulation, reduce muscle fatigue, and enhance recovery. This approach is often used in professional sports therapy and rehabilitation.

More specifically, as shown in FIGS. 20 to 25 of the drawings, the housing 610 comprises an upper housing body 611 and a lower housing body 612 which is assembled to the upper housing body 611 to define a receiving cavity 613 for receiving the massage assembly 630 and the thermal application assembly 650. The pocket assembly 620 comprises at least one foot receiving pocket 621 for receiving a foot of the user and can be detachable from the housing 610 for easy replacement and clean.

More specifically, the upper housing body 611 has two openings 6111 which are communicated to the receiving cavity 613 of the housing 610, the pocket assembly 620 comprises two foot receiving pockets 210 which are respectively disposed into the receiving cavity 613 through the two openings 6111. Accordingly, the two feet of the user can be respectively disposed into the two foot receiving pockets 621 through the two openings 6111.

Each of the two foot receiving pockets 621 can be detachably mounted to the upper housing body 611. As an example, the pocket assembly 620 comprises at least one connecting element 622 which is embodied as a zipper member for detachably mounting the foot receiving pocket 621 with the upper housing body 611.

With each of the two foot receiving pockets 621 being detachable, maintenance becomes straightforward. The user can simply remove and wash or replace the corresponding foot receiving pockets 621 as needed without disturbing the rest of the assembly. Each of the two foot receiving pockets 621 is made of a flexible material, such as polypropylene, polyethylene, polyvinyl chloride, fabric, rubber, nylon, tyvek, and polyester.

In this embodiment, the foot massage device 61 comprises two thermal application assemblies 650 which are respectively detachably mounted to the two foot receiving pockets 621. More specifically, each foot receiving pocket 621 has a mounting opening 623, each thermal application assembly 650 is mounted to the mounting opening 623 at a position that allows the foot of the user to be placed on the corresponding thermal application assembly 650 for being thermally treated by the thermal application assembly 650, so that the thermal application assembly 650 is able to transfer the thermal energy to the foot the user.

In other words, the thermal application assembly 650 and the corresponding foot receiving pocket 621 form a thermal application unit while a top surface of the thermal application assembly 650 constitutes a portion of the inner contact surface of the thermal application unit for having direct with the foot of the user for heating or cooling the foot of the user.

According to this illustrated embodiment, the thermal application assembly 650 is specifically illustrated to be in direct contact with the heel of the user when the foot is inserted into the foot receiving pocket 621. This configuration allows the thermal application assembly 650 to deliver localized thermal therapy directly to the heel region, and is particularly advantageous for providing cooling treatment to the heel to reduce inflammation, soreness, or fatigue. The direct-contact interface ensures efficient thermal transfer without requiring an intermediary medium, thereby enhancing therapeutic effectiveness and user comfort.

In addition, by applying cold therapy directly to the heel, the thermal application assembly 650 effectively alleviates inflammation and pain commonly associated with plantar fasciitis. This targeted cooling treatment serves to numb localized pain receptors, reduce tissue swelling, and promote vascular constriction, thereby creating optimal physiological conditions for the subsequent foot massage session. Following this initial cooling phase, the massage assembly 630 can be embodied to engage the sole of the foot, delivering mechanical stimulation that further relaxes the plantar fascia, stimulates nerve endings, and enhances blood circulation in the affected area. The combination of cold therapy followed by massage not only improves comfort and recovery, but also establishes an integrated rehabilitation cycle, alleviates long-term foot fatigue and structural abnormalities caused by flat feet, reduce inflammation of the plantar fascia, effectively supporting the user's path to pain relief, tissue healing, and restored foot function.

More specifically, as shown in FIGS. 28 to 35, the thermal application assembly 650 comprises a top heat conduction element 651, a bottom heat conduction element 652, and a semiconductor thermoelectric module 653 between the top heat conduction element 651 and the bottom heat conduction element 652. The thermal application assembly 650 is mounted to the corresponding foot receiving pocket 621 in a manner that the thermal application assembly 650 is penetrating through the corresponding foot receiving pocket 621 to expose the top heat conduction element 651, so that the top heat conduction element 651 is able to provide the thermal treatment to the foot of the user without the layer of the foot receiving pocket 621 positioned between the foot of the user and the top heat conduction element 651.

The housing 610 comprises a support frame 614 for supporting each of the thermal application assembly 650. Each thermal application assembly 650 can be configured to penetrate through the corresponding support frame 614, and the curvature of the support frame 614 can be constructed to conform to the heel of the user, so as to provide a sheltering support for the heel of the user.

Figure 39:
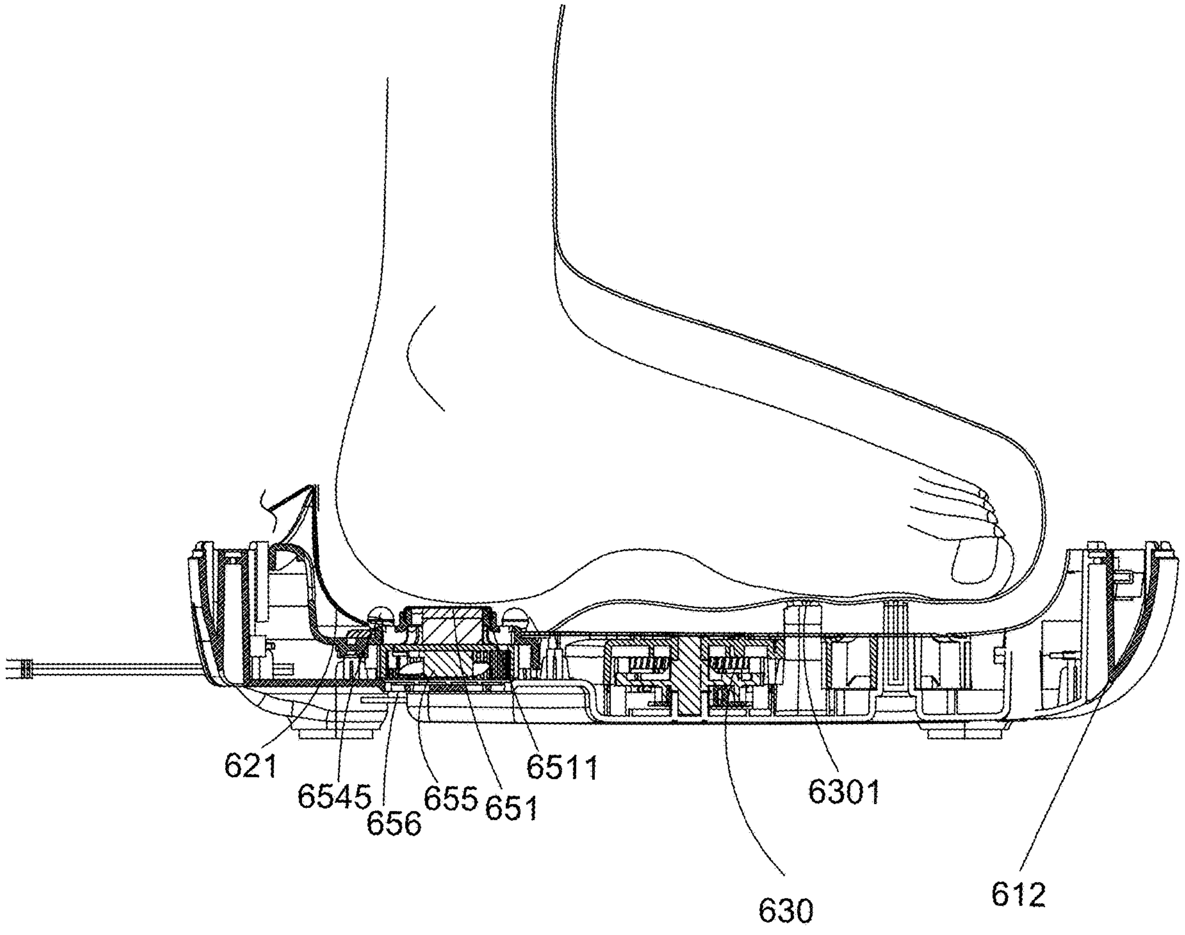
FIG. 39 is a perspective view illustrating a foot of a user being paced on the thermal application assembly of the foot massage device according to the above third embodiment of the present invention.

Accordingly, the foot of the user can be directly placed on the top heat conduction element 651, or the foot of the user is wearing a sock and can be directly placed on the top conduction element 651, as shown in FIG. 39, so that direct contact between the foot of the user and the top heat conduction element 651 eliminates thermal resistance caused by fabric or padding layers, allowing quicker and more effective heat or cold transfer to the foot.

In this embodiment, the top heat conduction element 651 can be embodied as a heat conduction plate which is extended into a foot receiving cavity 624 of the foot receiving pocket 621, a top thermal contact surface 6511 of the heat conduction plate is a smooth surface for placing the foot of the user and providing a flat contact surface for enhance the contact between the foot of the user and the top heat conduction element 651.

The semiconductor thermoelectric module 653, which is commonly referred to as a Peltier device, is employed to allow the thermal application assembly 650 to be designed to perform dual-mode thermal therapy of cooling and heating. This thermal application assembly 650 operates based on the Peltier effect, which enables heat transfer between two surfaces when an electric current passes through dissimilar semiconductor materials.

Accordingly, the top heat conduction element 651 is positioned in direct contact with the foot of the user or the sock receiving the foot, acting as the active thermal interface for delivering either cooling or heating. The bottom heat conduction element 652 serves as a heat dissipation surface opposite the user interface, allowing the removal or supply of heat depending on the operating mode.

The semiconductor thermoelectric module 653 positioned between the top and bottom conduction elements comprises a series of p-type and n-type semiconductors arranged electrically in series and thermally in parallel. When the thermal application assembly 650 is operated in the cooling mode, the semiconductor thermoelectric module 653 is powered in one direction that heat is absorbed from the top heat conduction element 651, which results in a cooling effect on the foot, and the absorbed heat is transferred through the module and expelled via the bottom heat conduction element 652.

When the thermal application assembly 650 is operated in the heating mode, the current direction through the semiconductor thermoelectric module 653 is reversed, so that heat is pumped toward the top heat conduction element 651, thereby warming the surface in contact with the foot.

The material of the semiconductor thermoelectric module can be but not limited to Bismuth Telluride, the material of the top heat conduction element 651 and the bottom heat conduction element 652 can be ceramic materials such as alumina, aluminum nitride, and thorium oxide.

The thermal application assembly 650 comprises a mounting frame 654 for mounting the top heat conduction element 651, the bottom heat conduction element 652, and the semiconductor thermoelectric module 653 and a fan unit 655 positioned under the bottom heat conduction element 652. More specifically, the mounting frame 654 comprises an outer frame 6541, an inner frame 6542 having a central opening 65421 for housing the semiconductor thermoelectric module 653, and a plurality of ridges 6543 extended between the inner frame 6542 and the outer frame 6541 to define one or more through holes 6544 between the inner frame 6542 and the outer frame 6541, so that air ventilation can be generated when the fan unit 655 is in operation to draw air into the through holes 6544 or to discharge air through the through holes 6544.

The top heat conduction element 651 is supported on the inner frame 6542. More specifically, the top heat conduction element 651 comprises a plate body 6512 and circumferential edge 6513 extended from the plate body 6512, the inner frame 6542 has a top circumferential groove 65422 for engaging with the circumferential edge 6513 of the top heat conduction element 651, so as to retain the top heat conduction element 651 on the inner frame 6542. The person of ordinary skilled in that art should understand that the connecting manner between the top heat conduction element 651 and the inner frame 6542 is exemplary only and is not limiting.

In this embodiment, the thermal application assembly 650 further comprises a bottom baffle plate 656 which is position under the fan unit 655 and have a plurality of bottom vent holes 6561, a fan chamber 657 is defined between the bottom baffle plate 656 and the mounting frame 654 to receive the fan unit 655, and the through holes 6544 are communicated to the venting chamber 657. When the top heat conduction element 651 is provide a thermal treatment such as cooling effect to the foot of the user, the fan unit 655 can be in operation to drive air flow from the through holes 6544 toward the bottom vent holes 6561. The bottom baffle plate 656 can be a part of a bottom wall of the lower housing body 612, or is a plate which is assembled to the bottom wall of the lower housing body 612.

In the cooling mode, the top heat conduction element 651 becomes the cold side, drawing heat away from the foot. Simultaneously, the bottom heat conduction element 652 becomes the hot side, accumulating the heat transferred from above. To maintain a strong temperature gradient across the semiconductor thermoelectric module 653 which is essential for effective cooling, efficient removal of heat from the bottom heat conduction element 652 is required. The fan unit 655, housed in the fan chamber 657, is activated during cooling operation, so as to draw in ambient air through the through holes 6544 and directs the air across the bottom heat conduction element 652 and the surrounding components, so that the air can be discharged through the bottom vent holes 6561 which are communicated to the outer side of the foot massage device 61 for heat dissipation.

By actively venting warm air out of the fan chamber 657, the system prevents heat buildup at the hot side of the semiconductor thermoelectric module 653. This enhances the stability and duration of cooling, especially during prolonged therapy sessions. The active airflow ensures the cold side remains consistently cold by continually extracting heat from the hot side, sustaining the performance of the Peltier module. Rapid removal of accumulated heat allows the top heat conduction element 651 to quickly reach and maintain target low temperatures, providing immediate relief to the foot of the user. The design not only improves thermal management but also promotes internal ventilation, reducing the risk of overheating sensitive components.

Alternatively, the fan unit 655 can be in a reversed operation, so that the air can be drawn in the fan chamber 657, the air coming out through the through holes 6544 between the ridges 6543 of the mounting frame 654 is able to cause the cool air adjacent to the top heat conduction element 651 to diffuse upward and forward. Accordingly, excessive foot sweat can cause unpleasant odors and self-consciousness By keeping the foot area cool and ventilated, the system helps minimize odor formation, improving the hygienic environment inside the foot receiving pocket 621.

When the thermal application assembly 650 operates in the heating mode, the top heat conduction element 651 becomes the hot side, delivering direct warming treatment to the foot of the user, while the bottom heat conduction element 652 functions as the cold side. The fan unit 655 circulates air across the bottom vent holes 6561 and the holes 6544, stabilizing the cold zone and maintaining the temperature differential required for efficient thermoelectric operation. This configuration ensures fast and consistent heating, promotes circulation, and contributes to user comfort and safe device performance.

The top heat conduction element 651 can be cooled to −5° C.~15° C. when the thermal application assembly 650 is in the cooling mode, and can be heated to 40° C.~80° C. when the thermal application assembly 650 is in the heating mode. The power of thermal application assembly 650 can be 1 w~10 w, the cooling or heating time for reaching the preset cooling or heating temperature is preferred to be 5 s-60 s. A temperature controller may be also configured to determine a temperature adjustment strategy based on signals from a temperature sensor installed on the thermal application assembly 650 or on other component in the housing 610. The power of the fan unit 655 can be 0.5 w~5 w, the rotation speed of the fan blades of the fan unit 655 can be 2000~5000 rpm. The person of ordinary skilled in that art should understand that the specific value ranges are exemplary only and is not intended to be limiting.

In this embodiment, the top thermal contact surface 6511 of the top heat conduction element 651 is positioned above the through holes 6544 of the mounting frame 654, so that when the foot of the uses is placed in the foot receiving pocket 621 and the heel of the user is above the top thermal contact surface 6511 of the top heat conduction element 651, the foot of the user is retained above the top thermal contact surface 6511 of the top heat conduction element 651 and will not block the through holes 6544, so as to ensure that the air flow will not be influenced. This design prevents the foot, particularly the heel or arch region, from directly covering or obstructing the through holes 6544. As a result, the air circulation path established by the fan unit 655 and the through holes 6544 remains unobstructed, allowing for continuous and efficient airflow.

Figure 22:
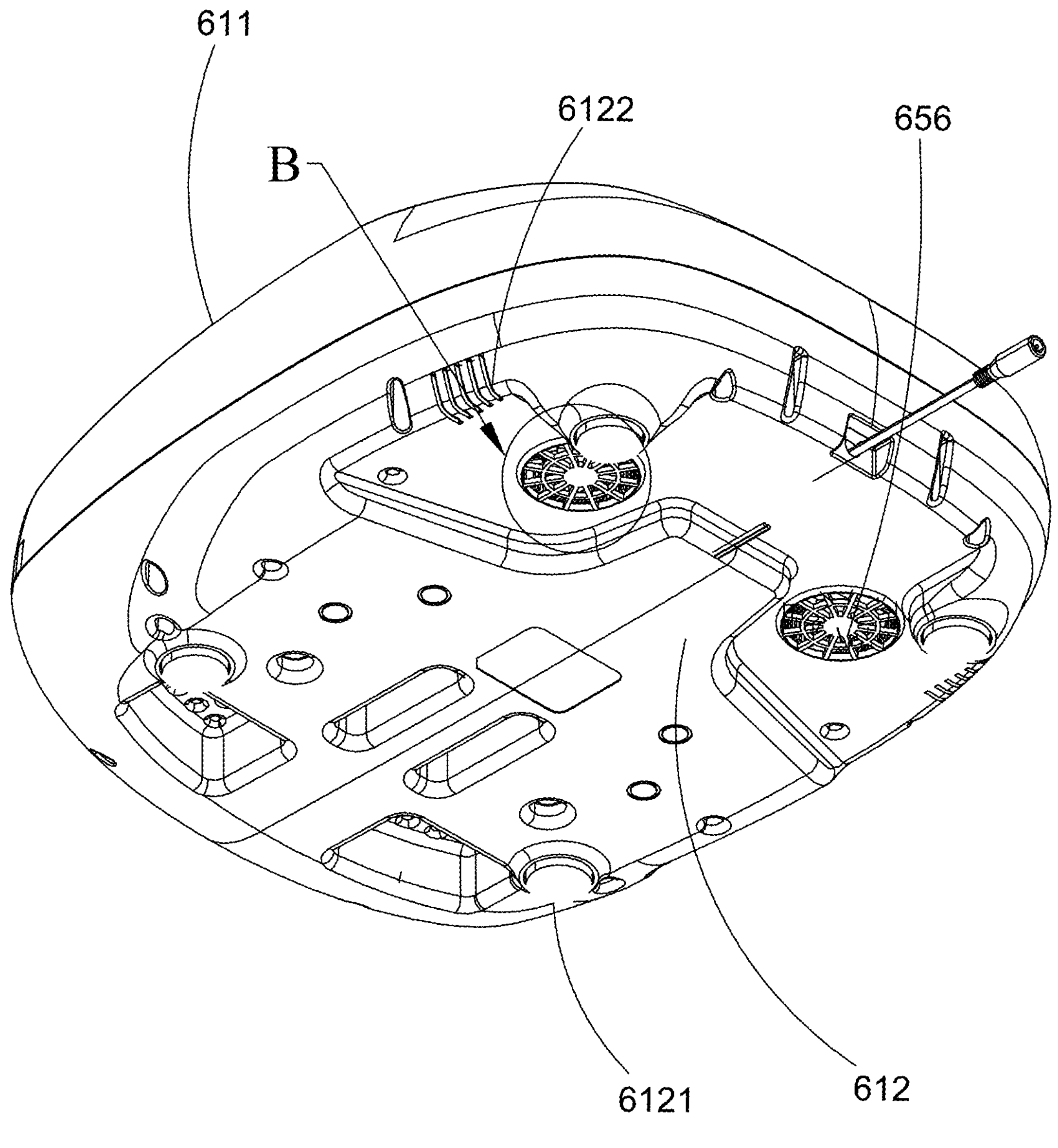
FIG. 22 is another perspective view illustrating a bottom of the foot massage device according to the above third embodiment of the present invention.
Figure 23:
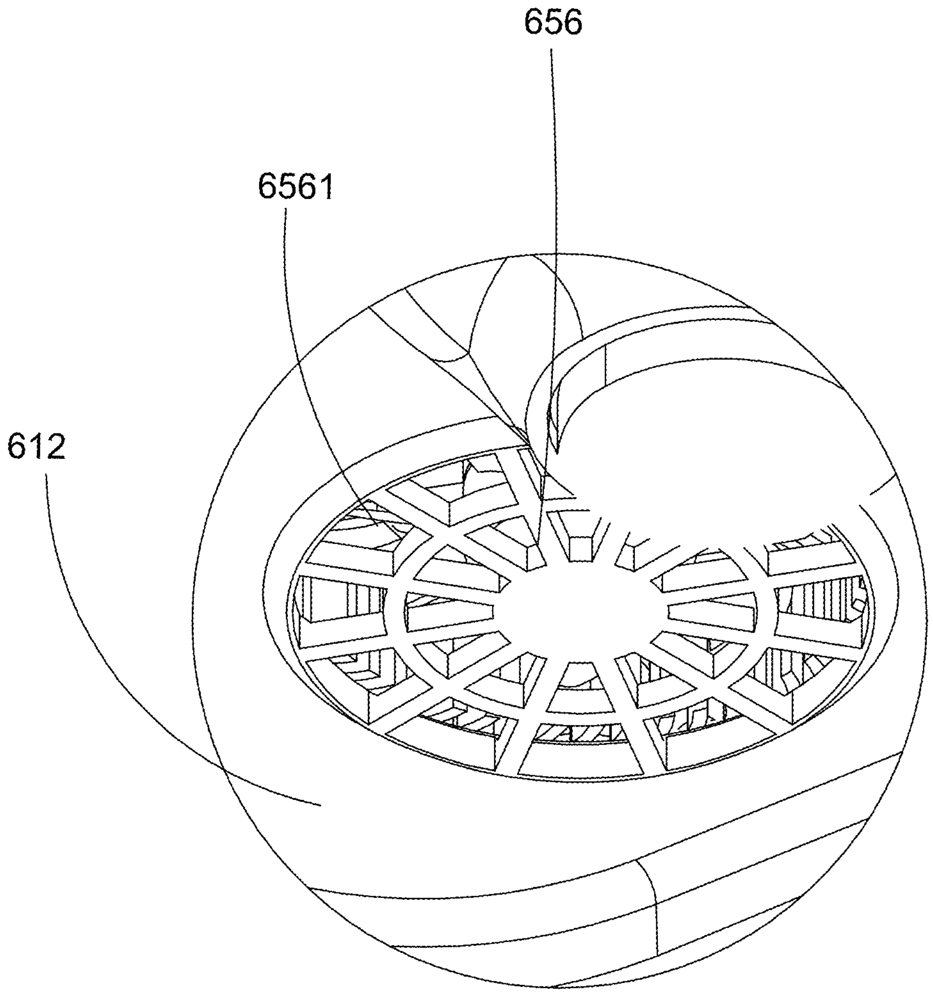
FIG. 23 is a partial enlarged view of area B of FIG. 22.
Figure 24:
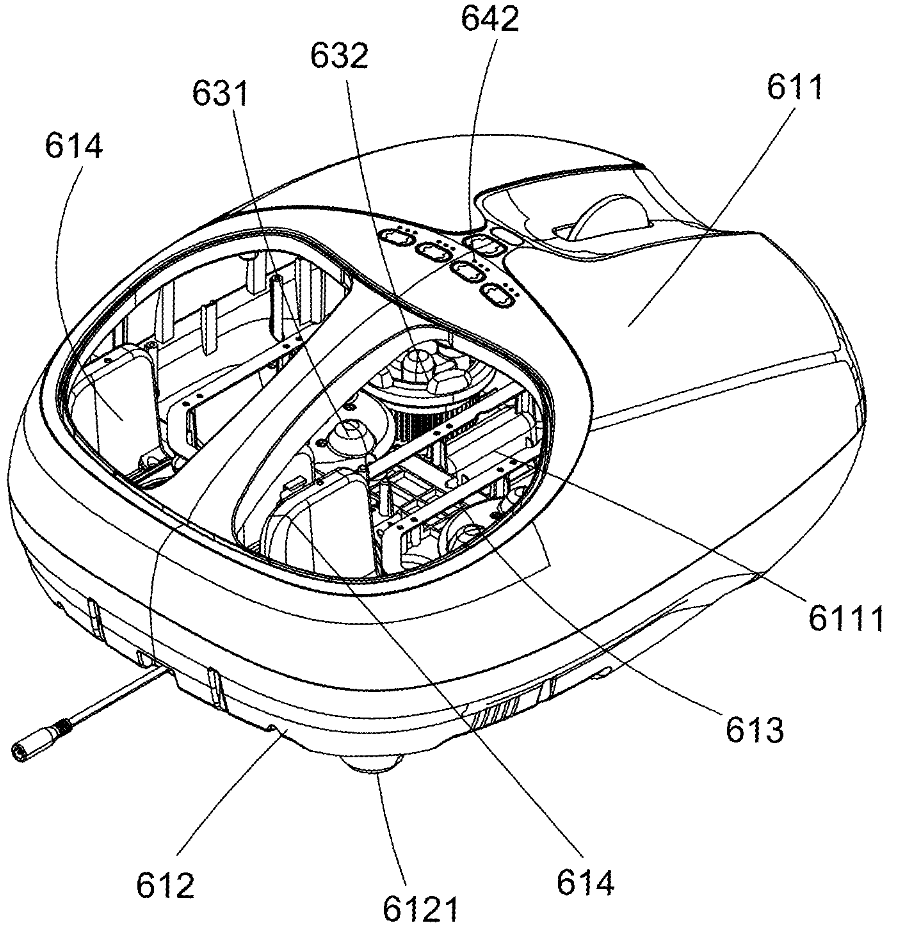
FIG. 24 is another perspective view of the foot massage device according to the above third embodiment of the present invention, wherein a pocket assembly is removed.

As shown in FIG. 22 of the drawings, the lower housing body 612 may comprises a plurality of support protrusions 6121 at a bottom side thereof for supporting the housing 610 on an environment surface, the bottom baffle plate 656 is thus spaced apart from the environment surface, so that the bottom vent holes 6561 will not be covered by the environment surface.

In this embodiment, the lower housing body 612 has one or more side vent holes 6122 which are communicated to the fan chamber 657, so that when the foot massage device 61 is used on a carpet, where a normal ventilation path through the bottom bent holes 6561 may be blocked, the side vent holes 6122 can be employed to ensure the air flow.

Figure 27:
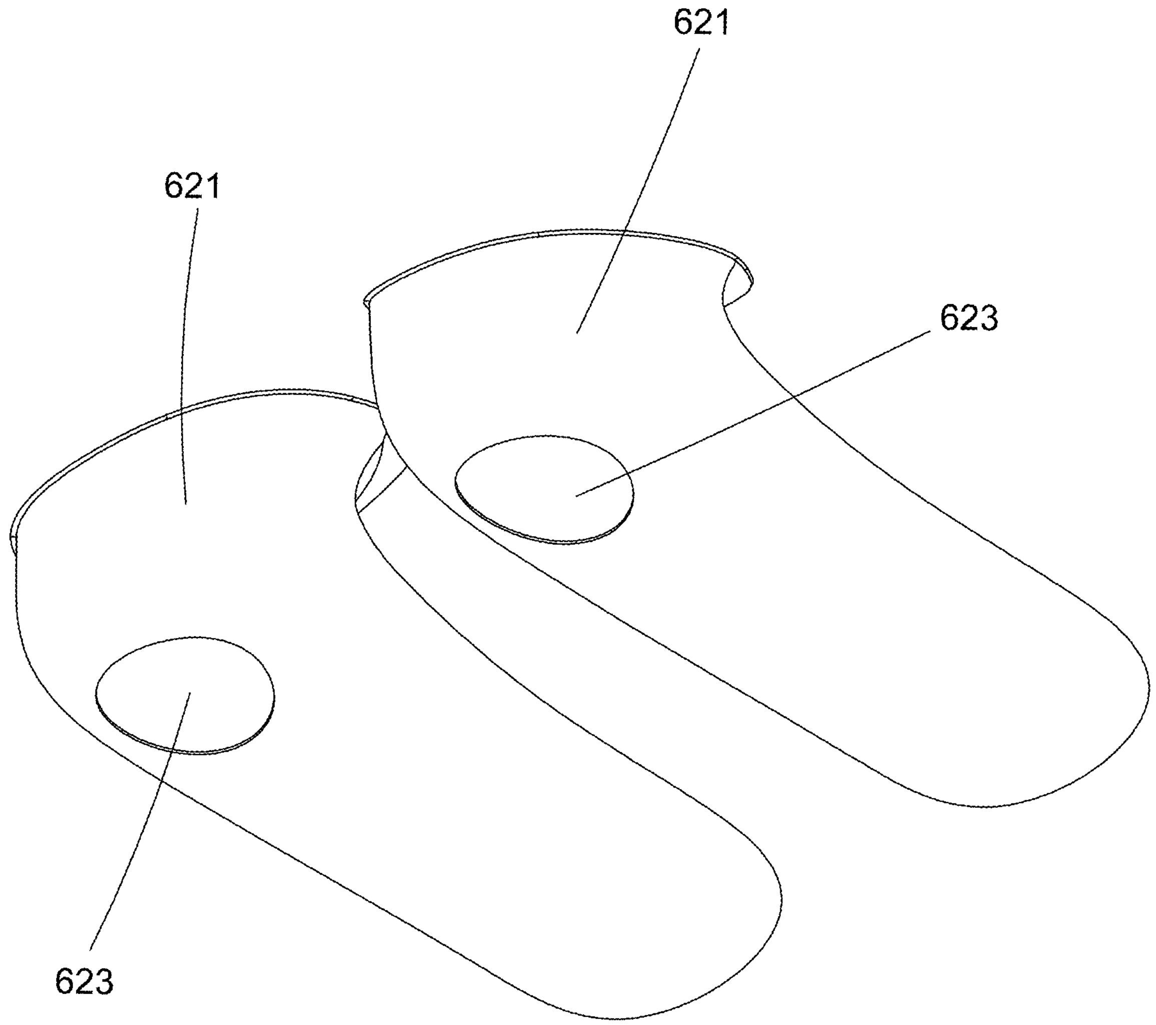
FIG. 27 is a perspective view illustrating two foot receiving pockets of the foot massage device according to the above third embodiment of the present invention.
Figure 28:
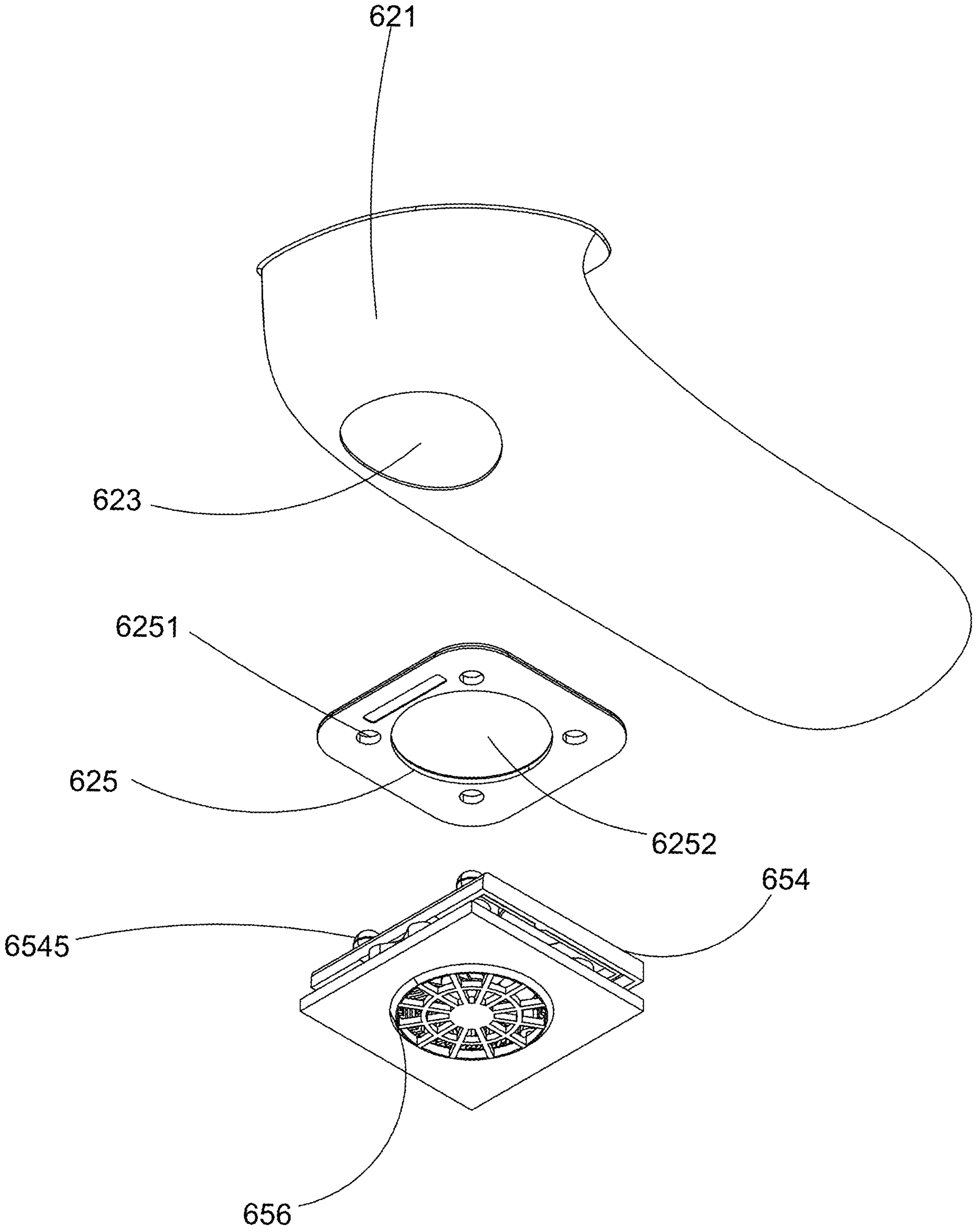
FIG. 28 is a schematic view illustrating the coupling between the foot receiving pocket and a thermal application assembly of the foot massage device according to the above third embodiment of the present invention.
Figure 29:
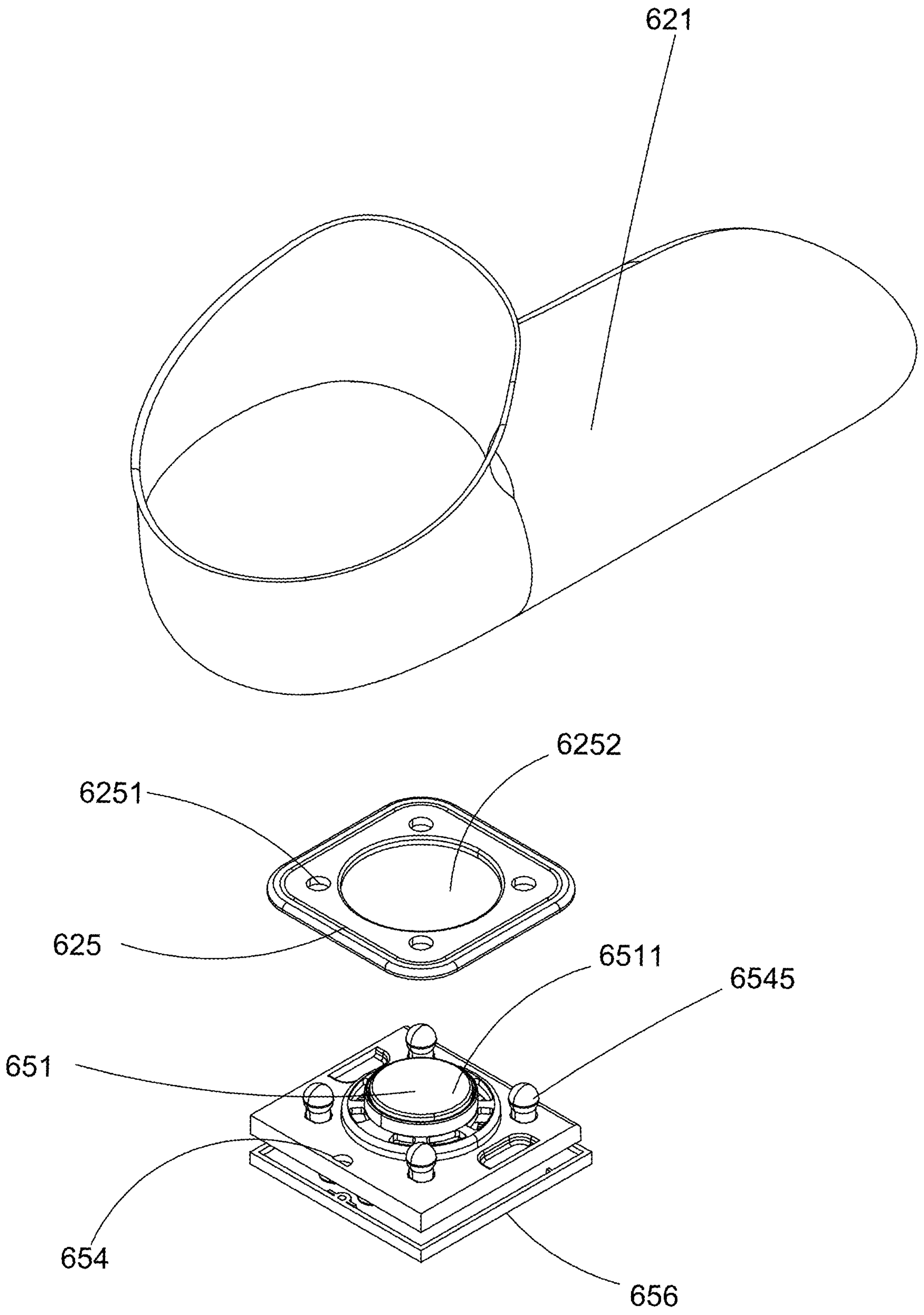
FIG. 29 is another schematic view illustrating the coupling between the foot receiving pocket and a thermal application assembly of the foot massage device according to the above third embodiment of the present invention.
Figure 30:
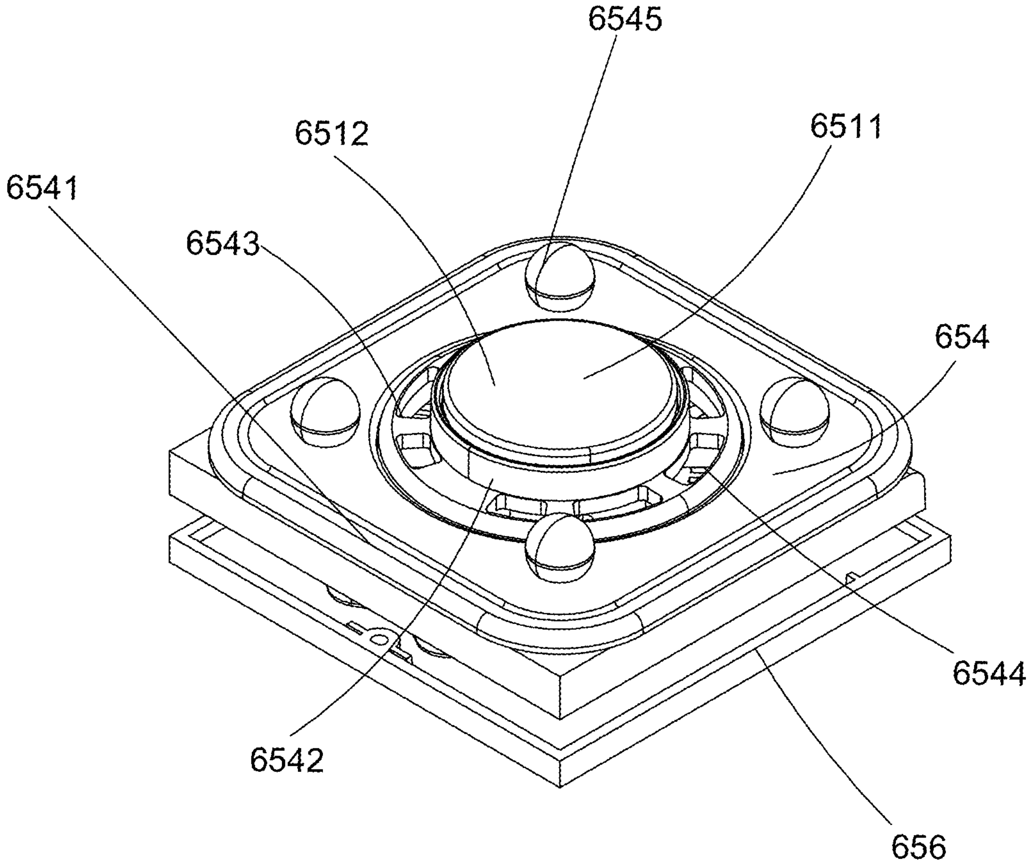
FIG. 30 is a perspective view illustrating the thermal application assembly of the foot massage device according to the above third embodiment of the present invention.
Figure 31:
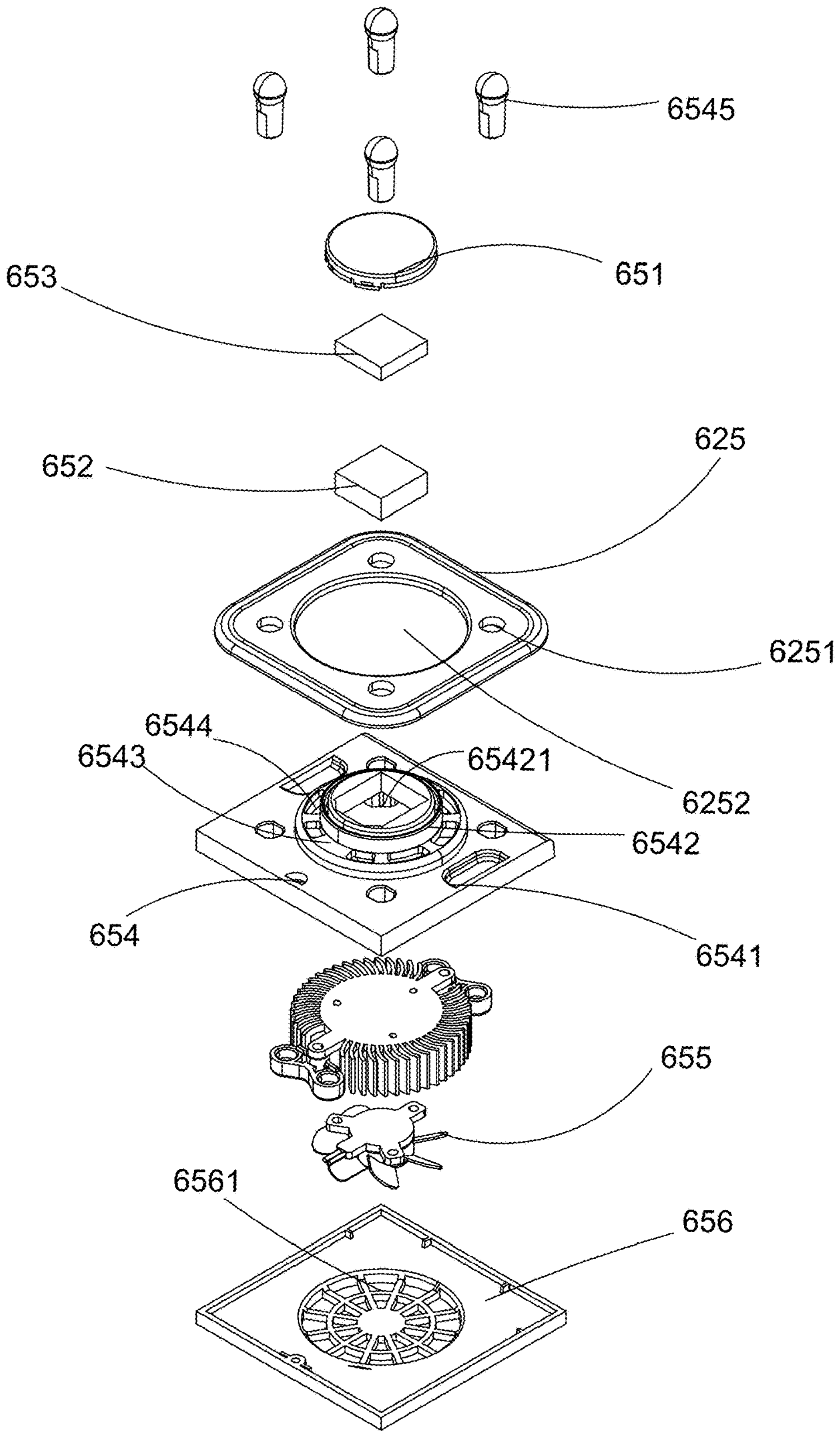
FIG. 31 is an exploded view illustrating the thermal application assembly of the foot massage device according to the above third embodiment of the present invention.
Figure 32:
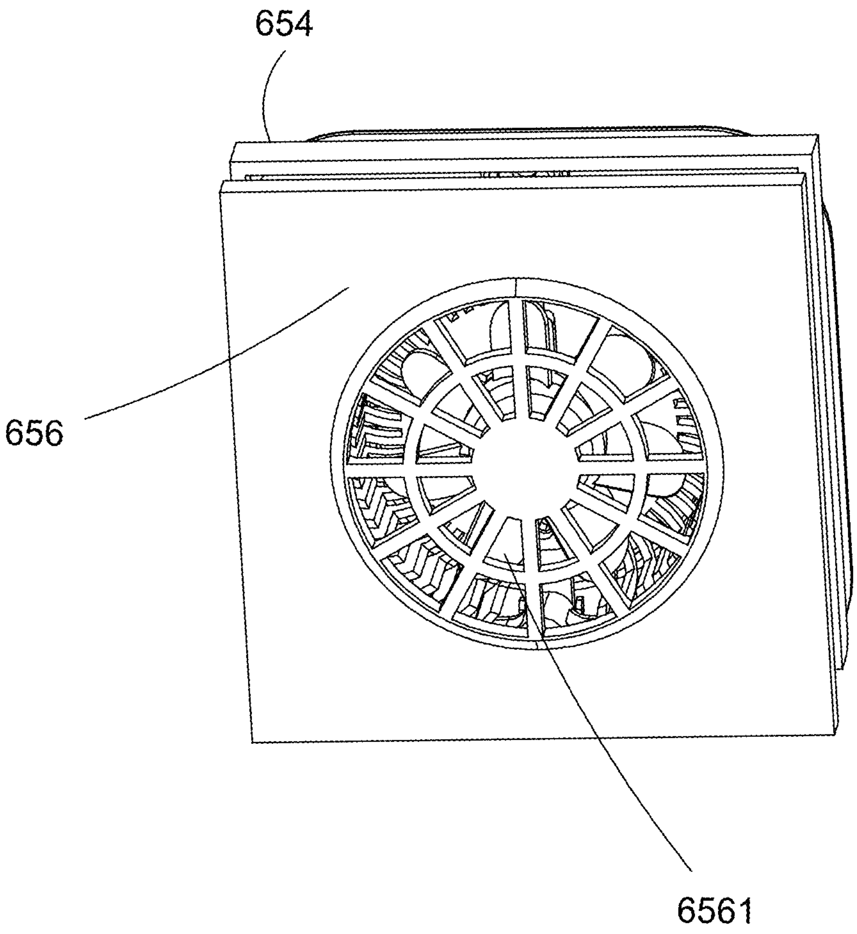
FIG. 32 is another perspective view illustrating a bottom of the thermal application assembly of the foot massage device according to the above third embodiment of the present invention.
Figure 33:
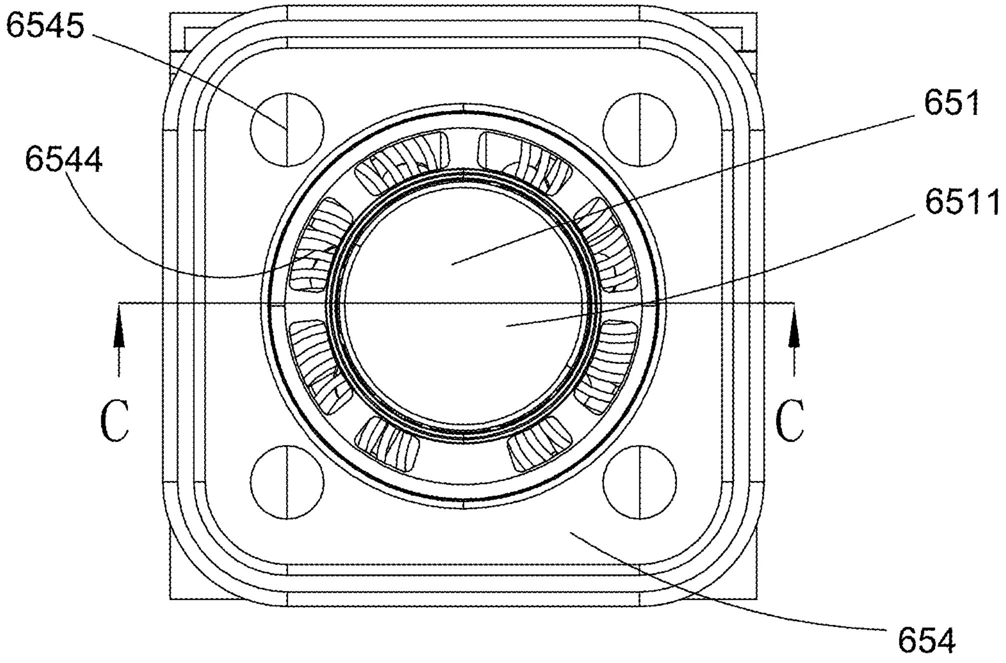
FIG. 33 is a top view illustrating the thermal application assembly of the foot massage device according to the above third embodiment of the present invention.
Figure 34:
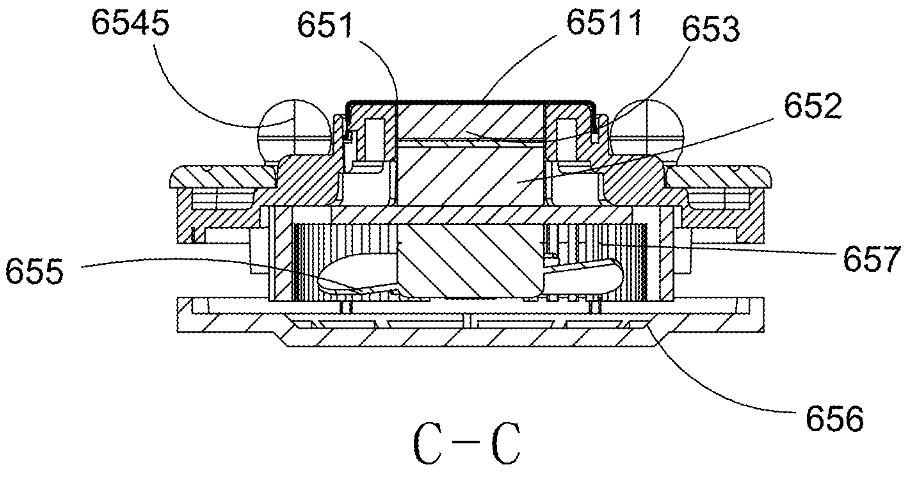
FIG. 34 is a sectional view along line C-C of FIG. 33.
Figure 35:
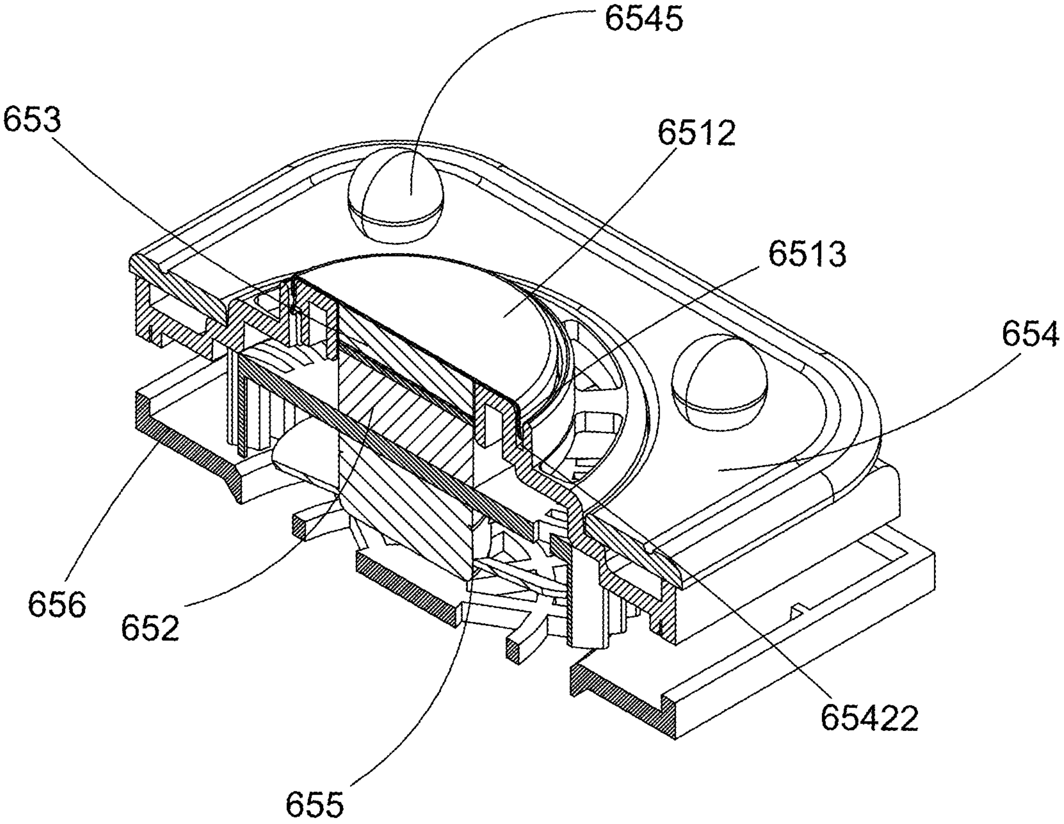
FIG. 35 is a schematic view illustrating the thermal application assembly of the foot massage device according to the above third embodiment of the present invention.

Referring to FIGS. 27 to 29 of the drawings, the thermal application assembly 650 is detachably mounted to the corresponding foot receiving pocket 621, so as to allow the foot receiving pocket 621 to be detached from the foot massage device 61 for cleaning. More specifically, a coupling frame 625 is mounted to the mounting opening 613 of the foot receiving pocket 621 for a detachable connection between the foot receiving pocket 621 and the mounting frame 654 of the thermal application assembly 650.

The detachable connecting manner between the coupling frame 625 and the mounting frame 654 can be any suitable detachably coupling means such as magnetically coupling means, VELCRO means, snap fasteners, screw fasteners, hook-and-eye fasteners, clip fasteners, buckle fasteners and screw fasteners. In this embodiment, the coupling frame 625 has one or more coupling holes 6251, the mounting frame 654 comprises one or more retaining protrusions 6545 at a top thereof for engaging with the corresponding coupling holes 6251 of the coupling frame 625, so as to detachably mount the thermal application assembly 650 with the corresponding foot receiving pocket 621. As shown FIGS. 29 to 31 of the drawings, the mounting frame 654 comprises four retaining protrusions 6545 at four corners of the top surface thereof while the coupling frame 625 has four coupling holes 6251 for engaging with the four retaining protrusions 6545.

The coupling frame 625 also has a central through hole 6252 which is aligned with the top heat conduction element 651. When the coupling frame 625 is assembled on the mounting frame 654, the through holes 6544, which are located between the coupling frame 625 and the inner frame 6542 of the mounting frame 654, are not blocked by the coupling frame 625, the through holes 6544 distributed around the top heat conduction element 651 are thus able to ensure the air flow. The coupling frame 625 is preferred to be made of a thermal insulation material, so as EVA (Ethylene Vinyl Acetate).

Figure 36:
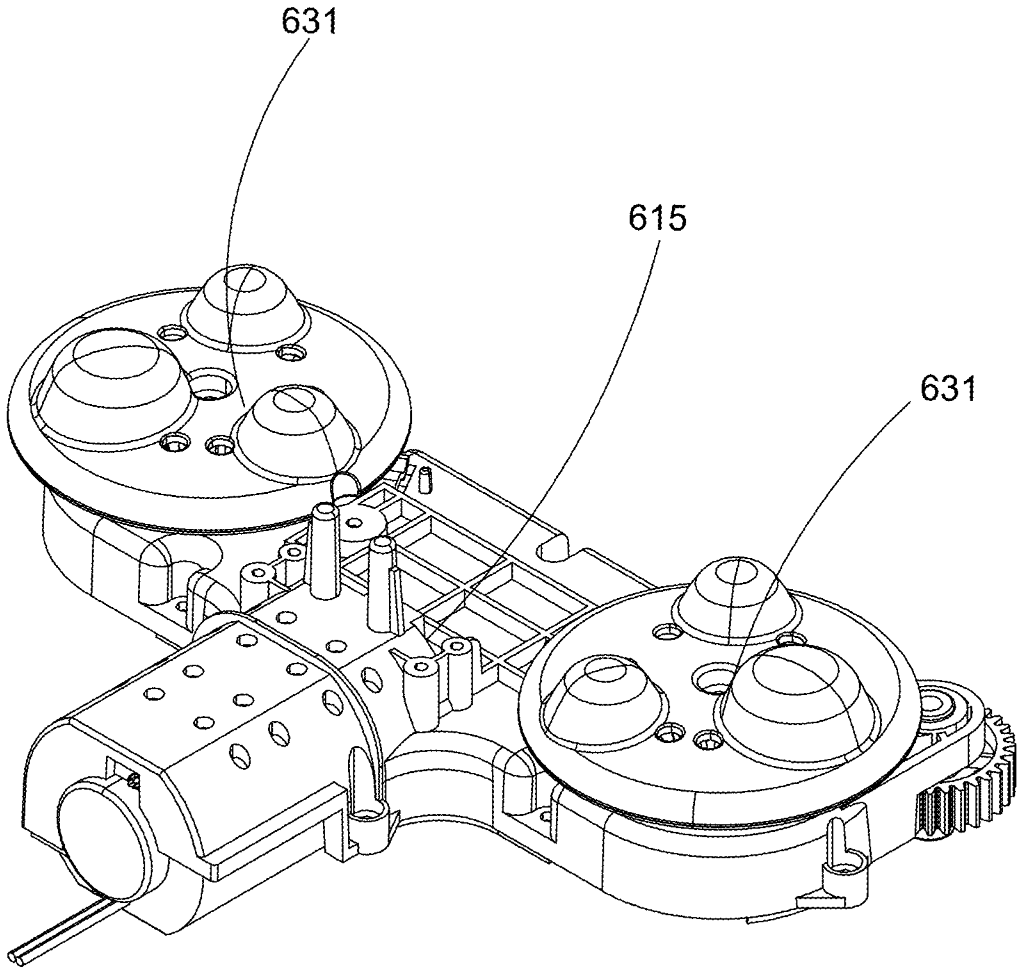
FIG. 36 is a perspective view illustrating a massage assembly of the foot massage device according to the above third embodiment of the present invention.
Figure 37:
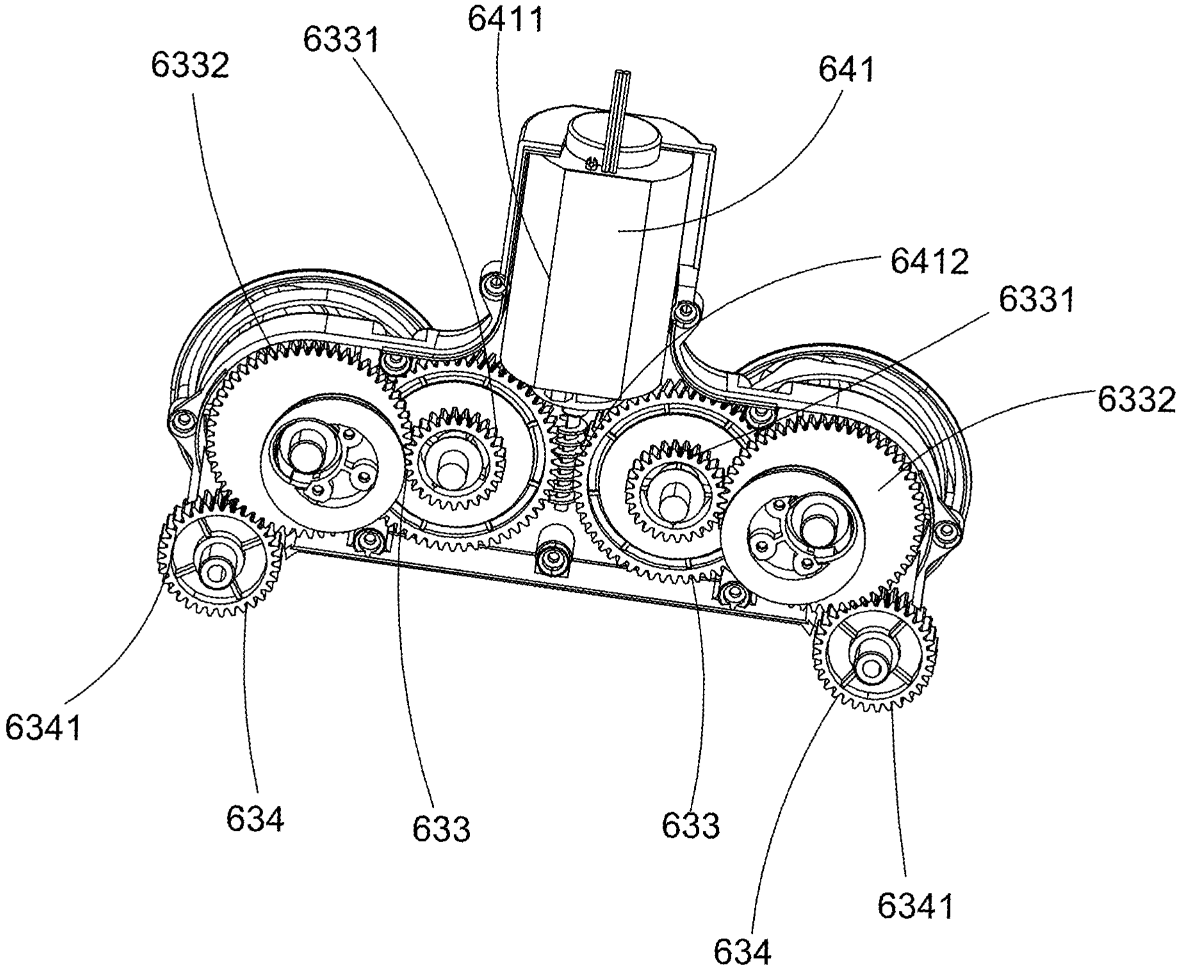
FIG. 37 is another perspective view illustrating a massage assembly of the foot massage device according to the above third embodiment of the present invention.
Figure 38:
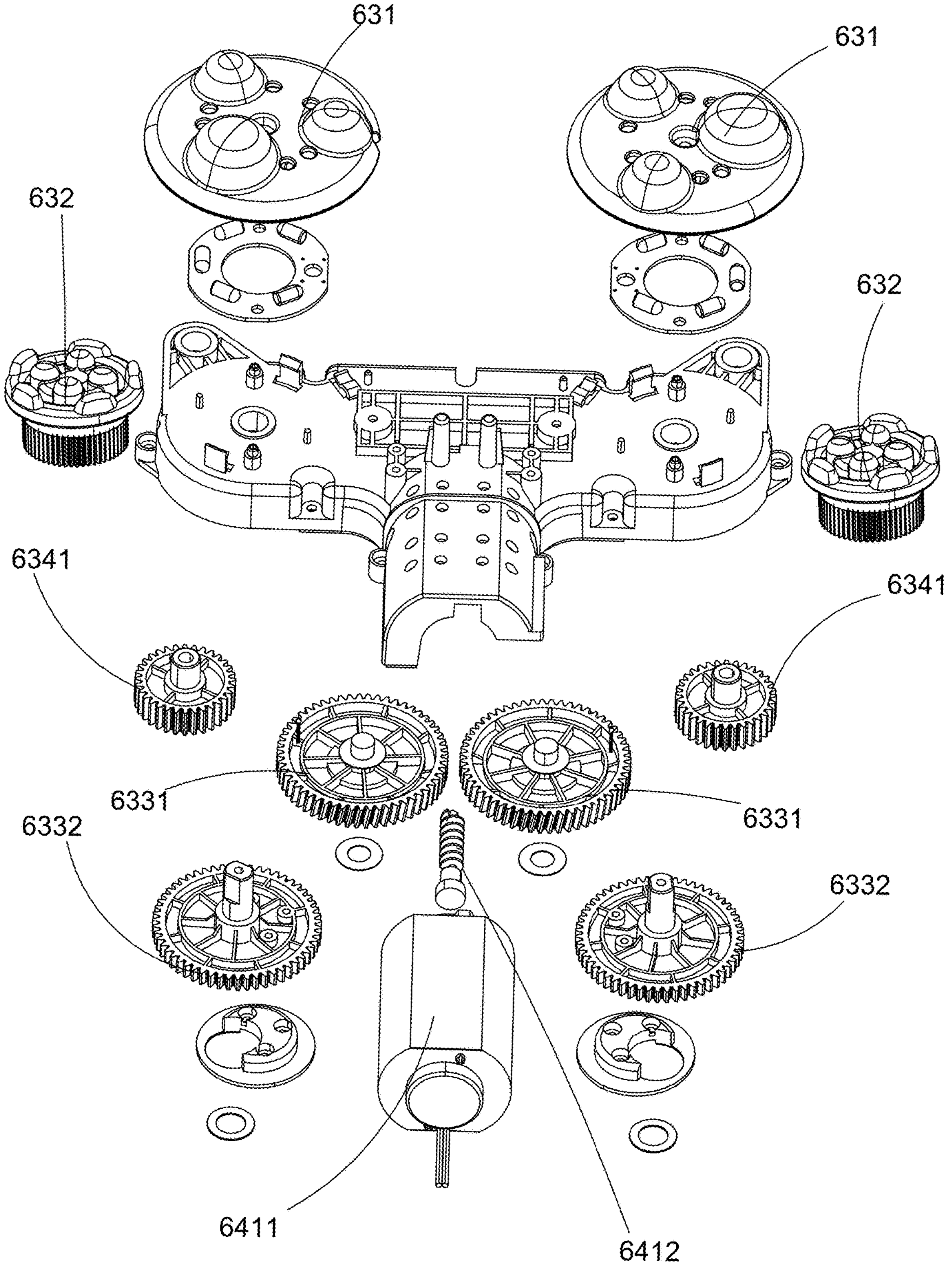
FIG. 38 is an exploded view illustrating the massage assembly of the foot massage device according to the above third embodiment of the present invention.

In this embodiment, the housing 610 further comprises an installation frame 615 for supporting the massage assembly 630, the massage assembly 630 comprises one or more massage heads under the foot receiving pocket 621 for massaging the foot of the user and one or more transmission units for coupling with the power source 641 for driving the corresponding massage heads. More specifically, as shown in FIGS. 36 to 38, the massage assembly 630 may comprises at least one sole massage head 631 for massaging a sole of the foot of the user, at least one toe massage head 632 for massaging toes of the user, at least one first transmission unit 633 coupled to the power source 641 for driving the movement of the sole massage head 631, at least one second transmission unit 634 which is capable of being driven by the power source 410 to drive the movement of the toe massage head 632.

In this embodiment, the foot massage arrangement is arranged for massaging both of the two feet of the user, and thus the massage assembly 630 comprises two sole massage heads 631 for massaging the soles of the two feet of the user, two toe massage heads 632 for massaging toes of the two feet of the user, two first transmission units 633 coupled to the power source 641 for driving the movement of the sole massage heads 631, two second transmission units 634 which are capable of being driven by the power source 641 for driving the movement of the two toe massage heads 632.

According to this embodiment, the massage assembly 630 is coupled to a motor 6411 in a manner that the motor 6411 is capable of driving the movement of all of the sole massage heads 6310 and the toe massage heads 632. In addition, the sole massage heads 631 move simultaneously with the toe massage heads 632, so that the soles and toes of the two feet of the user can be simultaneously massaged while the heels of the user are cooled or heated.

More specifically, in this embodiment, an output shaft 6412 of the power source 641 is a screw shaft which comprises engaging screws, each first transmission units 633 comprises a first gear element 6331 coupled to the output shaft 6412 of the power source 410, a second gear element 6332 coupled to the first gear element 331, and a driving arm 6333 connected to the second gear element 6332 for driving the rotation movement of the corresponding sole massage head 631.

Each second transmission unit 634 comprises a third gear element 6341 which is meshed and engaged with the second gear element 332, and a lower mesh portion of the corresponding toe massage head 632 is meshed and engaged with the third gear element 6341, so that the corresponding toe massage head 632 can be driven to rotate by the motor 6411, the corresponding first transmission unit 633 and the corresponding second transmission unit 634.

Figure 25:
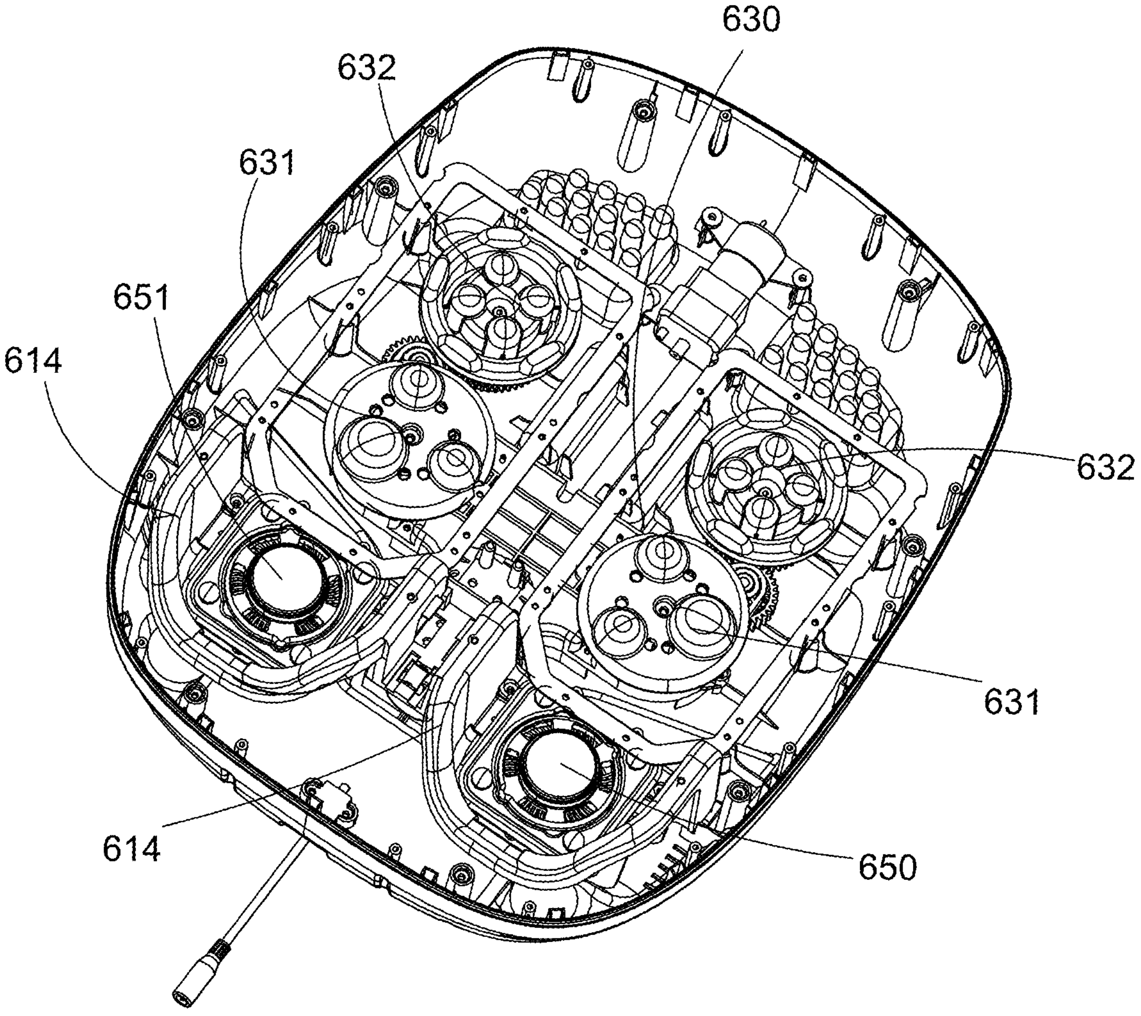
FIG. 25 is another perspective view of the foot massage device according to the above third embodiment of the present invention, wherein a pocket assembly and a upper housing body are removed.
Figure 26:
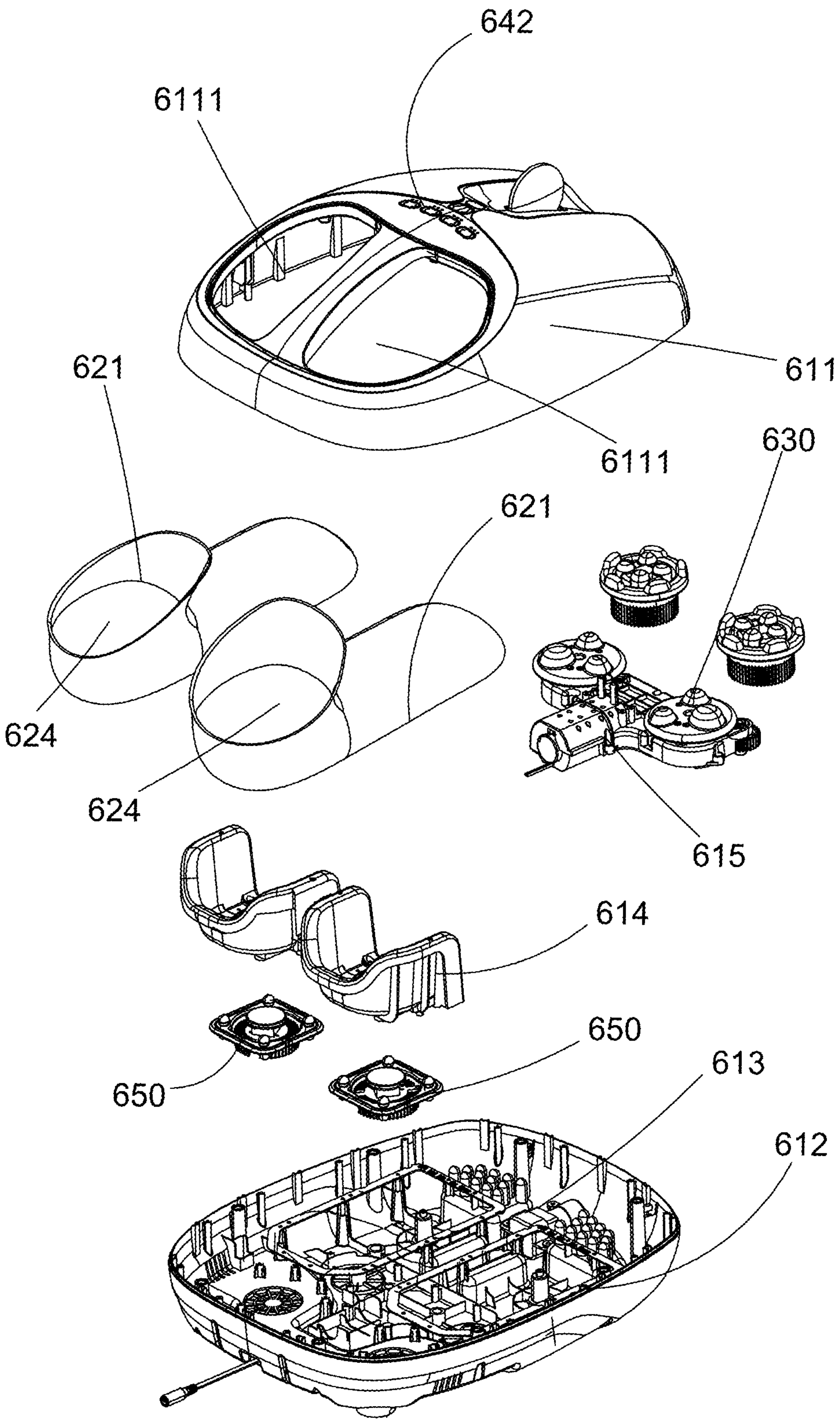
FIG. 26 is an exploded view of the foot massage device according to the above third embodiment of the present invention.

In this embodiment, the massage assembly 630 has a top massage plane 6301 defined by a most top surface of the sole massage heads 631 and the toe massage heads 632. The top massage plane 6301 can be in a same plane with the top thermal contact surface 6511 of the top thermal conduction element 651, or lower than the top thermal contact surface 6511 of the top thermal conduction element 651. Preferably, as shown in FIG. 25 and FIG. 39 of the drawings, the top massage plane 6301 of the massage assembly 630 is higher the top thermal contact surface 6511 of the top thermal conduction element 651, so as to conform to the natural curvature of the sole. This design better fits the anatomical shape of the foot and enhances the massage effect and the thermal treatment.

The top massage plane 6301 is established by the uppermost points of the rotating or oscillating massage heads and represents the effective contact surface for massaging the sole and toes of the foot of the user. This elevation follows the natural downward curvature of the human foot from the toes to the heel. By ensuring that the toe and mid-foot regions receive more prominent contact through raised massage heads, while the heel rests slightly lower on the thermal conduction surface 6511, the foot massage device 61 achieves an ergonomically optimized fit.

The raised top massage plane 6301 ensures full contact and deeper stimulation of the pressure points on the sole and toes, which are densely populated with nerve endings. This leads to a more invigorating and therapeutic massage experience. Since the heel region tends to suffer from conditions such as plantar fasciitis, placing it slightly recessed ensures that it receives maximum surface contact with the top thermal conduction element 651, leading to more effective cooling or heating transfer. The elevation difference between the two surfaces contributes to a smooth treatment transition, from localized thermal therapy at the heel to dynamic massage along the sole and toes, this spatial arrangement supports blood circulation, eases inflammation, and relieves fatigue holistically.

In addition, the foot massage device 61 of this embodied also can be introduced with the above mentioned instep airbags 2511 and the heel airbags 2611, so as to further provide an air cushioning effect to the insteps and heels of the feet of the user.

The present invention and its implementation methods are described above, and such description is not restrictive. The drawings show only one implementation method of the present invention, and the actual structure is not limited thereto. In short, if ordinary technicians in the field are inspired by it and design structural methods and embodiments similar to the technical solution without creative design without departing from the inventive purpose of the present invention, they should all fall within the protection scope of the present invention.

What is claimed is:

1. A foot massage device for a foot of a user, comprising:

a housing having an opening;

a pocket assembly which comprises a foot receiving pocket which is coupled to said opening for placing the foot of the user;

a massage assembly disposed in said housing; and a thermal application assembly which is assembled to said foot receiving pocket, wherein said thermal application assembly comprises a top thermal contact surface which is exposed in said foot receiving pocket, wherein said thermal application assembly has a cooling mode for allowing said top thermal contact surface to provide a cooling treatment to the foot of the user;

wherein said thermal application assembly is configured to deliver localized cooling to a heel of the foot of the user, wherein said foot receiving pocket is made of a flexible material and has a mounting opening, wherein said thermal application assembly is penetrated through said mounting opening to configure said top thermal contact surface be exposed in said foot receiving pocket.

2. The foot massage device according to claim 1, wherein said foot receiving pocket has a foot receiving cavity, said top thermal contact surface of said thermal application assembly is extended into said foot receiving cavity.

3. The foot massage device according to claim 2, further comprising a coupling frame which is mounted at said mounting opening of said foot receiving pocket, wherein said thermal application assembly comprises a mounting frame which is detachably coupled with said coupling frame.

4. The foot massage device according to claim 3, wherein said coupling frame is made of a thermal insulation material.

5. The foot massage device according to claim 3, wherein said coupling frame and said mounting frame are engaged with each other by one or more coupling holes and one or more corresponding retaining protrusions.

6. The foot massage device according to claim 3, wherein said thermal application assembly comprises a top heat conduction element, a bottom heat conduction element, and a semiconductor thermoelectric module positioned between said top heat conduction element and said bottom heat conduction element, wherein said top thermal contact surface is a top surface of said top heat conduction element, wherein said coupling frame has a central through hole which allows said top heat conduction element to pass therethrough to extend into said foot receiving pocket.

7. The foot massage device according to claim 2, wherein said thermal application assembly comprises a top heat conduction element, a bottom heat conduction element, and a semiconductor thermoelectric module positioned between said top heat conduction element and said bottom heat conduction element, wherein said top thermal contact surface is a top surface of said top heat conduction element.

8. The foot massage device according to claim 7, wherein said thermal application assembly further has a fan chamber located under said bottom heat conduction element and comprises a fan unit disposed in said fan chamber.

9. The foot massage device according to claim 8, wherein said mounting frame has one or more through holes which are communicated to said fan chamber, wherein said top thermal contact surface is positioned above said one or more through holes, so that the foot of the user which is retained above said top thermal contact surface will not block said through holes.

10. The foot massage device according to claim 9, wherein said one or more through holes are distributed around said top heat conduction element along a circumferential direction.

11. The foot massage device according to claim 9, wherein said mounting frame comprises an outer frame, an inner frame having a central opening for housing said semiconductor thermoelectric module, and a plurality of ridges extended between said inner frame and said outer frame to define said one or more through holes between said inner frame and said outer frame.

12. The foot massage device according to claim 9, wherein said thermal application assembly further comprises a bottom baffle plate which is position under said fan unit and have a plurality of bottom vent holes communicated to said fan chamber.

13. The foot massage device according to claim 12, wherein said housing comprises a lower housing body which comprises a plurality of support protrusions provided at a bottom side thereof for supporting said housing on an environment surface and allow said bottom vent holes to be spaced apart from the environment surface, wherein said housing has one or more side vent holes communicated to said fan chamber.

14. The foot massage device according to claim 7, wherein said housing has two said openings, said pocket assembly comprises two said foot receiving pockets which are respectively detachably coupled to said two openings, wherein two said thermal application assemblies are respectively detachably assembled on said two foot receiving pockets.

15. The foot massage device according to claim 7, further comprising a control assembly which comprises a power source, wherein said power source comprises a motor having an output shaft, said massage assembly comprises a sole massage head, a toe massage head, a first transmission unit, and a second transmission unit, wherein said first transmission units comprises a first gear element coupled to said output shaft, a second gear element coupled to said first gear element, and a driving arm connected to said second gear element for driving rotation movement of the corresponding sole massage head, wherein said second transmission unit comprises a third gear element which is meshed and engaged with said second gear element, said toe massage head is meshed and engaged with said third gear element so as to allow said toe massage head to be driven to rotate by said motor, the corresponding first transmission unit and the corresponding second transmission unit.

16. The foot massage device according to claim 7, wherein said thermal application assembly further has a heating mode to deliver localized heating to the heel of the foot of the user.

17. The foot massage device according to claim 16, wherein said top heat conduction element is configured to be cooled to −5° C.~15° C. when said thermal application assembly is in said cooling mode, and is heated to 40° C.~80° C. when said thermal application assembly is in said heating mode, wherein a time period for reaching a preset temperature is 5 s~60 s.

18. A foot massage device for a foot of a user, comprising:

a housing having an opening;

a pocket assembly which comprises a foot receiving pocket which is coupled to said opening for placing the foot of the user;

a massage assembly disposed in said housing;

a thermal application assembly which is assembled to said foot receiving pocket, wherein said thermal application assembly comprises a top thermal contact surface which is exposed in said foot receiving pocket, wherein said thermal application assembly has a cooling mode for allowing said top thermal contact surface to provide a cooling treatment to the foot of the user; and a power source, wherein said massage assembly comprises one or more massage heads under said foot receiving pocket and one or more transmission units for coupling with said power source for driving the corresponding massage heads, wherein said massage assembly comprises a top massage plane defined by said one or more massage heads, wherein said top massage plane is higher than said top thermal contact surface of said thermal application assembly.

* * * * *